(12) United States Patent
Sakai et al.

(10) Patent No.: US 6,274,960 B1
(45) Date of Patent: *Aug. 14, 2001

(54) RELUCTANCE TYPE ROTATING MACHINE WITH PERMANENT MAGNETS

(75) Inventors: Kazuto Sakai; Masanori Arata; Mikio Takabatake; Yoshio Hashidate; Ryoichi Kurosawa; Yosuke Nakazawa; Tadashi Tokumasu, all of Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/406,772

(22) Filed: Sep. 28, 1999

(30) Foreign Application Priority Data

| Sep. 29, 1998 | (JP) | 10-275777 |
| Sep. 29, 1998 | (JP) | 10-275797 |
| Sep. 29, 1998 | (JP) | 10-275922 |
| Sep. 30, 1998 | (JP) | 10-278412 |
| Feb. 26, 1999 | (JP) | 11-051201 |

(51) Int. Cl.$^7$ ................................................ H02K 21/12
(52) U.S. Cl. .................. 310/156; 310/166; 310/168; 310/216; 310/261
(58) Field of Search .................. 310/156, 166, 310/168, 261, 172, 191, 193, 216

(56) References Cited

U.S. PATENT DOCUMENTS 6,008,559 * 12/1999 Asano et al. ................ 310/156
6,087,751 * 7/2000 Sakai ........................... 310/156

OTHER PUBLICATIONS

T.J.E. Miller, et al., IEEE Transactions on Industry Applications, vol. 27, No. 4, pp. 741–749, "Design of a Synchronous Reluctance Motor Drive," Jul./Aug. 1991.

L. Xu, et al., IEEE Industry Applications Society Annual Meeting, Conference Record, pp. 3–8, "A New Design Concept of Permanent Magnet Machine for Flux Weakening Operation," 1993.

D.A. Staton, et al., IEE Conference Electrical Machines and Drives, London, pp. 156–160, "Optimisation of the Synchronous Reluctance Motor Geometry," 1991.

* cited by examiner

*Primary Examiner*—B . Mullins
(74) *Attorney, Agent, or Firm*—Oblon, Spivak, McClelland, Maier & Neustadt, P.C.

(57) ABSTRACT

A reluctance type rotating machine includes a stator 1 having armature windings 2 arranged on an inner periphery of the stator 1, a rotor 3 having a magnetic unevenness in the circumferential direction and a plurality of permanent magnets 6 arranged for negating the armature windings' flux passing between adjoining poles. Each magnet 6 is magnetized in a direction different from a direction to facilitate the rotor's magnetization. A magnetic portion 7 is provided between the pole and the interpole of the rotor 3. Owing to the provision of the magnetic portion 7, when the armature windings are not excited, more than 30% of the permanent magnets' flux is distributed in the rotor 3. Similarly, when the machine is loaded, the permanent magnets' interlinkage flux is more than 10% of composite interlinkage flux composed of armature current and the permanent magnets.

16 Claims, 35 Drawing Sheets

(T<t)

RELUCTANCE TYPE ROTATING MACHINE WITH PERMANENT MAGNETS

BACKGROUND OF THE INVENTION

1. Field of the Invention

The present invention relates to a reluctance type rotating machine equipped with permanent magnets, which is compact with a high output and which is capable of rotating in a wide range by its adoption of a new pole structure.

2. Description of the Related Art

As shown in FIG. 1, an earlier reluctance type rotating machine comprises a stator 1 having armature windings 2 and a salient-pole rotor 3 having an uneven core 4 since the rotating machine does not require coils for forming a field system about the rotor 3. Therefore, the reluctance type rotating machine is simple in structure and low in price, We now describe a principle of producing the output of the reluctance type rotating machine. Because of unevenness about the rotor, the reluctance type rotating machine exhibits small magnetic reluctance at protrusions of the rotor and large magnetic reluctance at recesses of the rotor. That is, there is a difference of stored magnetic energy between a gap over the protrusion and another gap over the recess. The output of the reluctance type rotating machine comes from the change in magnetic energy. Note, the protrusions and recesses may be provided by a configuration allowing the unevenness to be formed not only geometrically but magnetically, in other words, the configuration where the magnetic reluctance and distribution of magnetic flux density vary depending on the position of the rotor.

As another high-performance rotating machine, there is a permanent magnet type rotating machine. In the rotating machine, a plurality of permanent magnets are arranged on the substantial whole periphery of the rotor core although the armature windings of the machine is similar to the armature windings of an induction machine, the same windings of the reluctance type rotating machine, etc.

Due to the unevenness about the core surface, the reluctance type rotating machine has different magnetic reluctance which depends on the rotational position of the rotor. This change in magnetic reluctance causes the magnetic energy to be varied thereby to produce an output of the rotor.

In the conventional reluctance type rotating machine, however, the increasing of currents causes a local magnetic saturation to be enlarged at the protrusions of the rotor 4. Thus, the enlarged magnetic saturation also causes magnetic flux leaking to the recesses between poles to be increased, so that effective fluxes are decreased while lowering the output power.

On the other hand, as another high-powered rotating machine, there is a permanent magnet type rotating machine using "rare-earth metal" permanent magnets having high magnetic energy products. Owing to the arrangement of the permanent magnets on the surface of the rotor core, when the permanent magnets of high energy are employed to form a magnetic field, the permanent magnet type rotating machine is capable of forming an intense magnetic field in an air-gap of the machine, providing a compact and high-powered rotating machine.

Nevertheless, it should be noted that a voltage induced in the armature windings gets larger in proportional to the rotating speed of the rotor since the magnetic flux of each magnet is constant. Therefore, if the machine is required to operate at a wide range of variable speeds up to the high-speed rotation, it is difficult to carry out the "rated-output" operation of the machine at a rotating speed twice or more as large as the base speed under constant current and voltage.

SUMMARY OF THE INVENTION

It is therefore an object of the present invention to provide a reluctance type rotating machine which is compact in spite of high output and which is capable of operating at a wide range of variable speeds.

To achieve the object of the present invention described above, from the 1st aspect of the invention, there is provided a reluctance type rotating machine comprising:

a stator having armature windings;

a rotor having a rotor core, the rotor being provided, in a circumferential direction thereof, with a magnetic unevenness;

a plurality of permanent magnets arranged in the rotor core, for negating the armature windings' flux passing between adjoining poles defined in the rotor, each of the permanent magnets being magnetized in a direction different from a direction to facilitate the rotor's magnetization; and wherein a magnetic portion is ensured in the rotor core so that, when the armature windings are not excited, more than 30% (percent) of the permanent magnets' flux is distributed in the rotor and also that, when the machine is loaded, the permanent magnets' interlinkage flux is more than 10% of composite interlinkage flux composed of current and the permanent magnets.

It is noted that the above composite interlinkage flux is changed by a phase difference between the flux vector of current and the flux vector of permanent magnets. Therefore, we now define the amount of composite interlinkage flux when both phases exerting no influence on each other are on the crossing condition at a right angles, as the above composite interlinkage flux of the invention.

As the magnetic unevenness is formed about the rotor core, a magnetic protrusion of the unevenness constitutes a pole of a reluctance motor, while a magnetic recess does an interpole (i.e. a part between the adjoining poles) of the motor. Namely, the magnetic protrusion corresponds to a "easy-magnetizing" direction to facilitate the rotor's magnetization, while the magnetic recess corresponds to a "hard-magnetizing" direction where it is difficult to magnetize the rotor.

According to the invention, the permanent magnets are arranged in the magnetic recesses in the rotor core. Additionally, in the rotor core, there is provided a magnetic portion for closing the permanent magnets' flux in a short circuit so that, when the armature windings are not excited, more than 30% (percent) of the permanent magnets' flux is distributed in the rotor. With this structure, it is possible to reduce an induced voltage generating at the rotor's rotating to 0 to 70% of the rated voltage for the rotating machine. For example, under condition that the induced voltage is set to 33%, even if rotating the rotating machine at high speed of three times as fast as the base speed, there would be no possibility to apply an excessive current to an electric circuit.

Next, when the machine is loaded, the above magnetic portion is intensely subjected to the magnetic saturation by the flux due to the load current. Consequently, the permanent magnets' flux distributing between the poles does increase. According to the invention, the magnetic portion between the poles constitutes a magnetic path so that a part of permanent magnets' flux is distributed in the direction of the center-axis of interpole. Additionally, the magnetic portion is adapted in a manner that, when the machine is loaded, the permanent magnets' interlinkage flux is more than 10% of composite interlinkage flux composed of armature current and the permanent magnets.

The flux of each permanent magnet has an action to repulse the armature current flux entering along the center-axis direction of the interpole and increase the magnetic reluctance in the direction of the magnet since the relative permeability of the magnet is generally equal to zero. Thus, since the permanent magnets' flux and the armature flux in the opposite direction cancel each other, the composite flux along the center-axis direction of the interpole gets fewer or flows in a direction opposite to the armature current when the armature current is small.

Therefore, since the interlinkage flux along the center-axis direction of the interpole gets smaller, a change within the magnetic unevenness about the rotor is so enhanced that the output of the machine does increase. On the other hand, the armature flux has a tendency of distribution to pass through the magnetic protrusions of the rotor core in concentration. Consequently, as the unevenness of flux density about the air-gap is promoted, the magnetic-energy change becomes larger to provide the machine with high torque and high power factor.

As to an adjusting range of terminal voltage required for operating the machine at a wide range of variable speeds, the function will be described below.

According to the invention, since the permanent magnets are embedded in the interpoles locally, the surface area of the permanent magnet on the peripheral side of the rotor is smaller than that of the conventional rotating machine where the permanent magnets are arranged about the whole periphery of the rotor surface, so that the interlinkage flux by the magnets gets fewer, too. Then, the interlinkage flux due to the armature current (both exciting current component and torque current component of the rotating machine) takes part in the interlinkage flux of the permanent magnets, so that a terminal voltage is induced.

In the permanent magnet type rotating machine, it is possible to adjust the terminal voltage because the interlinkage flux of the permanent magnets occupies almost the whole terminal voltage. On the contrary, since the rotating machine of the invention has a small interlinkage flux of the permanent magnets, it is expected that when adjusting the exciting current widely, then it is possible to control terminal voltage in a wide range. That is, since the exciting current component can be adjusted so that the voltage is less than a power source voltage corresponding to the velocity, the rotating machine is capable of operating at a wide range of variable-speeds under the power source of constant voltage.

Additionally, since a part of each permanent magnet flux leaks through the above-mentioned magnetic portion forming the short circuit, it is possible to reduce diamagnetic field inside the permanent magnet. Thus, since an operating point on a demagnetizing curve expressing the B(magnetic flux)–H(field intensity) characteristics of the permanent magnet is elevated (causing a large permeance coefficient), the demagnetizing-proof characteristics with respect to both temperature and armature reaction is improved. Particularly, in case of canceling the permanent magnets' flux by the armature current forming the flux in the directions of the interpole-axes, it is possible to prevent the demagnetization of the rotor although the demagnetizing field is applied on the magnets.

Furthermore, since the permanent magnets are embedded in the rotor core, it acts as a retaining mechanism of the permanent magnets, so that the rotating machine can ensure its high-speed operation.

According to the 2nd aspect of the invention, there is provided a reluctance type rotating machine comprising:
 a stator having armature windings;
 a rotor having a rotor core, the rotor being provided, in a circumferential direction thereof, with a magnetic unevenness;
 a plurality of permanent magnets arranged in the rotor core, for negating armature flux passing between adjoining poles defined in the rotor, each of the permanent magnets being magnetized in a direction different from a direction to facilitate the rotor's magnetization; and
 wherein a magnetic portion is ensured in the rotor core so that, when the armature windings are not excited, more than 80% (percent) of the permanent magnets' flux is distributed in the rotor and also that, when the machine is loaded, the permanent magnets' interlinkage flux is more than 5% of composite interlinkage flux composed of current and the permanent magnets.

Although the basic function of this rotating machine is similar to that the previously-mentioned rotating machine, the induced voltage is remarkably small because more than 80% of the permanent magnets' flux is distributed in the rotor when the armature windings are not excited. Consequently, even if the short circuit is caused in the power source or so, a current originating in the voltage induced by the permanent magnets is so insignificant to prevent the machine from being burned or braked excessively. Further, since the stator core loss caused by the magnets' flux gets fewer, the machine's efficiency can be improved when it is under unloaded or slight-loaded condition.

In addition, the magnetic portion is adapted in a manner that, when the machine is loaded, the permanent magnets' interlinkage flux is more than 5% of composite interlinkage flux composed of armature current and the permanent magnets. Since the magnets' flux and the armature flux cancel each other under the loaded condition, the composite flux in the directions of center axes of the interpoles is reduced.

Consequently, because of reduced interlinkage flux in the direction of center axes, the magnetic unevenness about the rotor is enhanced to increase the output of the machine. Simultaneously, since the interlinkage flux in the direction of center axes of the interpoles is decreased, the terminal voltage is lowered, whereby the power factor of the machine can be improved. Again, the current flux is distributed so as to pass through the poles in concentration.

From the above, as the change in flux density of the gap is increased in the present invention, the change in magnetic energy is also increased thereby producing high torque and high power factor.

Furthermore, this rotating machine can perform the following action. Since almost all the flux of each permanent magnet leaks through the magnetic portion of the short circuit, it is possible to reduce diamagnetic field inside the permanent magnet remarkably. Thus, since an operating point on the demagnetizing curve expressing the B(magnetic flux)-H(field intensity) characteristics of the permanent magnet is also elevated (causing a large permeance coefficient), it is possible to use the permanent magnets having a deteriorated temperature characteristic, at a temperature of 50 to 200° C. Even if flowing a large current of two or three times as large as a rated current in an atmosphere of high-temperature, there is no possibility that the permanent magnets are demagnetized owing to the armature reaction. Especially under a condition of the rated torque current, if increasing the armature current in order to accomplish a maximum torque of several times as much as the normal torque in case of negating the permanent magnets' flux by the armature current forming the flux in the directions of interpoles, there is produced a gap flux in the opposite direction to the interlinkage flux of the permanent magnets by the armature current. In such a case, the rotating machine of the embodiment allows the permanent magnets to be used without being demagnetized.

Also in this rotating machine, since the permanent magnets are embedded in the rotor core, it acts as the retaining mechanism of the permanent magnets, so that the rotating machine can ensure its high-speed operation.

According to the 3rd aspect of the invention, there is provided a reluctance type rotating machine comprising:
  a stator having armature windings;
  a rotor having a rotor core, the rotor being provided, in a circumferential direction thereof, with a magnetic unevenness;
  a plurality of permanent magnets arranged in the rotor core, for negating the armature windings' flux passing between adjoining poles defined in the rotor, each of the permanent magnets being magnetized in a direction different from a direction to facilitate the rotor' s magnetization; and
  wherein, in a magnetic flux of the permanent magnets at an air gap, an amplitude in a fundamental component of a magnetic flux density of the permanent magnets is 0.2 to 0.6 T.

According to the 4th aspect of the invention, in common with the above-mentioned rotating machines, the magnetizing direction of the permanent magnets is substantially identical to the circumferential direction of the rotor. In this case, since the flux of exciting current component passing the poles intersects the magnetizing direction of the permanent magnets in substantial right angles in electrical angle, the magnetic saturation due to the current is eased at the respective poles, so that the reluctance torque grows larger.

According to the 5th aspect of the invention, the rotor is provided, between the adjoining poles, with a first non-magnetic part. Owing to the provision of the first non-magnetic part at each interpole, the magnetic reluctance in the direction of the interpoles is remarkably increased. Therefore, since a large unevenness is produced in flux density at the gap, it is possible to produce a large output of the machine because of the increased change in magnetic energy.

According to the 6th. aspect of the invention, a width of each pole is 0.3 to 0.5 times as long as a pole pitch which corresponds to a circumferential distance from a center of an pole to a center of the adjoining pole.

With this establishment of the pole and interpole, it is possible to effectively increase the change in the gap flux density with respect to the position of the rotor, where the rotating machine of high output can be provided.

According to the 7th aspect of the invention, the rotor has magnetic portions each formed on the periphery between the adjoining poles, for magnetically connecting therebetween. Owing to the provision of the magnetic portions, the magnetic material uniformly spreads over the whole periphery of the rotor with respect to core teeth of the stator. Consequently, the change of magnetic reluctance caused by slots of the stator gets smaller while decreasing the slot ripple. Further, the smooth surface of the rotor allows the windage loss to be reduced. It is also possible to restrict the demagnetizing field, which is caused by the armature current acting on the permanent magnets, owing to the magnetic portions outside the interpoles.

According to the 8th aspect of the invention, the rotor is provided with a second non-magnetic part for reducing flux leaking through respective inward portions of the permanent magnets in the radial direction. Owing to the provision of the non-magnetic part on the inner end of each permanent magnet, it is possible to prevent the flux from leaking out of the magnet. Therefore, it is possible to reduce a volume of the permanent magnet without remarkably deteriorating the characteristic of the machine.

According to the 9th aspect of the invention, the first non-magnetic part between the adjoining poles is positioned so as not to increase magnetic reluctance outside the permanent magnets remarkably.

Since the first non-magnetic part does not increase the magnetic reluctance outside the magnet, it is possible to ensure sufficient flux in spite of small quantity of permanent magnets.

Further, by the first non-magnetic part, the permanent magnets' flux is distributed in the rotor's surface opposing the stator when the armature windings are not excited. When the flux due to the load current overlaps, each magnetic portion between the pole and the interpole and the outer magnetic portion are subjected to the magnetic saturation, so that the permanent magnets' flux closing in the rotor interlinks with the stator. Therefore, when the machine is not loaded, the induced voltage due to the interlinkage flux of the permanent magnets is so small, whereby the flux of the permanent magnets can be utilized effectively under the loaded condition.

According to the 10th aspect of the invention, a gap length outside the interpole of the rotor is larger than the gap length outside the pole.

Since the gap length outside the pole is smaller than the gap length outside the interpole, the magnetic unevenness is further enlarged, so that the reluctance torque does increase. When the armature windings are not excited, the permanent magnets' flux interlinking with the armature windings is decreased thereby to close in the rotor core through the magnetic portion between the adjoining poles because the gap length outside the interpole is relatively long, When the flux of current overlaps at the time of the machine being loaded, the rotor is locally subjected to the magnetic saturation, so that the permanent magnets' flux closing in the rotor is brought into the interlinkage with the stator. Therefore, when the machine is not loaded, the induced voltage due to the interlinkage flux of the permanent magnets is so small, whereby the permanent magnets' flux can be effectively increased under the machine's loaded condition.

According to the 11th aspect of the invention, the reluctance type rotating machine is characterized in that the flux due to an armature current in a center axis-direction between the adjoining poles and the flux of the permanent magnets negates each other, so that the composite flux in the center axis-direction is substantially equal to zero.

When applying the load current, the flux of the armature current negates the permanent magnets' flux, so that the composite flux in the center axis of the interpole amounts to zero. Therefore, the voltage induced by the flux in the central axis of the interpole becomes to be zero, too. Thus, since the terminal voltage is induced by the flux in the direction of pole, low voltage and high output can be provided for the rotating machine, Additionally, the constant output characteristic can be obtained with ease, As the reluctance torque is a product of bothexciting current and torque current component of the armature, the output is obtained by a product of the exciting current, the torque current component and the rotating speed. Upon fixing the armature current component (torque current) forming the flux in the direction of interpole axis into a constant value so that the composite flux in the direction of center axis of the interpole amounts to zero, by adjusting the armature current component (exciting current) with respect to the rotating speed in inverse proportion to each other, the constant output characteristic where torque times rotating speed is constant can be accomplished.

According to the 12th aspect of the invention, under condition that an armature current component forming the flux in the central axis-direction between the adjoining poles becomes a maximum, the flux due to the armature current component in the center axis-direction between the adjoining poles and the flux of the permanent magnets negates each other, so that the composite flux in the center axis-direction is substantially equal to zero.

In this case, the maximum current for the rotating machine is divided into two vector components crossing at right angles, i.e., an armature current component forming the flux in the direction of center axis of the interpole and another armature current forming the flux in the direction of pole. When the maximum current of armature (composite vector) intersects the armature current component forming the flux in the direction of center axis of interpole at angles of 45 degrees, a maximum of reluctance torque can be obtained. The rotating machine of the invention is constructed in a manner that, at this current phase, the flux of armature current in the direction of the central axis of the interpole negates the flux of each permanent magnet and therefore, the resultant composite flux in the interpole direction amounts to substantial zero. Therefore, when the induced voltage is raised during the machine's operation at a high rotating speed range, the machine allows the armature current component (i.e. exciting current component) forming the flux in the direction of pole to be adjusted smaller, whereby the constant induced voltage can be attained. Consequently, it is possible to operate the machine at a wide range of variable-speeds and realize the high power factor while maintaining the constant output.

According to the 13th aspect of the invention, in connection with the armature current produced by the flux of the permanent magnets when the machine is electrically closed in a short circuit, the interlinkage of magnetic flux produced by the permanent magnets in case of the armature current of zero interlinking with the flux of the permanent magnets is determined in a manner that heat derived from Joule-loss originating in the armature current is less than a thermal allowable value of the machine or braking force produced by the armature current is less than an allowable value in the rotating machine.

If the permanent magnets' flux which interlinks with the armature windings exists when an electrical short-circuit accident is caused in an inverter, a terminal or the like, the rotation of the rotor causes an induced voltage to be generated. Due to this induced voltage, the short-circuit current may flow in the armature windings for burning or an operation of the apparatus may be locked by excessive brake torque. According to the invention of the 1st and 2nd aspects, since the high output of the machine is accomplished by the interlinkage flux from small number of permanent magnets, it is possible to reduce the induced voltage in order to establish both short-circuit current and brake less than the allowable values, respectively. Consequently, even if occurring the short-circuit accident, it would be possible to prevent troubles in the rotating machine and the apparatus.

According to the 14th aspect of the invention, the permanent magnets are arranged between the adjoining poles and the first non-magnetic part between the poles is provided with a conductive material. With the arrangement of the conductive material in the first non-magnetic part, an eddy current is generated in the conductive materials when the rotor does not synchronize with the rotating field, so that the rotor can enter its synchronous rotation. That is, the self-starting and stable rotation of the rotating machine can be realized.

According to the 15th aspect of the invention, the rotor is provided, on a periphery thereof, with a plurality of conductive members extending in the axial direction of the rotor.

Since the induced current flows in the conductive members at the machine's asynchronous operation, the self-starting and stable rotation of the rotating machine can be realized. Further, it is possible to absorb the eddy current by harmonic current when driving the inverter.

According to the 16th aspect of the invention, the reluctance type rotating machine further comprises a pair of magnetic end rings arranged on respective axial ends of the rotor.

When the rotor is subjected to an armature reaction field in the opposite direction to the magnetized direction of each permanent magnet in the rotor core by the armature current, a part of magnetic flux of the permanent magnets forms closed magnetic paths each flowing the core in the axial direction, entering into the end ring and returning the core. That is, since the leakage flux can be produced effectively, it is possible to adjust the amount of interlinkage flux between the armature windings and the permanent magnets, whereby the terminal voltage can be controlled by the armature current with ease. In addition, it is possible to adjust the ratio of leakage flux to effective flux by controlling a clearance between the rotor core and each end ring.

According to the 17th aspect of the invention, the object of the present invention can be also accomplished by a reluctance type rotating machine comprising:
 a stator having armature windings;
 a rotor having a rotor core, the rotor being provided, in a circumferential direction thereof, with a magnetic unevenness;
 a plurality of permanent magnets arranged in the rotor core along directions of respective poles of the rotor, for negating armature flux passing between adjoining poles defined in the rotor; and
 wherein each interpole between the adjoining poles has an outer face recessed with respect to an outer face of the pole in the radial direction of the rotor.

According to the above invention, since the outer face of each "interpole" (or an inter-pole portion) of the rotor is recessed with respect to the outer face of the "pole" (or a magnetic pole portion) in the radial direction of the rotor, a gap length in the radial direction of the rotor between the stator and the rotor changes, so that the magnetic unevenness is formed about the rotor. While, since the permanent magnets are magnetized so as to negate the armature flux passing the "interpoles" (i.e. interpole portions), each magnetic reluctance in the direction along each interpole is increased. Thus, an unevenness is produced in the magnetic flux density at the gap between the stator and the rotor, whereby a great torque can be produced in the rotating machine by the resultant change in magnetic energy.

According to the 18th aspect of the invention, in the rotating machine of the 17th aspect, each of the permanent magnets is arranged so as to leave a part of the rotor core between an outer end of the permanent magnet in the radial direction of the rotor and an outer periphery of the rotor.

According to the 19th aspect of the invention, in the rotating machine of the 18th aspect, the part between the outer end of the permanent magnet and the outer periphery of the rotor has a radial thickness to be magnetically saturated by the armature flux.

According to the 20th aspect of the invention, in the rotating machine of the 18th aspect, it is preferable that the part between the outer end of the permanent magnet and the outer periphery of the rotor has a radial thickness smaller than a radial thickness of the interpole at a center thereof.

According to the 21st aspect of the invention, in the rotating machine of the 18th aspect, it is preferable that the part between the outer end of the permanent magnet and the outer periphery of the rotor has a radial thickness so that, when no current flows in the armature windings, the magnetic flux density of the permanent magnets interlinking with the armature windings gets less than 0.1 T at the gap between the rotor and the stator.

In common with the 18th to 21st aspects of the invention preferable arrangements, owing to the provision of a part of core between each permanent magnet and the outer periphery of the rotor, the flux from the magnet is closed in the rotor core when the armature current is zero, in other words, the machine is unloaded. Thus, since the induced voltage in the armature windings is substantially equal to zero, the rotating machine allows the rotor to rotate at a constant speed without being braked from the stator's side. Further, even if an electrical short-circuit occurs the armature windings, an inverter, etc. during the rotor's rotation, the short-circuit current does not flow since the induced voltage is substantially equal to zero. Therefore, in spite of the short-circuit, it is possible to prevent an excessive braking force from being produced and the armature windings from being damaged. When the machine is loaded, the armature flux in the directions of the poles partially passes through the outer core portion outside the permanent magnets, so that each interpole is magnetically saturated at both ends of the interpole in the circumferential direction. Consequently, the flux of the permanent magnets is distributed out of the rotor and interlinks with the armature windings, whereby the output and power factor of the machine can be improved.

According to the 22nd aspect of the invention, in the machine of any one of the 18th to 21st aspects, each of the permanent magnets is arranged so as to form a space between the outer end of the permanent magnet and the outer periphery of the rotor, in addition to the part of the rotor core.

According to the 23rd aspect of the invention, the space is filled up with a non-magnetic material.

According to the 24th aspect of the invention, a cavity is formed in each interpole portion of the rotor core.

In the above cases, since the cavity or the non-magnetic material acts as the magnetic reluctance, it is possible to reduce the leakage flux flowing from the pole to the interpole effectively.

According to the 25th aspect of the invention, the object of the present invention described above can be also accomplished by a reluctance type rotating machine comprising:
 a stator having armature windings;
 a rotor having a rotor core, the rotor being provided, in a circumferential direction thereof, with a magnetic unevenness and also defining magnetic poles and interpoles in the rotor core by turns;
 a plurality of permanent magnets arranged in the rotor core along directions of respective poles of the rotor, for negating armature flux passing between adjoining poles defined in the rotor; and
 a conductor arranged on a peripheral portion of the rotor core, for generating an induced current in the conductor.

With the above-mentioned arrangement of the conductor, an induced electromotive force is produced in the conductor owing to the electromagnetic induction at the machine's starting, thereby accomplishing the self-starting of the rotating machine.

While, since the permanent magnets are magnetized so as to negate the armature flux passing the interpoles, each magnetic reluctance in the direction along each interpole is increased to produce an unevenness in the magnetic flux density at the gap between the stator and the rotor. Thus, a great torque can be produced in the rotating machine by the resultant change in magnetic energy.

According to the 26th aspect of the invention, in the machine of the 25th aspect, the conductor is constituted by a plurality of magnetic bars which are embedded in the vicinity of an outer face of each pole of the rotor core so as to extend in the axial direction of the rotor.

In this case, owing to the provision of the magnetic bars as the conductor, the machine is capable of self-starting by their conductivity. Additionally, as the bars are made of magnetic material, the density of flux (main flux) flowing the poles is not reduced, so that there is no possibility to exert an influence on the machine torque.

According to the 27th aspect of the invention, in the machine of the 26th aspect, the rotor has cavities formed in respective core portions outside the permanent magnets in the radial direction of the rotor.

In this case, the magnetic circuit is interrupted by each of the cavities, so that the magnetic reluctance of the interpoles is further increased. Therefore, the change in magnetic energy between each pole and each interpole is so increased thereby to generate a great torque.

According to the 28th aspect of the invention, in the machine of the 27th aspect, the rotor core is provided, in the vicinity of an outer face of each interpole, with a plurality of non-magnetic conductor bars extending in the axial direction of the rotor and generating an induced current therein.

In this case, owing to the addition of the non-magnetic conductor bars, the self-starting characteristic of the machine is further progressed. Further, the non-magnetism of the bars allows the magnetic reluctance of the interpoles to be increased furthermore, so that the change in magnetic energy is further increased.

According to the 29th aspect of the invention, in the machine of the 28th. aspect, the cavities of the rotor are filled up with part a plurality of non-magnetic conductor bars extending in the axial direction of the rotor and generating an induced current therein.

In this case, since the magnetic circuit is interrupted by the non-magnetic conductor bar in each cavity, the magnetic reluctance of the interpoles is further increased in comparison with the case of only providing the cavities in the interpoles. Further, the strength of the rotor per se is improved by embedding the bars in the cavities.

According to the 30th aspect of the invention, in the machine of the 25th aspect, the conductor comprises a plurality of deep groove magnetic bars which are embedded in the vicinity of an outer face of each pole of the rotor core so as to extend in the axial direction of the rotor and a plurality of non-magnetic bars which are embedded in the vicinity of an outer face of each interpole of the rotor core so as to extend in the axial direction of the rotor.

In this case, since the conductive bars are embedded along the whole periphery of the rotor core, the starting capability similar to a case of using an exclusive starting cage can be attained by the conductivity of the bars. Further, owing to respective material choices for the poles and interpoles, a difference in magnetic reluctance between each pole and each interpole is increased. Consequently, the change in magnetic energy is further increased.

According to the 31st aspect of the invention, in the machine of the 25th aspect, the conductor is constituted by a plurality of non-magnetic bars which are embedded in the vicinity of an outer face of each interpole of the rotor core so as to extend in the axial direction of the rotor.

In this case, the magnetic reluctance in the interpoles is increased by the non-magnetism of the non-magnetic bars. Further, since the poles is provided with no bar, the structure of the rotor is simplified.

According to the 32nd aspect of the invention, in the machine of the 25th aspect, the conductor is adapted so as to cover an outer face of the rotor core.

In this case, since the induced current flows in the outer periphery of the rotor smoothly due to the conductivity of the conductor at the machine's starting, the machine is capable of starting by itself. In addition, since the rotor is covered with the conductor, the mechanical strength of the rotor can be improved.

According to the 33rd aspect of the invention, in the machine of the 32nd aspect, the conductor has a cylindrical shape so as to cover the whole outer face of the rotor core.

Then, in addition to the improved self-starting capability, the cylindrical conductor allows the mechanical strength to be improved with its simple structure.

According to the 34th aspect of the invention, in the machine of the 32nd aspect, the conductor is constituted by a plurality of shell members connected with the outer faces of the poles to cover the interpoles.

In this case, since the shell members are connected with the outer faces of the poles, the air resistance (or windage loss) during the rotor's rotation is reduced thereby to enhance a rotational efficiency of the rotor.

According to the 35th aspect of the invention, in the machine of the 25th aspect, the conductor is arranged in the vicinity of an outer face of each interpole of the rotor core and curved along the circumferential direction of the rotor.

In this case, when the machine is starting, the induced current flows in the interpoles, allowing the self-starting of the rotor.

According to the 36th aspect of the invention, in the machine of the 25th aspect, the conductor has a plurality of slits formed in a cylindrical portion of the rotor core and arranged along the circumferential direction of the rotor.

Due to the formation of the slits, the induced current at the machine's starting flows while defining a long path in the axial and circumferential directions of the rotor. Consequently, the magnetic coupling between the armature windings and the rotor is reinforced to provide a great starting torque for the rotor.

According to the 37th aspect of the invention, in the machine of the 36th aspect, the conductor is formed so as to cover the outer face of the rotor core.

In this case, since the induced current flows in the outer periphery of the rotor smoothly, it facilitates the self-starting of the machine furthermore. In addition, since the rotor is covered with the conductor, the mechanical strength of the rotor can be further improved.

According to the 38th aspect of the invention, in the machine of the 37th aspect, the conductor has a cylindrical shape so as to cover the whole outer face of the rotor core.

Then, in addition to the improved self-starting capability, the cylindrical conductor allows the mechanical strength to be improved with its simple structure. Moreover, the air resistance (or windage loss) during the rotor's rotation is reduced thereby to enhance the rotational efficiency of the rotor.

According to the 39th aspect of the invention, in the machine of the 38th aspect, the conductor is constituted by a plurality of shell members connected with the outer faces of the poles to cover the interpoles.

Also in this case, since the shell members are connected with the outer faces of the poles, it is possible to reduce the air resistance (or windage loss) during the rotor's rotation, whereby the rotational efficiency of the rotor can be enhanced.

According to the 40th aspect of the invention, in the machine of the 36th aspect, the conductor is arranged in the vicinity of an outer face of each interpole of the rotor core and curved along the circumferential direction of the rotor.

Also in this case, when the machine is starting, the induced current flows in the interpoles, allowing the self-starting of the rotor.

According to the 41th aspect of the invention, in the machine of the 37th or the 38th aspect, the conductor is made of conductive magnetic material.

Then, it is possible to make the rotor's magnetic reluctance against the main flux smaller while making the main flux larger. Furthermore, since the slipping gets smaller at the machine's pulling-in, the machine is capable of starting and pulling-in with respect to such a load as requiring a large torque to drive.

According to the 42nd aspect of the invention, the object of the present invention described above can be also accomplished by a reluctance type rotating machine comprising:

a stator having armature windings;

a rotor consisting of a rotor core and an annular member outside the rotor core; and wherein the rotor core includes a plurality of poles each consisting of a core portion projecting outward in the radial direction of the rotor and a plurality of interpoles each disposed between the adjoining poles in the circumferential direction of the rotor; and the annular member is fitted to the rotor core so as to surround the peripheries of the poles.

In this case, since the peripheries of the poles of the rotor core is covered with the annular member, the interpoles of the rotor is reinforced to allow the bridge portions of the interpoles to be thinned. Therefore, the leakage of the q-axis flux through the bridge portions is reduced to enhance the magnetic reluctance of the interpoles.

According to the 43rd aspect of the invention, in the machine of the 42nd aspect, the rotor is provided, on respective side faces of the poles in the circumferential direction, with a plurality of permanent magnets which are magnetized so as to negate armature flux passing through the interpoles.

In this case, since the permanent magnets' flux opposes the q-axis flux, the magnetic reluctance in the interpoles is enhanced to improve the output of the machine, According to the 44th aspect of the invention, in the machine of the 40th. aspect, the annular member is made of magnetic material.

In this case, the d-axis flux is easy to pass through the pole portions, so that the main flux can be increased.

According to the 45th aspect of the invention, in the machine of the 42nd. aspect, the annular member is constituted by material of which saturation flux density is lower than that of material forming the rotor core.

In this case, the resultant rotor (rotor core and annular member) has a lowered saturation flux density in the bridge portions in comparison with the conventional rotor where the adjoining poles are connected with each other through the rotor core material in the interpole. Thus, the magnetic reluctance can be enhanced in spite of the bridge portions of the identical thickness.

According to the 46th aspect of the invention, there is also provided a method of manufacturing a rotor of a rotating machine, comprising the steps of:

preparing a rotor core having a plurality of poles each consisting of a core portion projecting outward in the radial direction of the rotor and a plurality of interpoles each disposed between the adjoining poles in the circumferential direction of the rotor;

arranging a plurality of permanent magnets before magnetization on respective side faces of the poles in the circumferential direction of the rotor, setting the rotor core on a magnetizing unit thereby to magnetize the permanent magnets; and thereafter, fitting an annular member to the rotor core in a manner that the annular member surrounds the peripheries of the poles.

Since the rotor core to be prepared in the above method is provided with the pole projecting outward in the radial direction of the rotor and the interpoles each disposed between the adjoining poles, it is possible to approach the pre-magnetized magnets, which are attached to the rotor core, to a magnetizer easily, facilitating the magnetizing operation for the permanent magnets, According to the 47th aspect of the invention, there is also provided a method of manufacturing a rotor of a rotating machine, comprising the steps of:

preparing a rotor core having a plurality of poles each consisting of a core portion projecting outward in the radial direction of the rotor and a plurality of interpoles each disposed between the adjoining poles in the circumferential direction of the rotor;

arranging a plurality of permanent magnets after magnetization on respective side faces of the poles in the circumferential direction of the rotor; and thereafter, fitting an annular member to the rotor core in a manner that the annular member surrounds the peripheries of the poles.

Also in this case, it is possible to easily insert the magnetized magnets into spaces each interposed between the poles from the outside in the radial direction of the rotor, facilitating the assembling operation of the rotor.

These and other objects and features of the present invention will become more fully apparent from the following description and appended claims taken in conjunction with the accompany drawing.

DESCRIPTION OF THE PREFERRED EMBODIMENT

Figure 1:
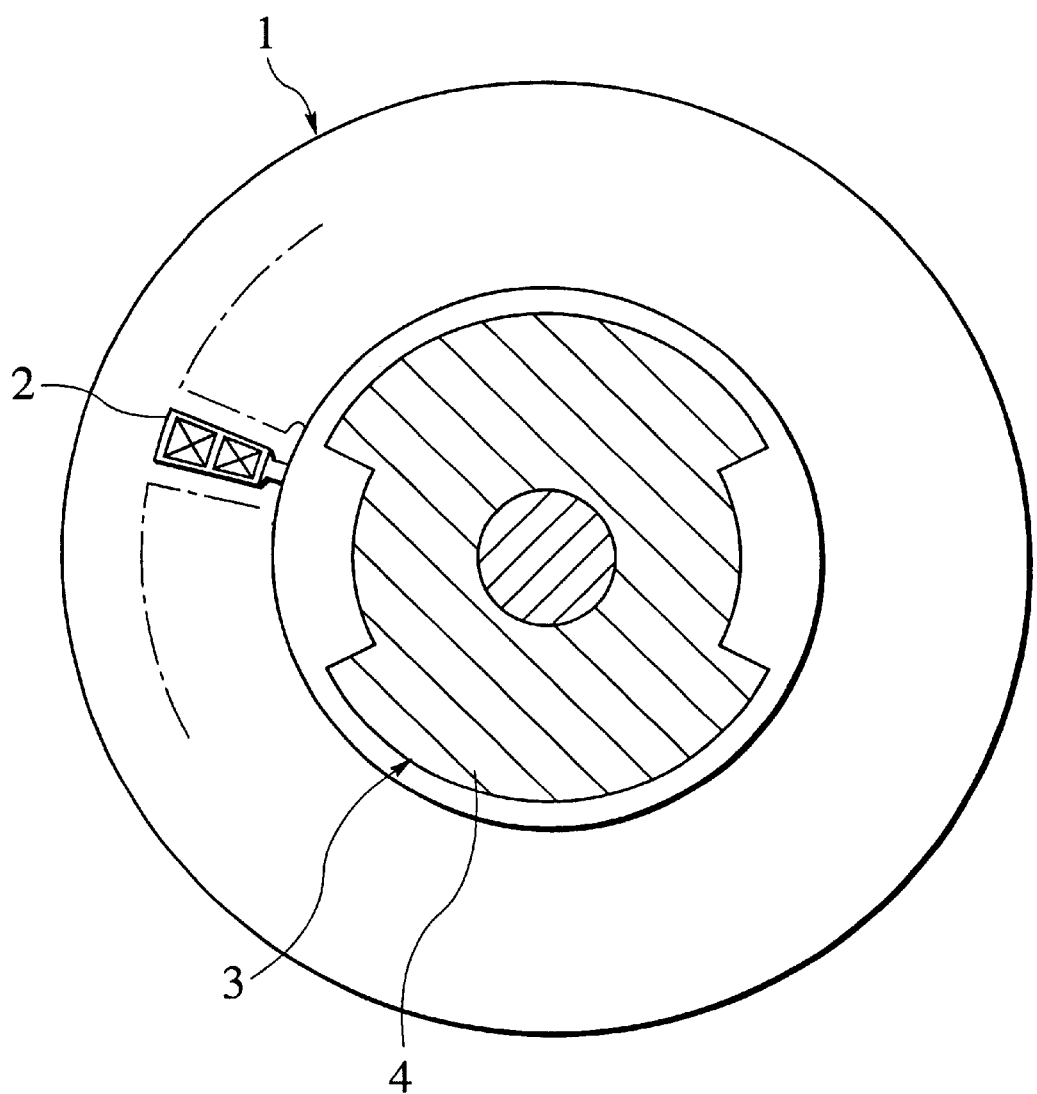
FIG. 1 is a cross sectional view of an earlier reluctance type rotating machine, taken along a radial direction thereof.

A great number of embodiments of the present invention will be described with reference to the drawings. Note, common elements in some groups of the embodiments are indicated with the same reference numerals, respectively.

[1st embodiment]

Figure 2:
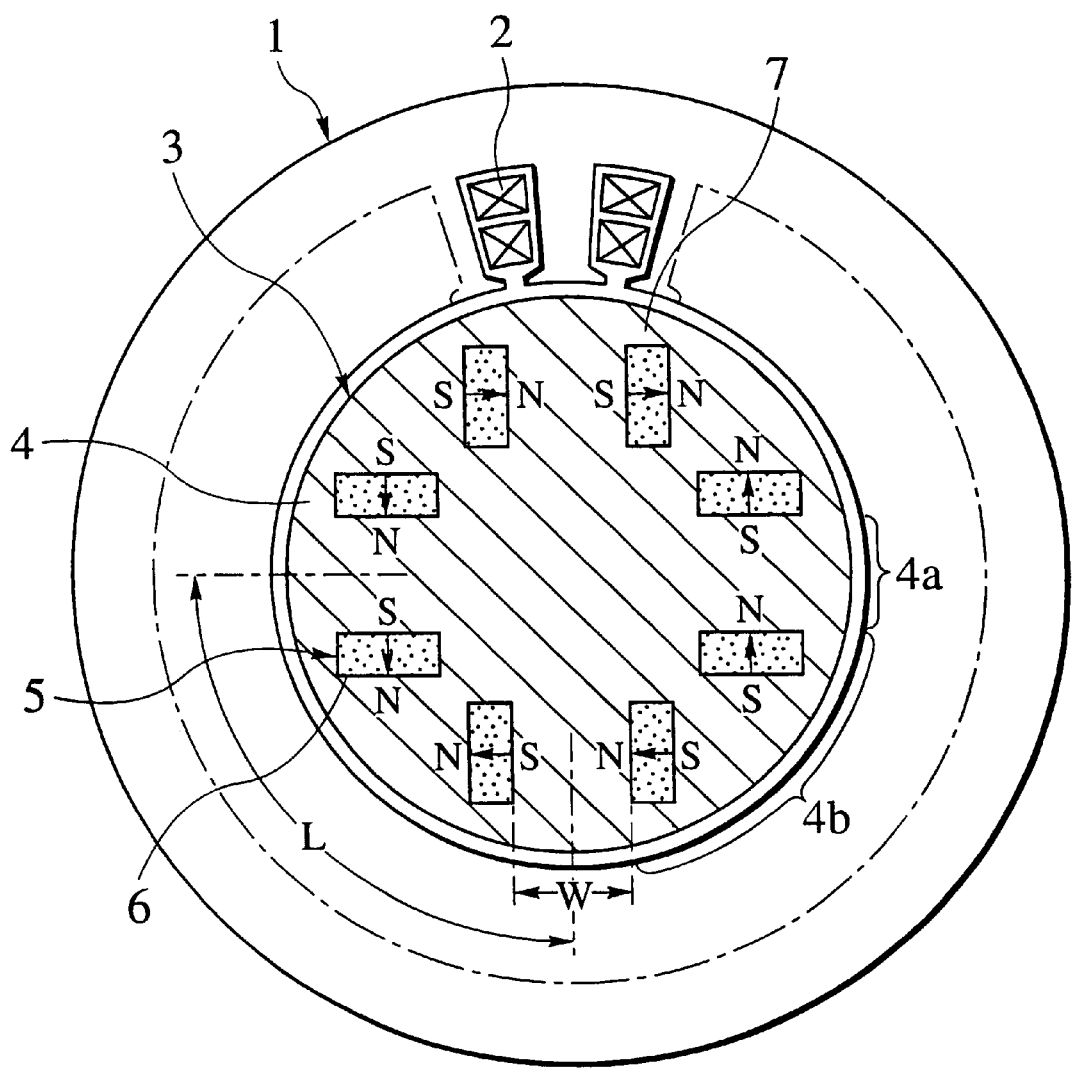
FIG. 2 is a cross sectional view of a reluctance type rotating machine in accordance with first, second, ninth, tenth and eleventh embodiments of the present invention, taken along the radial direction of the machine.

FIG. 2 is a cross sectional view of a reluctance type rotating machine in accordance with the first embodiment of the present invention, taken along the radial direction of a rotor of the machine. In FIG. 2, a stator 1 includes armature windings 2 and accommodates a rotor 3 therein. The rotor 3 includes a rotor core 4 and permanent magnets 6. The rotor core 4 defines both easy-directions and hard-directions for magnetization. That is, according to the embodiment, the rotor core 4 is composed of a plurality of laminated electromagnetic steel plates each having cavities 5 formed for accommodating eight permanent magnets therein. The eight cavities 5 are arranged in a cross manner, forming four salient-poles. Thus, each core portion interposed between two parallel cavities 5 forms a magnetic projection to provide each pole 4a (magnetic pole portion), while each core portion between two adjacent cavities 5 in the vertical relationship forms a magnetic recess to provide an interpole 4b (magnetic interpole portion). Further arranged in the cavities 5 are permanent magnets 6 each of which is magnetized so as to negate flux of armature current flowing between the adjacent poles 4a (i.e. interpole 4b). That is, the permanent magnets 6 on both sides of each pole 4a are identical to each other in terms of the magnetizing direction, while the magnetizing directions of the permanent magnets 6 on both sides of each interpole 4b are opposite to each other in the circumferential direction of the rotor 3. Preferably, the permanent magnets 6 are magnetized in the substantially-circumferential direction and more preferably, they are magnetized in respective directions substantially perpendicular to the pole axes. Recommended for the permanent magnets 6 is rare-earth permanent magnets of high energy product, preferably, Nd—Fe—B permanent magnets.

A magnetic portion 7 is ensured between each pole 4a and each interpole 4b and also between the end of each permanent magnet 6 and the periphery of the rotor core 4 in a manner that 30 to 60% of flux that the permanent magnets 6 generate at the machine's no-excitation does distribute in the rotor 3. Since the permanent magnets 6 are arranged on the sufficient inside of the rotor core 4 in this embodiment, the flux of the permanent magnets 6 is magnetically closed in a short-circuit through the magnetic portions 7 as magnetic paths. The radial thickness of each magnetic portion 7 and the thickness and surface area of each permanent magnet 6 are determined so that, preferably, 30 to 40% of flux of the permanent magnets 6 is distributed in the rotor 3 when the machine is not excited. Further, the radial thickness of each magnetic portion 7 and the thickness and surface area of each permanent magnet 6 are also determined so that, when the machine is loaded, the interlinkage flux of the windings 2 by the permanent magnets 6 amounts to 10 to 60% of composite interlinkage flux of the currents and permanent magnets, more preferably, 30 to 50% of the same.

Further, the radial thickness of each magnetic portion 7 and the thickness and surface area of each permanent magnet 6 are also determined so that, in the magnetic flux of the permanent magnets 6 at an air gap, the amplitude in a fundamental component of the magnetic flux density of the permanent magnets 6 is 0.2 to 0.6 T, more preferably 0.35 to 0.45 T.

According to the embodiment, a circular thickness W of the pole 4a in the circumferential direction is established to be 0.3 to 0.5 times as long as a pole pitch L (a circumferential distance from the center of a pole to that of the neighboring pole).

Next, we describe the operation of the rotating machine.

Figure 3:
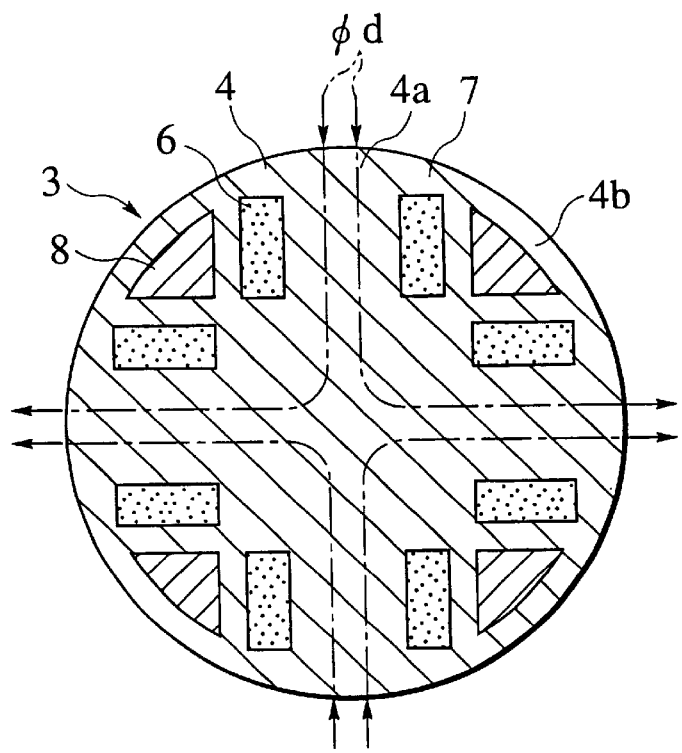
FIG. 3 is a cross sectional view of the reluctance type rotating machine in accordance with the 1st. to 14th. embodiments, showing the flows of magnetic flux due to armature currents along the directions of pole axes.

FIG. 3 shows the flux $\phi d$ by the d-axis armature current along the directions of pole axes of the rotor core 4. In the shown structure, since the magnetic path is constituted by the core of the poles 4a, the flux is easy to flow because the magnetic reluctance is remarkably small. Note, in FIG. 3, reference numeral 8 designates one of non-magnetic portions.

Figure 4:
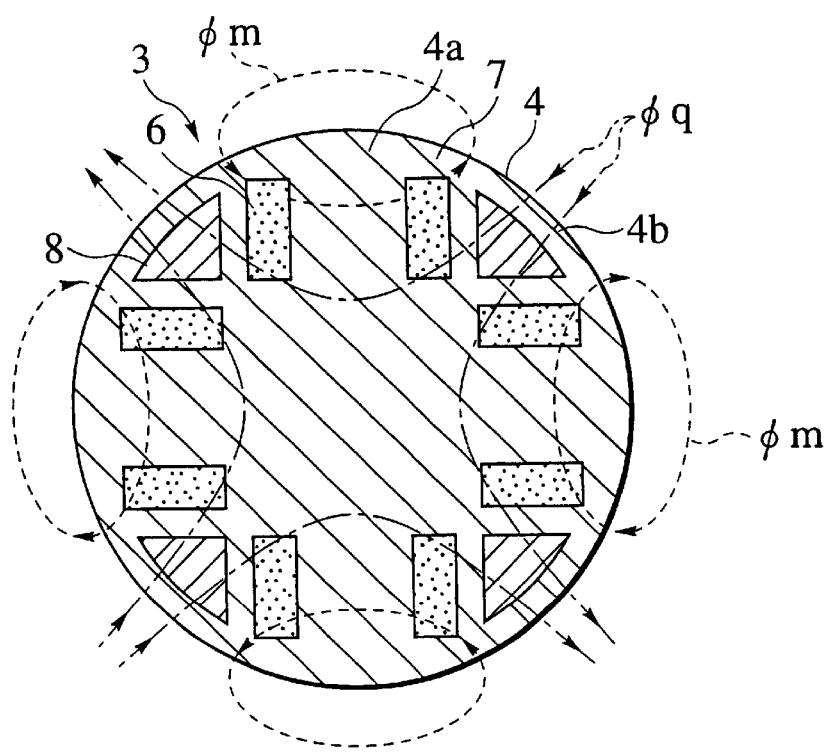
FIG. 4 is a cross sectional view of the reluctance type rotating machine in accordance with the 1st. to 14th. embodiments, showing the flows of magnetic flux due to armature currents along the directions of interpole axes.

FIG. 4 shows the flux $\phi q$ by the q-axis armature current along the directions of radial axes passing the centers of the interpoles 4b. Although the magnetic flux $\phi q$ of the interpoles 4b forms the magnetic paths crossing the permanent magnets 6 in the interpoles 4b, the flux by the armature current is reduced by the action of high reluctance of the permanent magnets 6 since the relative permeability of the permanent magnet 6 is substantially equal to 1.

Figure 5:
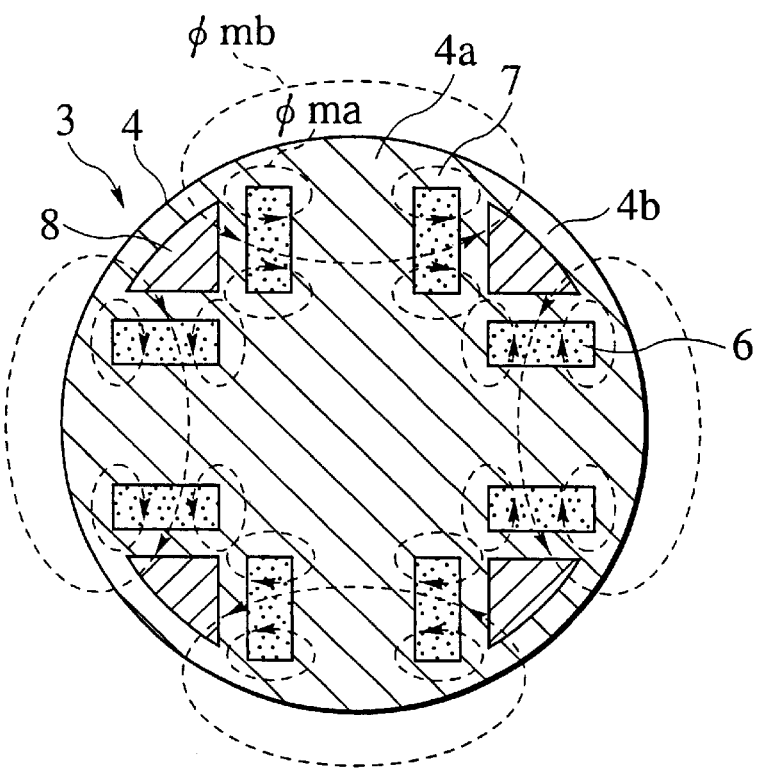
FIG. 5 is a cross sectional view of the reluctance type rotating machine in accordance with the 1st. to 14th. embodiments, showing the flows of magnetic flux due to permanent magnets.

Since the permanent magnets 6 are magnetized in the substantial perpendicular direction to the pole axes, the flux from one pole of each permanent magnet 6 flows the magnetic portion 7 in the vicinity of the periphery of the core 4 and the magnetic pole 4a and finally returns another pole of the magnet 6, forming a magnetic circuit $\phi ma$, as shown in FIG. 5. Further, the flux of each magnet 6 partially flows into the stator 1 through a clearance and returns to the magnet 6 via the neighboring permanent magnet 6 and the pole 4a, thereby defining a magnetic circuit $\phi mb$.

As shown in FIG. 4, since the inteTlinkage flux of the magnets 6 is distributed in the opposite direction to the magnetic flux $\phi q$ of the interpoles 4b, the interlinkage flux of the magnets 6 repels the armature flux $\phi q$ entering from the interpoles 4b for their mutual negation. In the gap portion above the interpoles 4b, the gap flux density produced by the armature current is reduced due to the flux of the permanent magnets 6 to change widely in comparison with the gap flux density above the poles. That is, the change of gap flux density is increased with respect to the position of the rotor 3, so that the change of magnetic energy grows larger. Further, owing to the provision of the magnetic portions 7 on the boundary between the poles and the interpoles, when the machine is loaded, the rotor is subjected to great magnetic saturation by load currents. Consequently, the magnetic flux of the magnets 6 distributing between the poles does increase. Thus, as there is produced a great unevenness in the distribution of gap flux owing to the magnetic reluctance and flux of the permanent magnets, the resultant magnetic energy is remarkably changed thereby to produce a large output.

Next, we describe the adjusting range of terminal voltage required for operating the machine at a wide range of variable speeds.

Since each permanent magnet is disposed only in the part of the interpole portion in the rotating machine of the embodiment, the surface area of the permanent magnet on the peripheral side of the rotor is smaller than that of the conventional rotating machine where the permanent magnets are arranged about the whole periphery of the rotor surface, so that the interlinkage flux by the magnets is also decreased.

Additionally, when the machine is not excited, considerable flux of the permanent magnets 6 flows the magnetic portions 7 to be leakage flux in the rotor core. Therefore, as the induced voltage can be minimized remarkably under this state, the core loss will be reduced when the machine is not excited. Further, when the windings 2 are closed in a short circuit, then the excess current will get smaller.

When loaded, the terminal voltage is induced since the interlinkage flux due to the armature current (an exciting current component and a torque current component of the reluctance rotating machine) is added to the interlinkage flux due to the permanent magnets 6.

In the permanent magnet type rotating machine, it is possible to adjust the terminal voltage because the interlinkage flux of the permanent magnets 6 occupies almost the whole terminal voltage. On the contrary, since the rotating machine of the invention has a small interlinkage flux of the permanent magnets 6, the wide adjustment of the exciting current component allows the terminal voltage to be adjusted over a wide range. That is, since the exciting current component can be adjusted so that the voltage is less than a power source voltage corresponding to the velocity, the rotating machine is capable of a wide range of variable-speed operation from the base speed at a constant voltage.

Further, as the rotating machine does not restrict the voltage by its forcible field-weakening control, there would be no possibility of the occurrence of over-voltage even if the control is not effected at the machine's rotation at high speed.

Additionally, since the partial flux $\phi$ ma of each permanent magnet 6 leaks through the magnetic portion 7 of the short circuit, it is possible to reduce diamagnetic field inside the permanent magnet 6. Thus, since an operating point on a demagnetizing curve expressing the B(magnetic flux)–H (field intensity) characteristics of the permanent magnet is elevated (causing a large permeance coefficient), the demagnetizing-proof characteristics with respect to both temperature and armature reaction is improved. Simultaneously, since the permanent magnets 6 are embedded in the rotor core 4, it acts as a retaining mechanism of the permanent magnets 6, so that the rotating machine can ensure its high-speed operation.

Since the circular thickness W of the pole 4a in the circumferential direction is established to be 0.3 to 0.5 times as long as the pole pitch L (the circumferential distance from the center of a pole to that of the neighboring pole), it is possible to increase the change of magnetic flux density distribution of the gap effectively, thereby accomplishing the high-output rotating machine.

[2nd Embodiment]

The reluctance type rotating machine of the 2nd. embodiment will be described with reference to FIG. 2.

In this embodiment, parts similar to those of the 1st. embodiment will be eliminated in the description.

According to the embodiment, the magnetic portion 7 is ensured between each pole 4a and each interpole 4b and also between the end of each permanent magnet 6 and the periphery of the rotor core 4 so that 80% or more of flux that the permanent magnets 6 generate at the machine's no-excitation does distribute in the rotor 3. Additionally, the radial thickness of each magnetic portion 7 and the thickness and surface area of each permanent magnet 6 are respectively formed thicker than those of the 1st. embodiment. In other words, they are determined so that, preferably, 90 to 95% of flux of the permanent magnets 6 is distributed in the rotor 3 at the machine's exciting.

Moreover, the radial thickness of each magnetic portion 7 and the thickness and surface area of each permanent magnet 6 are also determined so that, when the machine is loaded, the interlinkage flux of the windings 2 by the permanent magnets 6 amounts to 5% or more of composite interlinkage flux of the currents and permanent magnets, more preferably, 10 to 30% of the same.

Although the 2nd embodiment is similar to the 1st. embodiment in terms of the machine's basic operation, the induced voltage is remarkably small since 80% or more flux generated by the magnets 6 is distributed in the rotor 3. Consequently, even if the short circuit is caused in the power source or so, a current originating in the voltage induced by the permanent magnets 6 is so insignificant to prevent the machine from being burned or braked excessively.

Furthermore, the rotating machine of the 2nd. embodiment operates as follows. Since almost all the flux of each permanent magnet 6 leaks through the magnetic portion 7 of the short circuit, it is possible to reduce diamagnetic field inside the permanent magnet 6 remarkably. Thus, since an operating point on the demagnetizing curve expressing the B(magnetic flux)–H(field intensity) characteristics of the permanent magnet is also elevated (causing a large permeance coefficient), it is possible to use the permanent magnets having a deteriorated temperature characteristic, at a temperature of 50 to 200° C. For example, even if flowing a large current of two or three times as large as a rated current in an atmosphere of high-temperature, it is possible to use the Md—Fe—B magnet, which has a high magnetic energy product (40 MGOe) in spite of the deteriorated temperature characteristic, without being demagnetized owing to its armature reaction.

[3rd embodiment]

Figure 6:
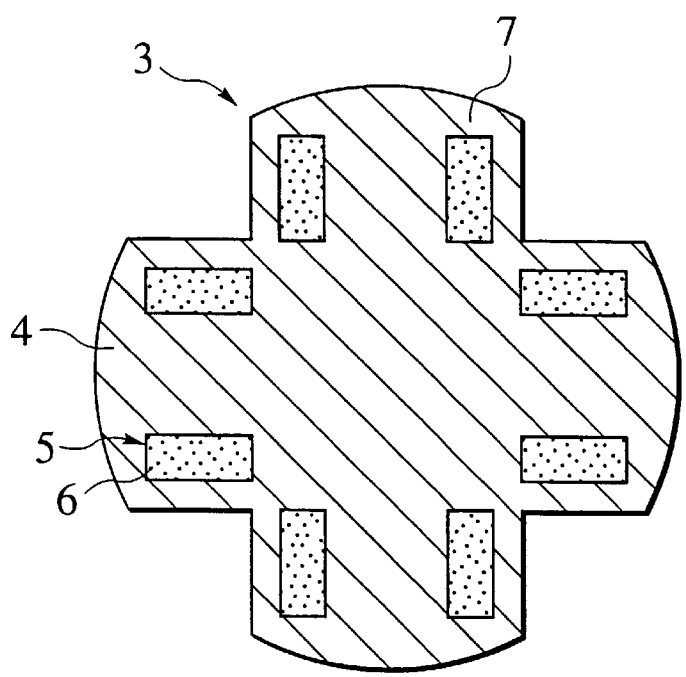
FIG. 6 is a cross sectional view of a rotor of the reluctance type rotating machine in accordance with the 3rd. embodiment of the present invention, taken along the radial direction of the machine.

FIG. 6 is a radial sectional view of a rotor of the reluctance type rotating machine of the 3rd. embodiment of the present invention.

According to this embodiment, the rotor core 4 is provided with a geometric unevenness. As the other constituents are similar to those of the 1st. and 2nd. embodiments, their overlapping descriptions will be eliminated.

Owing to the provision of the geometric unevenness, the change of flux distribution about the gap is further enlarged and therefore, the reluctance torque is further increased.

[4th embodiment]

Figure 7:
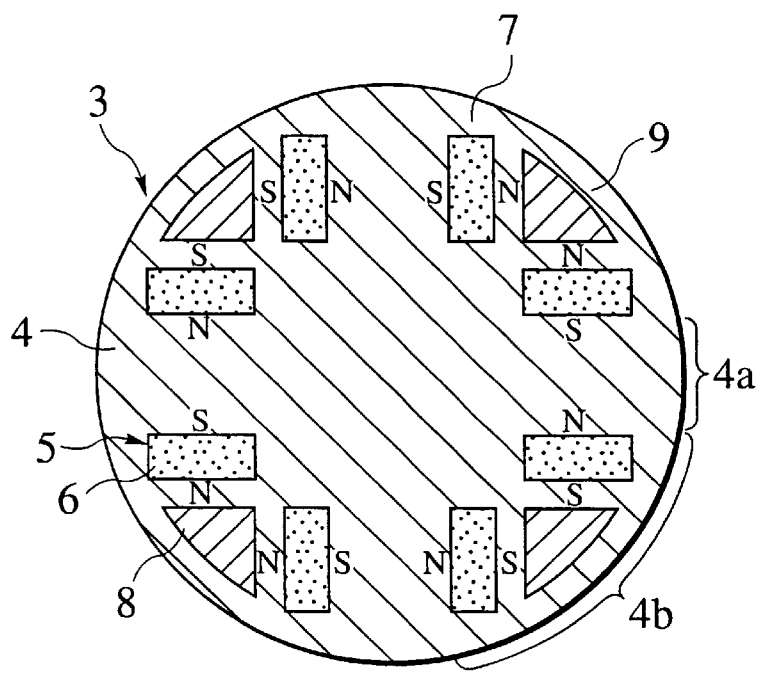
FIG. 7 is a cross sectional view of a rotor of the reluctance type rotating machine in accordance with the 4th. embodiment of the present invention, taken along the radial direction of the machine.

FIG. 7 is a radial sectional view of a rotor of the reluctance type rotating machine of the 4th. embodiment of the present invention.

According to this embodiment, the rotor core 4 is provided, at a center of each interpole 4b, with a cavity 8 having a fan-shaped section as a first non-magnetic part. Provided on the periphery of each cavity 8 is a magnetic portion 9 which operates to connect the pole 4a with the neighboring pole 4a magnetically. As the other constituents are similar to those of the 1st. embodiment, their overlapping descriptions will be eliminated.

Since the non-magnetic portion is defined between the adjoining poles 4b by the fan-shaped cavity 8, the magnetic reluctance in the interpole direction is remarkably increased. Consequently, the reluctance torque is remarkably increased. Furthermore, the interlinkage flux of the magnets 6 from the interpoles 4b is restricted by the fan-shaped cavities 8. Therefore, the torque due to the permanent magnets and current decreases, while the reluctance torque increases. That is, without lowering both torque and output, it is possible to reduce the induced voltage due to the permanent magnets 6.

Additionally, owing to the provision of the magnetic portions 9 each of which connects the adjoining poles 4a with each other, the rotor core 4 uniformly spreads over the whole periphery of the rotor 3 with respect to core teeth of the stator 1. Consequently, the change of magnetic reluctance caused by slots of the stator 1 gets smaller while decreasing the slot ripple. Further, the smooth surface of the rotor 3 allows the windage loss to be reduced. It is also possible to restrict the demagnetizing field, which is caused by the armature current acting on the permanent magnets 6, owing to the magnetic portions 9 outside the interpoles 4b.

[5th Embodiment]

Figure 8:
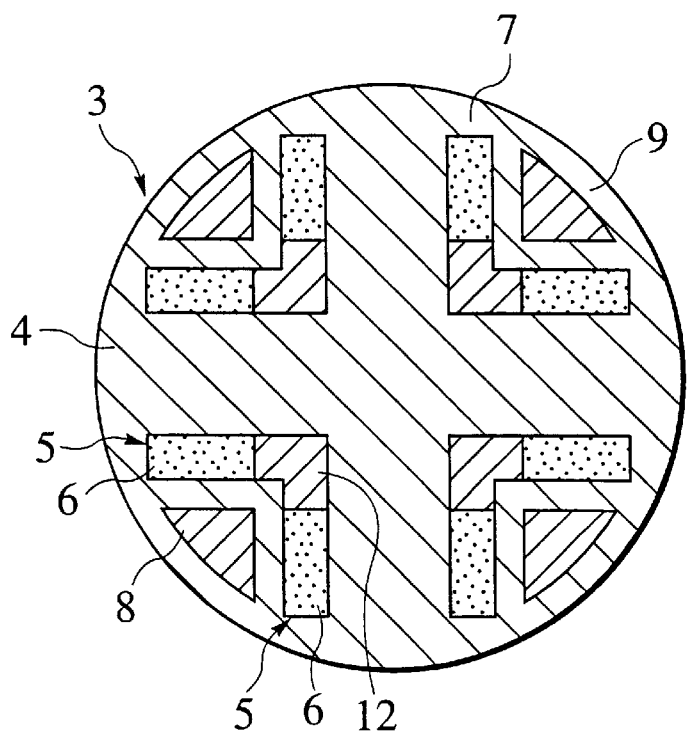
FIG. 8 is a cross sectional view of a rotor of the reluctance type rotating machine in accordance with the 5th. embodiment of the present invention, taken along the radial direction of the machine.

FIG. 8 is a radial sectional view of a rotor of the reluctance type rotating machine of the 5th. embodiment of the present invention.

In the rotating machine of this embodiment, a shortened permanent magnet 6 and an aluminum material 12 as a second non-magnetic part are provided in each cavity 5 of the rotor core 4. As the other constituents are similar to those of the 1st. and 4th. embodiment, their overlapping descriptions will be eliminated. As the other constituents are similar to those of the 1st. embodiment, their overlapping descriptions will be eliminated.

Owing to the provision of the non-magnetic aluminum material 12 on the inner end of each permanent magnet 6, it is possible to prevent the flux from leaking into the interpole direction, whereby the reduction of reluctance torque can be restricted. Further, it is possible to decrease the leakage of flux from the permanent magnet 6 on the inner side of the core 4. Therefore, it is possible to reduce a volume of each permanent magnet 6 without remarkably deteriorating the output characteristic of the machine.

[6th embodiment]

Figure 9:
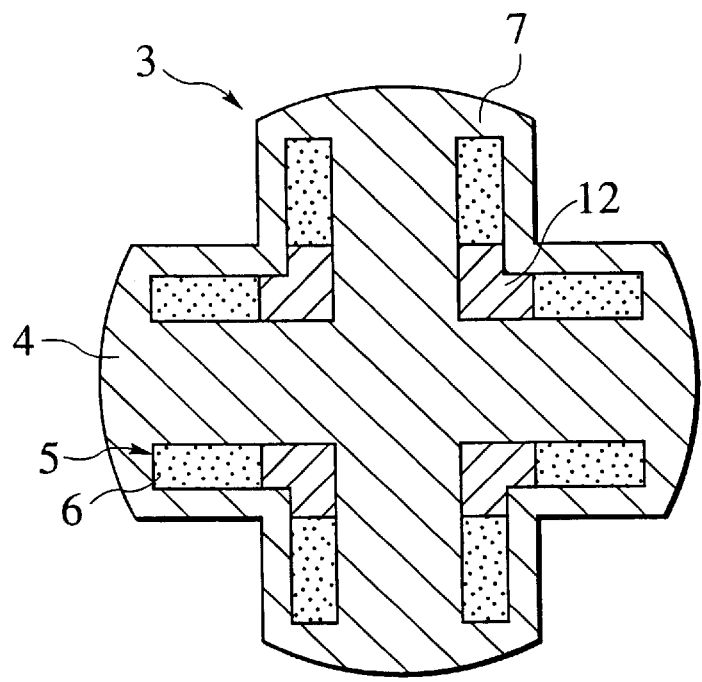
FIG. 9 is a cross sectional view of a rotor of the reluctance type rotating machine in accordance with the 6th. embodiment of the present invention, taken along the radial direction of the machine.

FIG. 9 is a radial sectional view of a rotor of the reluctance type rotating machine of the 6th. embodiment of the present invention.

According to the embodiment, the rotor core 4 is provided, on a periphery thereof, with a geometric unevenness. As other constituents are similar to those of the 1st. and 5th. embodiments, overlapping descriptions are eliminated.

Owing to the provision of the geometric unevenness, the change of flux distribution about the gap is further increased, so that the reluctance torque is further increased. As to the other operation and effect, this embodiment is similar to the 1st. and 5th. embodiments.

[7th Embodiment]

Figure 10:
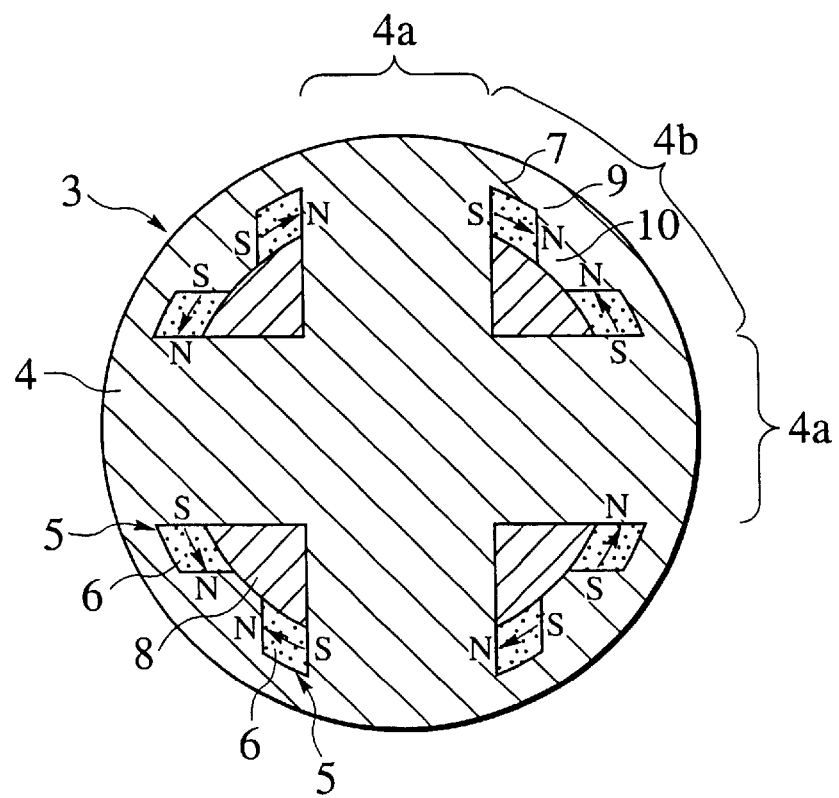
FIG. 10 is a cross sectional view of a rotor of the reluctance type rotating machine in accordance with the 7th. embodiment of the present invention, taken along the radial direction of the machine.

FIG. 10 is a radial sectional view of a rotor of the reluctance type rotating machine of the 7th. embodiment of the present invention.

According to the embodiment, in each interpole 4b of the core 4, two permanent magnets 6 are arranged in the vicinity of the periphery of the rotor core and magnetized in the circumferential direction of the rotor 3. These permanent magnets 6 are characterized by their magnetizing directions opposing with each other and arranged so as to form a magnetic circuit by a magnetic portion 10 at the center of the interpole axis and the magnetic portion 9 as the magnetic paths. Further, the fan-shaped cavity 8 is formed on the inner peripheral side of the permanent magnets 6 and the magnetic portion 10 interposed therebetween. As other constituents are similar to those of the 1st. embodiment, their overlapping descriptions are eliminated.

Owing to the provision of the fan-shaped cavities 8 as the first non-magnetic parts, it is possible to provide a rotor where the flux of the permanent magnets 6 is distributed the outer magnetic portions 9 of the rotor and the stator 1 without a large increase of magnetic reluctance outside the magnets 6. That is, since the fan-shaped cavities 8 do not increase the magnetic reluctance outside the permanent magnets 6, it is possible to ensure the sufficient flux in spite of small quantity of permanent magnets.

Further, the flux of each permanent magnet 8 is interrupted by each cavity 8 as the first non-magnetic part and closed in a short circuit through the outer magnetic portion 9 as the magnetic path. When the flux due to the load current overlaps, each magnetic portion 7 between the pole 4a and the interpole 4b and the outer magnetic portion 9 are subjected to the magnetic saturation, so that the flux of the permanent magnets 6 closing in the rotor 3 interlinks with the armature windings 2 of the stator 1. Therefore, when the machine is not loaded, the induced voltage due to the interlinkage flux of the permanent magnets 6 is so small, whereby the flux of the permanent magnets 6 can be utilized effectively under the loaded condition. As to the other operation and effect, this embodiment is similar to the 1st. embodiment.

[8th Embodiment]

Figure 11:
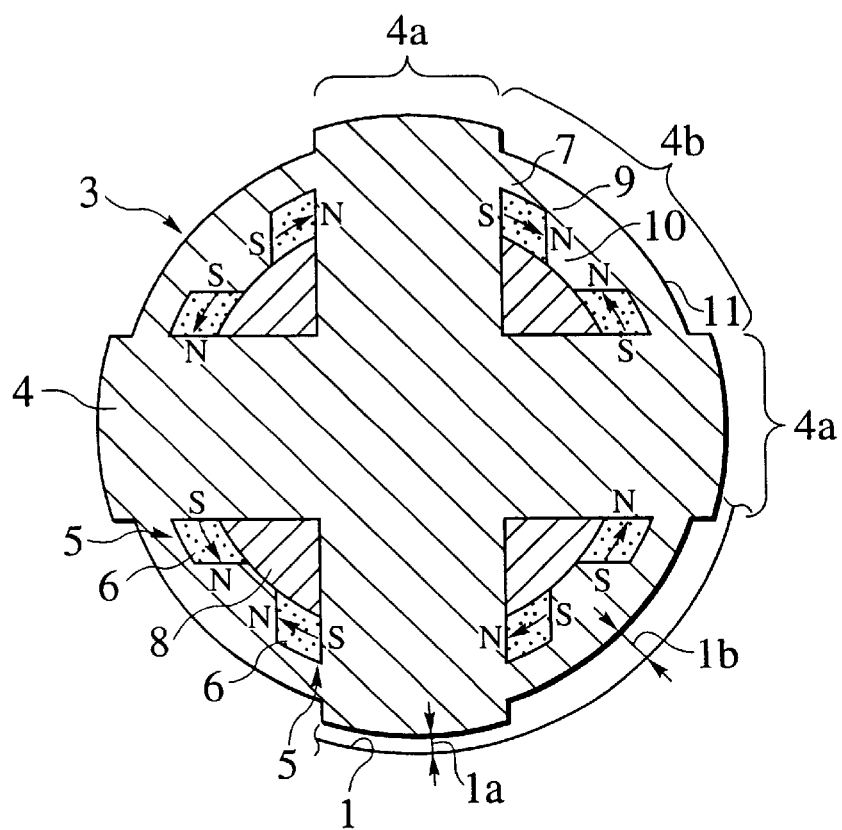
FIG. 11 is a cross sectional view of a rotor of the reluctance type rotating machine in accordance with the 8th. embodiment of the present invention, taken along the radial direction of the machine.

FIG. 11 is a radial sectional view of a rotor of the reluctance type rotating machine of the 8th. embodiment of the present invention. The rotating machine of the embodiment is characterized in that, as to the gap between the rotor core 4 and the stator 1, a gap length about the interpole 4b in the radial direction is larger than that about the pole 4a. For example, the gap length 1a of the pole 4a is equal to 0.6 mm, while the gap length 1b of the interpole 1b is set to 1.8 mm. As other constituents are similar to those of the 1st. and 7th. embodiment, their overlapping descriptions are eliminated.

Since the gap length 1a of the pole 4a is smaller than the gap length 1b of the interpole 1b, the magnetic unevenness is enlarged, so that the reluctance torque does increase. Simultaneously, since the circumferential gap length of the interpole 4b is relatively long, there is an increase in flux of each permanent magnet 6 closing in the rotor 3 through the magnetic portion 9 as the magnetic path, accompanying a decrease in flux of the permanent magnet 6 interlinking with the stator windings 2.

When the flux of current overlaps at the time of the machine being loaded, each magnetic portion 7 between the pole 4a and the interpole 4b and the outer magnetic portion 9 are locally subjected to the magnetic saturation, so that the flux of the permanent magnets 6 closing in the rotor 3 interlinks with the armature windings 2 of the stator 1. Therefore, when the machine is not loaded, the induced voltage due to the interlinkage flux of the permanent magnets 6 is so small, whereby the flux of the permanent magnets 6 can be utilized effectively under the loaded condition. As to the other operation and effect, this embodiment is similar to the 1st. and 7th. embodiments.

[9th embodiment]

The rotating machine of this embodiment is identical to that of the 1st. embodiment of FIGS. 1 to 4 with respect to the basic constitution and therefore, the overlapping descriptions are eliminated. According to the embodiment, there are established a radial thickness of each magnetic portion 7, thickness and surface area of the permanent magnet 6, a volume of the non-magnetic portion 8, a thickness of the magnetic portion between the non-magnetic portion 8 and the periphery of the core, etc. on the ground that, when the machine is loaded, the flux of armature current in the direction of the central axis of the interpole 4b negates the flux of each permanent magnet 6 and therefore, the resultant composite flux in the interpole direction amounts to substantial zero.

When applying the load current, the flux $\phi$ q of the armature current negates the flux $\phi$ m of the permanent magnets 6, so that the composite flux in the center axis of the interpole amounts to zero. Therefore, the voltage induced by the flux in the central axis of the interpole becomes to be zero, too. Thus, since the terminal voltage is induced by the flux in the direction of pole, low voltage and high output can be provided for the rotating machine.

Additionally, the constant output characteristic can be obtained with ease. As the reluctance torque is a product of both exciting current and torque current component of the armature, the output is obtained by a product of the exciting current, the torque current component and the rotating speed. Upon fixing the armature current component (torque current) forming the flux in the direction of interpole axis into a constant value so that the composite flux in the direction of center axis of the interpole amounts to zero, by adjusting the armature current component (exciting current) with respect to the rotating speed in inverse proportion to each other, the constant output characteristic- where torque times rotating speed is constant can be accomplished. As to the other operation and effect, this embodiment is similar to the 1st. embodiment.

[10th embodiment]

The rotating machine of this embodiment is identical to that of the 1st. embodiment of FIGS. 1 to 4 with respect to the basic constitution and therefore, the overlapping descriptions are eliminated. According to the embodiment, there are established a radial thickness of each magnetic portion 7, thickness and surface area of the permanent magnet 6, a volume of the non-magnetic portion 8, a thickness of the magnetic portion between the non-magnetic portion 8 and the periphery of the core, etc. on the ground that, when the armature current component forming the flux in the direction of center axis of the interpole is maximum, the flux $\phi$ q of armature current in the direction of the central axis of the interpole 4b negates the flux 4m of each permanent magnet 6 and therefore, the resultant composite flux in the interpole direction amounts to substantial zero.

In the embodiment, the maximum current for the rotating machine is divided into two vector components crossing at right angles, i.e., an armature current component forming the flux in the direction of center axis of the interpole and another armature current forming the flux in the direction of pole. When the maximum current of armature (composite vector) intersects the armature current component forming the flux in the direction of center axis of interpole at angles of 45 degrees, a maximum of reluctance torque can be obtained. The rotating machine of the embodiment is constructed in a manner that, at this current phase, the flux of armature current in the direction of the central axis of the interpole negates the flux of each permanent magnet 6 and therefore, the resultant composite flux in the interpole direction amounts to substantial zero. Therefore, when the induced voltage is raised during the machine's operation at a high rotating speed range, the machine allows the armature current component (i.e. exciting current component) forming the flux in the direction of pole to be adjusted smaller, whereby the constant induced voltage can be attained. Consequently, it is possible to realize a wide range of variable-speed operation and a high power factor under the constant output. As to the other operation and effect, this embodiment is similar to the 1st. embodiment.

[11th embodiment]

The rotating machine of this embodiment is identical to that of the 1st. embodiment of FIGS. 1 to 4 with respect to the basic constitution and therefore, the overlapping descriptions are eliminated. According to the embodiment, there are established a number of flux of the permanent magnets 6 interlinking with the armature windings in case of zero in armature current, a radial thickness of each magnetic portion 7, thickness and surface area of the permanent magnet 6, a volume of the non-magnetic portion 8, a thickness of the magnetic portion between the non-magnetic portion 8 and the periphery of the core, etc., so as to meet the following conditions. That is, in connection with the armature current produced by the flux of the permanent magnets 6 when the machine is electrically closed in a short circuit, the above factors are respectively determined in a manner that the heat derived from Joule-loss originating in the above armature current is less than a thermal allowable value of the machine or the braking force produced by the above armature current is less than an allowable value of the machine.

Generally, if there is remained any flux of the permanent magnets 6 which interlinks with the armature windings 2 when an electrical short-circuit accident is caused in an inverter, a terminal or the like, the rotation of the rotor 3 causes an induced voltage to be generated. Due to this induced voltage, the short-circuit current may flow in the armature windings for burning or an operation of the apparatus may be locked by excessive brake torque. As mentioned in the 1st. and 2nd. embodiments, since the high output of the machine is accomplished by the interlinkage flux from small number of permanent magnets 6, it is possible to reduce the induced voltage in order to establish both short-circuit current and brake less than the allowable values, respectively. Consequently, even if occurring the short-circuit accident, it would be possible to prevent troubles in the rotating machine and the apparatus. As to the other operation and effect, this embodiment is similar to the 1st. embodiment.

[12th embodiment]

The reluctance type rotating machine of this embodiment is provided by arranging the permanent magnets 6 between the adjoining poles of the rotor core 4 and fulfilling the cavities 8 as the first non-magnetic parts with copper or aluminum material. The rotating machine of this embodiment is identical to that of the 1st. and 4th. embodiments with respect to other constituents and therefore, the overlapping descriptions are eliminated.

With the arrangement of conductive materials of copper or aluminum in the cavities 8, an eddy current is generated in the conductive materials when the rotor 3 does not synchronize with the rotating field, so that the rotor can enter its synchronous rotation. That is, the self-starting and stable rotation of the rotating machine can be realized. As to the other operation and effect, this embodiment is similar to the 1st. and 4th. embodiments.

[13th embodiment]

Figure 12:
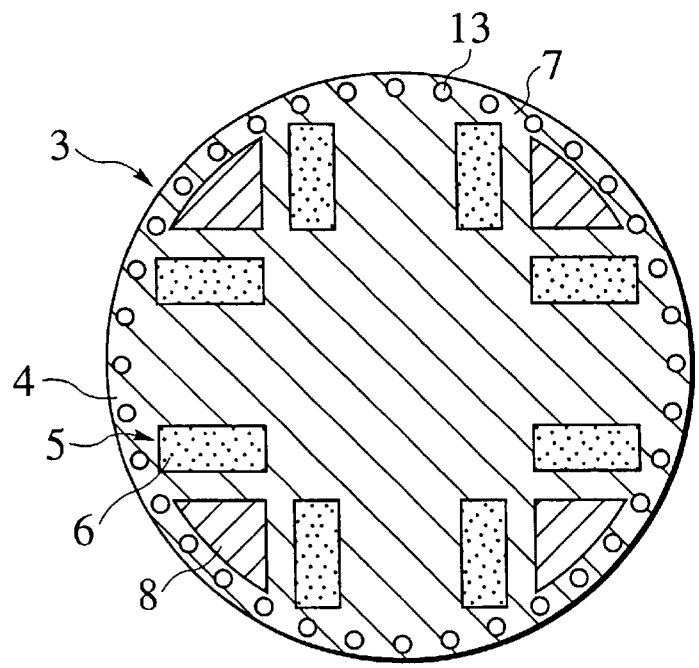
FIG. 12 is a cross sectional view of a rotor of the reluctance type rotating machine in accordance with the 13th. embodiment of the present invention, taken along the radial direction of the machine.

FIG. 12 is a radial sectional view of a rotor of the reluctance type rotating machine of the 13th. embodiment of the present invention.

According to the embodiment, many orifices are formed around the periphery of the rotor core 4 and copper bars 13 are inserted into the orifices, respectively. The copper bars 13 have respective ends electrically connected with each other. The rotating machine of this embodiment is identical to that of the 1st. and 4th. embodiments with respect to other constituents and therefore, the overlapping descriptions are eliminated.

Since the induced current flows in the copper bars 13 at the machine's asynchronous operation, the self-starting and stable rotation of the rotating machine can be realized. Further, it is possible to absorb the eddy current by harmonic current when driving the inverter. As to the other operation and effect, this embodiment is similar to the 1st. and 4th. embodiments.,

[14th embodiment]

Figure 13:
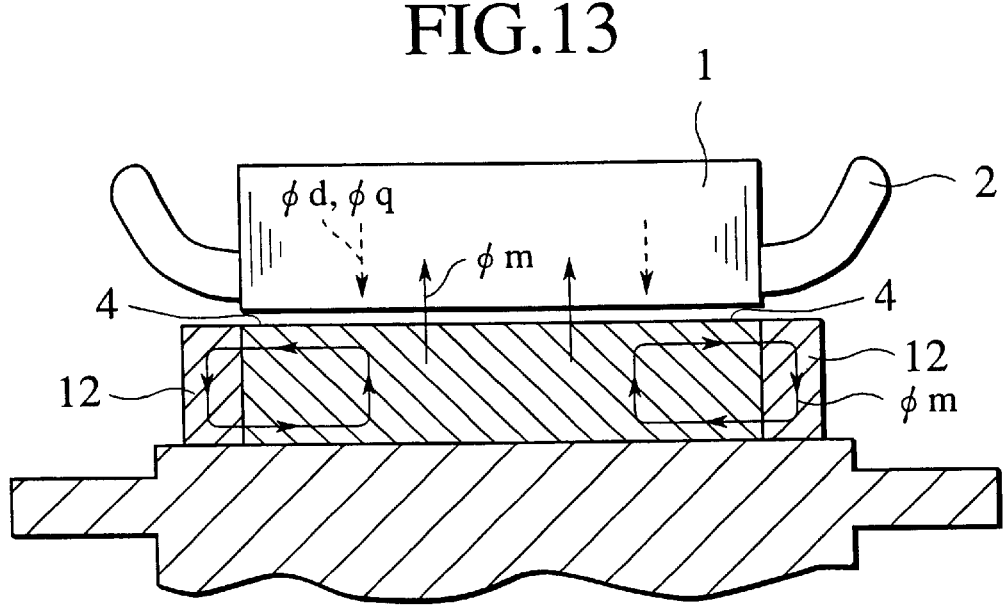
FIG. 13 is a cross sectional view of a rotor of the reluctance type rotating machine in accordance with the 14th. embodiment of the present invention, taken along the axial direction of the machine.
Figure 14:
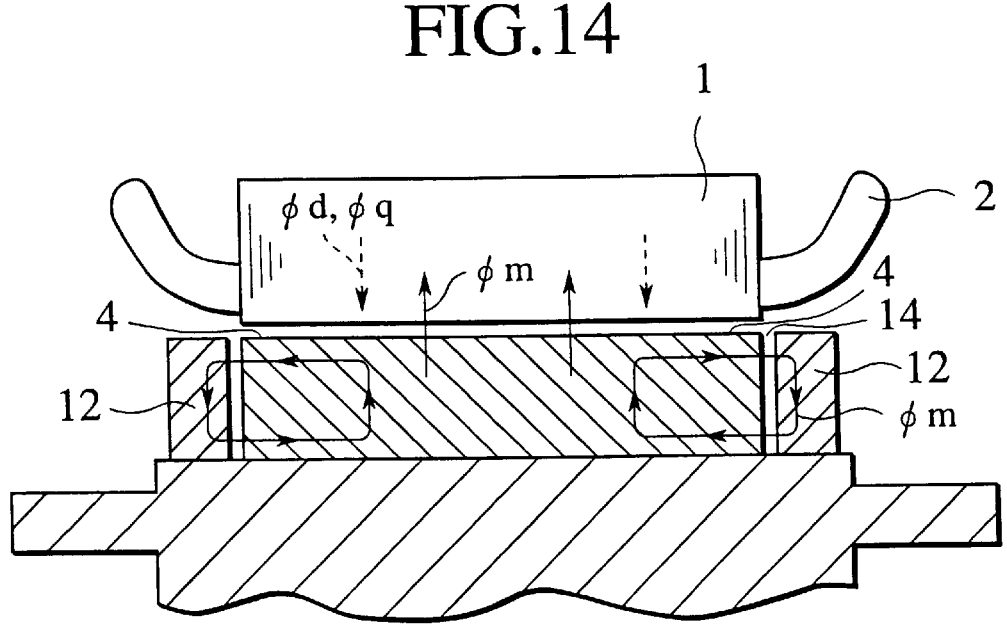
FIG. 14 is a cross sectional view of a rotor of the reluctance type rotating machine in accordance with the 14th. embodiment of the present invention, taken along the axial direction of the machine.

FIGS. 13 and 14 are axially sectional views of a rotor of the reluctance type rotating machine of the 14th. embodiment of the present invention.

The reluctance type rotating machine of the embodiment is characterized by a pair of magnetic end rings 12 disposed on both axial ends of the rotor core 4. The rotor 3 of the embodiment is constituted by the rotor core 4 and the end rings 12. The other constitution is similar to that of the rotating machine of the 1st. embodiment.

The rotating machine of the embodiment operates as follows.

When the rotor 3 is subjected to an armature reaction field in the opposite direction to the magnetized direction of each permanent magnet 6 in the rotor core 4 by the armature current, a part of magnetic flux φm of the permanent magnets 6 forms closed magnetic paths 51 each flowing the core 4 in the axial direction, entering into the end ring 12 and returning the core 4. That is, according to the embodiment, since the leakage flux can be produced effectively, it is possible to adjust the amount of interlinkage flux between the armature windings 2 and the permanent magnets 6, whereby the terminal voltage can be controlled by the armature current with ease. In addition, as shown in FIG. 14, it is possible to adjust the ratio of leakage flux to effective flux by controlling a clearance 13 between the rotor core 4 and each end ring 12. As to the other operation and effect, this embodiment is similar to the 1st. embodiment.

[15th embodiment]

Figure 15A:
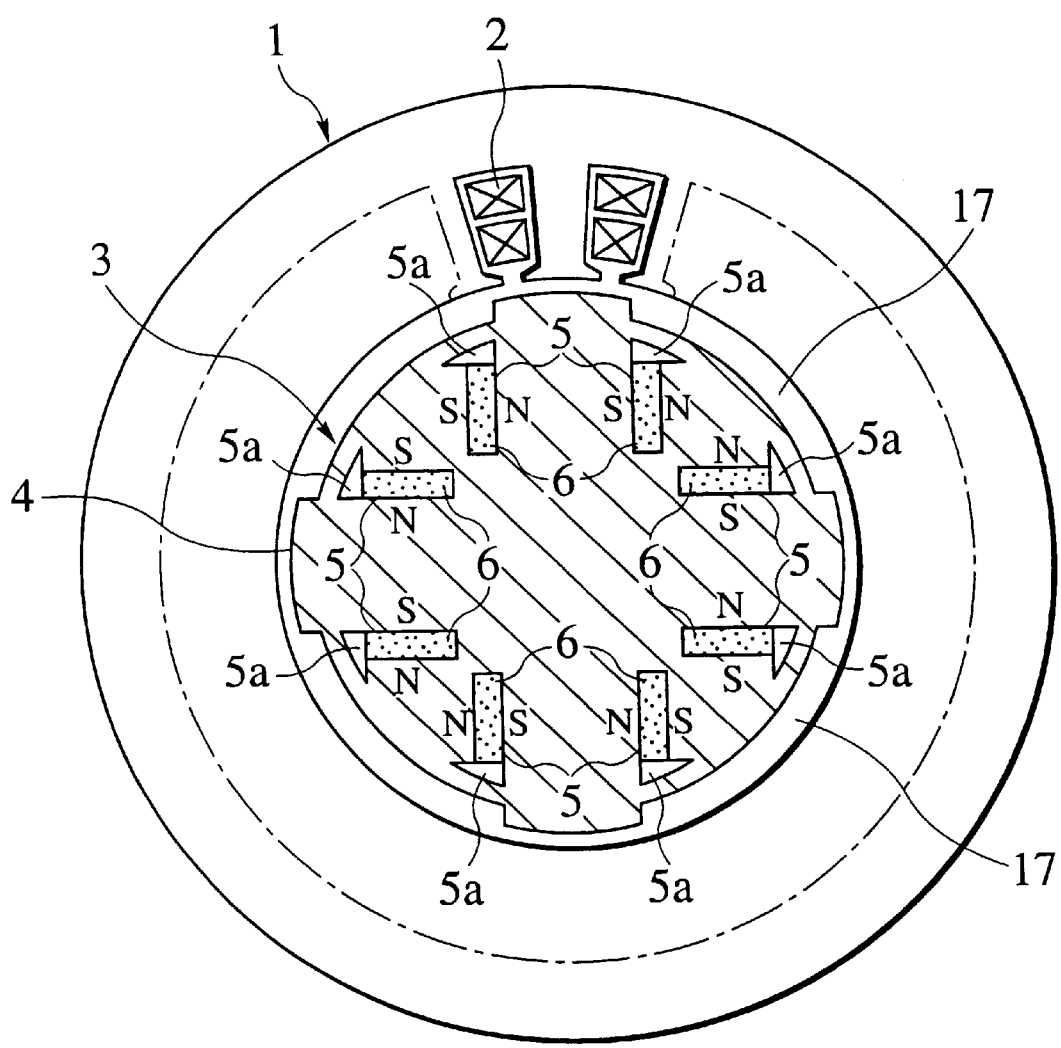
FIGS. 15A and 15B are cross sectional views of the reluctance type rotating machine in accordance with the 15th. embodiment and its modification of the present invention, taken along the radial direction of the machine.

FIG. 15A is a cross sectional view of the reluctance type rotating machine in accordance with the first embodiment of the present invention, taken along the radial direction of the rotor of the machine. As similar to the previously-mentioned embodiments, the machine comprises the stator 1 provided with the armature windings 2 of four poles and the generally cylindrically-shaped rotor 3. As the structure of the rotor 3, the rotor core 4 is constituted by a generally cylindrical member of magnetic material, such as soft steel called "S45C", or a laminated member of generally circular silicon steel plates. Formed at intervals of the width of a magnetic pole along the directions of respective pole axes in the rotor core 4 are the cavities 5 each of which is in the form of an semi-arrow. That is, according to the embodiment, since four magnetic poles are cross-shaped in the armature windings 2, the cavities 5 are formed so as to interpose respective poles therebetween from both sides of the pole, correspondingly.

In order to define the magnetic unevenness, respective fan-shaped portions each interposed by the adjoining poles of the core 4, namely, four interpoles have outer peripheries somewhat recessed in comparison with outer peripheries of the cross-shaped poles. Consequently, a gap portion 17 is defined between the periphery of each interpole and the stator 1. Note, as shown in FIG. 15A, each cavity 5 is formed to have an outer end positioned inside the periphery of each interpole in the radial direction of the rotor 3. Additionally, the cavities 5 are formed so that respective inner ends in the radial direction of the rotor 3 do not interfere with each other.

In the so-formed cavities 5, the rectangular permanent magnets 6, such as magnets of Nd—Fe—B type, are embedded in a manner that respective longitudinal ends thereof come in touch with the inner ends of the cavities 5, while the other longitudinal ends of the magnets 6 leave triangular spaces 5a in the cavities 5. These permanent magnets 6 are retained in the cavities 5 by means of an adhesive, for example. Each magnet 6 is magnetized in a direction perpendicular to the pole axis. Additionally, the magnets 6 are arranged so that the flux φm generated from the magnets 6 stands up to the leakage flux of the armature windings 2 flowing into the area of the interpoles. In detail, the permanent magnets 6 on both sides of each pole as a center are both identical in magnetizing direction and perpendicular to the pole. Also, the permanent magnets 6 on both sides of each interpole as a center have opposite magnetizing directions to each other in the circumferential direction of the rotor core 4.

Figure 15B:
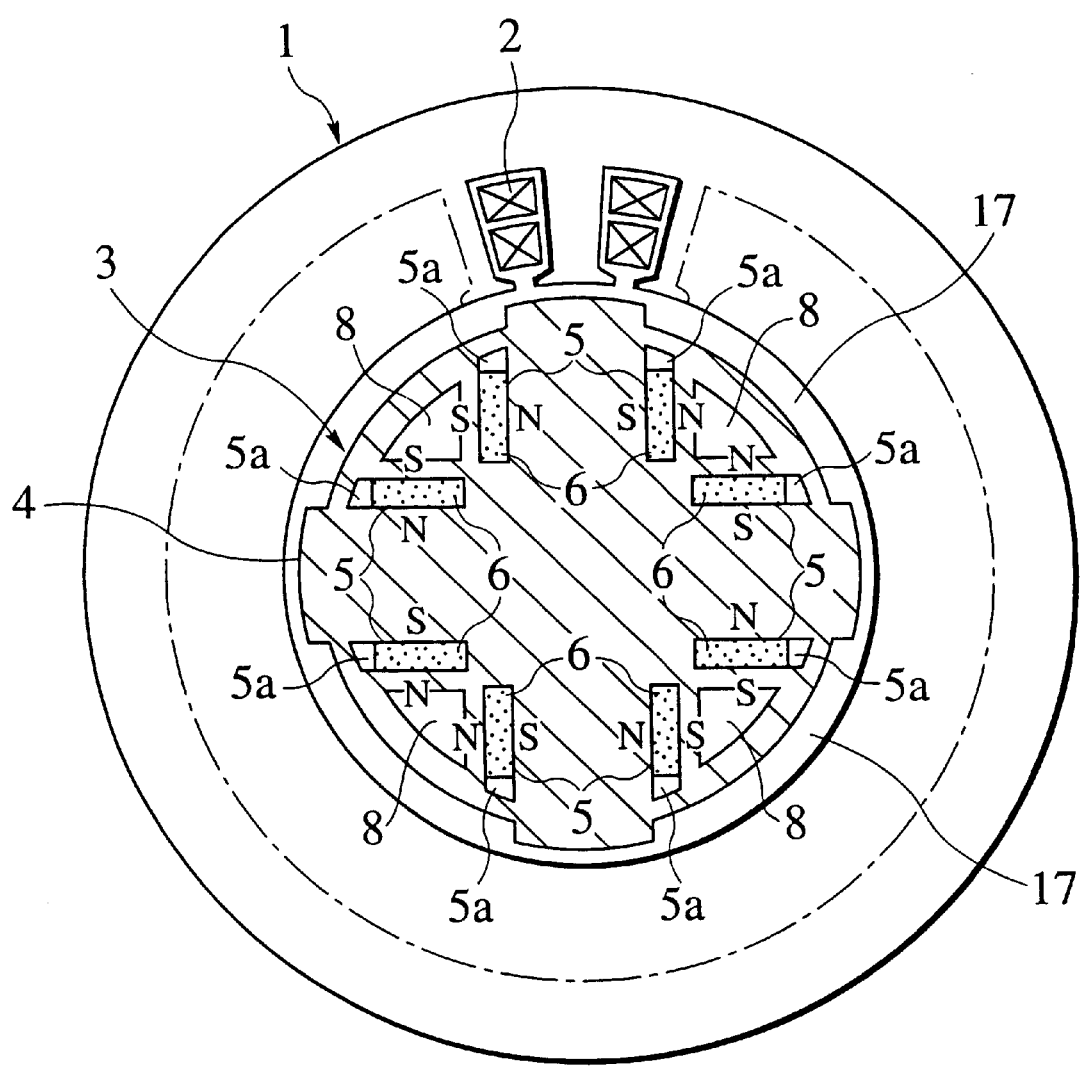

FIG. 15B shows a modification of the reluctance type rotating machine of FIG. 15A. In this rotating machine, fan-shaped cavities 8 are formed in the interpole portion in the rotor core 4. The shape of the space 5a is changed to a rectangular shape so as not to interfere with the cavities 8.

The above-mentioned reluctance type rotating machine operates as follows.

Figure 16:
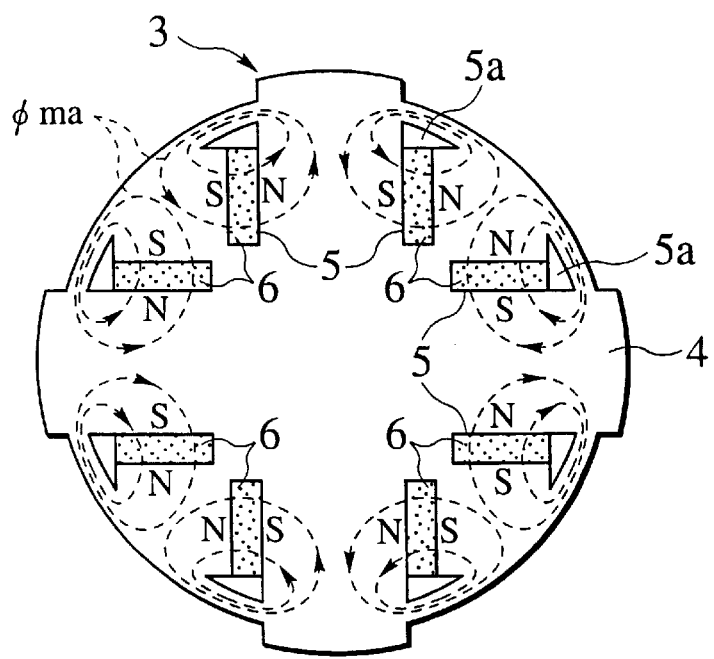
FIG. 16 is a cross sectional view of the reluctance type rotating machine of FIG. 15A, showing the distribution of magnetic flux in a rotor when the armature current is equal to zero.

FIG. 16 shows the flux distribution in the rotor 3 in a so-called "unloaded condition where no current flows in the armature windings 2 so that the flux from the windings 2 does not flow in the rotor 3. Generally in the rotor structure where the permanent magnets 6 are embedded, the short-circuit current flows in the armature windings 2 in the unloaded condition due to the magnetic flux φ ma generated from the permanent magnets 6 themselves, so that the brake force is exerted on the rotor 3. However, since the rotor 3 of the embodiment employs the structure to leave a part of core outside each permanent magnet 6, the flux φma forms a closed circuit about each permanent magnet 6 as shown in FIG. 16, thereby nullifying the induced voltage generating in the armature windings 2 in the unloaded condition. Therefore, no braking force is applied on the rotor 3, so that it is possible to maintain the steady-state rotation of the rotor 3. Note, in order to prevent the induced voltage from occurring in the armature windings 2, we, the inventor et al. found in accordance with our experiments it desirable to adjust the position of the embedded permanent magnets 6, in other words, a radial thickness of a core portion 7 at the circumferential end of the interpole (i.e. a core portion between the space 5a and a periphery of the interpole) so that at least the magnetic flux density of the permanent magnets 6 interlinking with the armature windings 2 gets less than 0.1 [T] at the gap 17 under the "zero" current condition.

Figure 17:
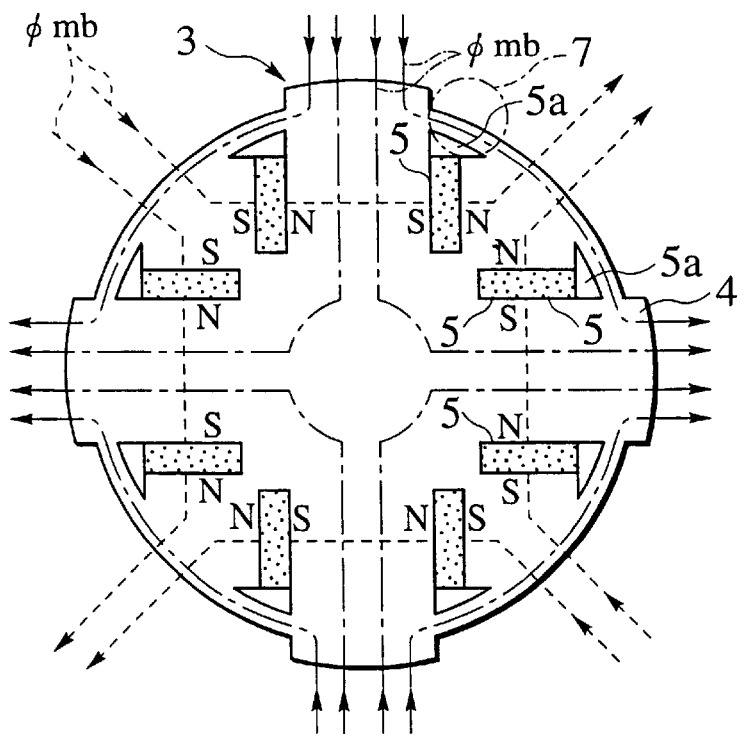
FIG. 17 is a cross sectional view of the reluctance type rotating machine of FIG. 15A, showing the distribution of magnetic flux due to the armature current of d-axis when the machine is loaded.

While, FIG. 17 shows the flux distribution in the rotor 3 under the loaded condition. In this state, since the current flows in the armature windings 2, the flux φ d is generated by the armature current of d-axis. The magnetic flux φ d contains not only a main flux flowing in the poles of the rotor core 4 as the magnetic paths but a leakage flux passing from the pole to the adjoining pole through a core portion on the periphery of so the interpole. Due to the leakage flux and the flux φ ma from the permanent magnet 6, the core portion (magnetic part) 7 at the circumferential margin of the interpole is saturated magnetically. Therefore, this magnetic saturation causes the flux φ ma from the permanent magnet 6 to pass through the core portion 7 with difficulty, so 35 that the flux φ ma is associated with that of the adjoining permanent magnet 6, thereby forming the flux φ mb passing through the interpoles for the stator 1, as shown with broken lines of FIG. 17. Since the flux φmb flows from the stator 1 to the interpoles of the rotor 3 and finally interlinks with the armature windings 2, both output and power factor of the machine can be improved.

Figure 18:
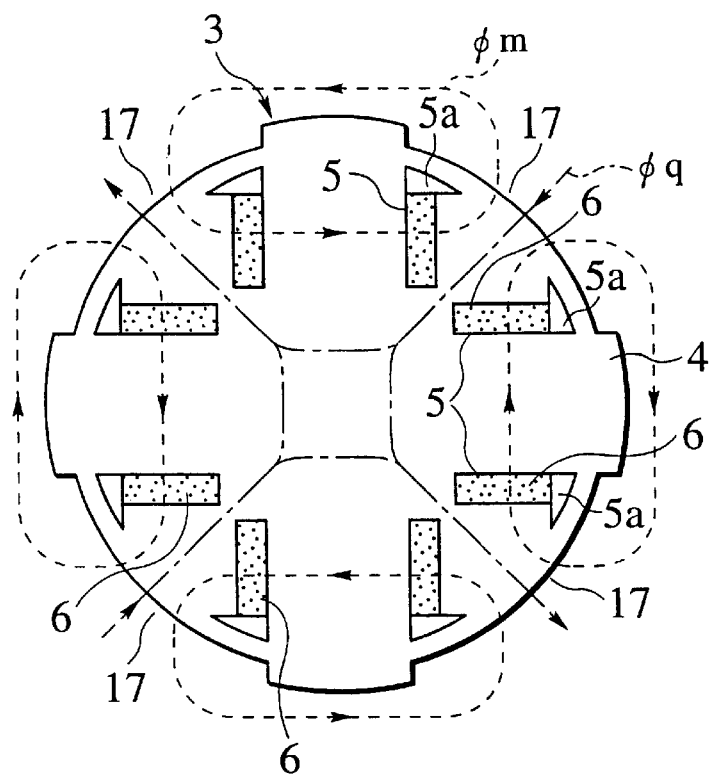
FIG. 18 is a cross sectional view of the reluctance type rotating machine of FIG. 15A, showing the distribution of magnetic flux due to the armature current of q-axis when the machine is loaded.
Figure 19:
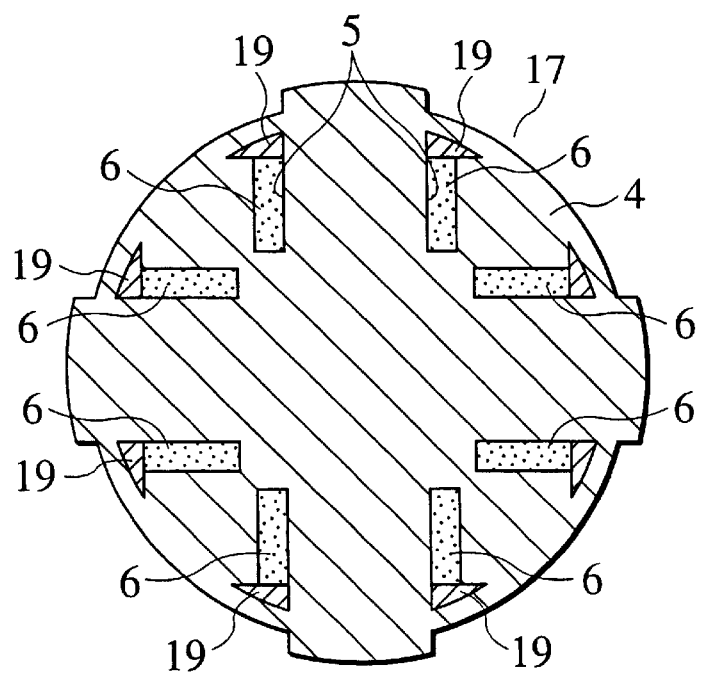
FIG. 19 is a cross sectional view of a rotor of a reluctance type rotating machine as a modification of the 15th. embodiment.

FIG. 18 shows the magnetic flux φ q in a direction along a center axis of the interpole, which originates in the armature current of q-axis. The flux $\phi$ q between the adjoining poles does define a magnetic path to pass between the permanent magnets 6 on both sides of the interpole, run the vicinity of the rotor center and pass between the magnets 6 again. However, due to both actions of the flux $\phi$ m from the permanent magnet 6 toward the stator 1 and the increased magnetic reluctance of the gap 17, the flux $\phi$ q by the armature current of q-axis is reduced.

That is, because of the above-mentioned magnetizing direction of the permanent magnets 6, the magnetic flux $\phi$ m defines a magnetic path of firstly crossing each pole of the rotor 3, secondly entering from the core portion of the interpole into the stator 1 through the gap 17 and finally returning to the opposite magnet 6. Further, since the flux $\phi$ m of the permanent magnet 6 is distributed in the opposite direction to the flux $\phi$ q, the former operates to repel the latter flux being about to enter into the interpole. Additionally, the "gap" flux density derived from the armature current is reduced by the flux $\phi$ q of the permanent magnets 6 in the gap 17 about the interpole, so that a difference between the flux density in the gap 17 about the interpole and that about the pole is further increased. It means that the rotating machine of the embodiment has a large change in "gap" flux density with respect to the position of the rotor 3, thereby increasing the change in magnetic energy. Consequently, the rotating machine is capable of producing a large output by this unevenness in gap flux density.

As mentioned above, since the rotating machine of the embodiment is capable of reducing the interlinkage flux of the permanent magnets 6 with the armature windings 2 when the machine is either unloaded or loaded lightly, it is possible to decrease the induced voltage, whereby the core loss can be reduced. Accordingly, the high efficiency operation can be accomplished when the machine is unloaded or loaded lightly. Furthermore, since the flux $\phi$ m of each permanent magnet 6 closes in the rotor core, it is also possible to prevent the magnet from being demagnetized. Owing to very few voltage induced by the magnets 6, the rotating machine is capable of operating at a wide range of variable speeds.

Further, even if an electrical short-circuit occurs the armature windings, an inverter, etc. during the rotor's rotation, the short-circuit current does not flow since the induced voltage is substantially equal to zero.

Therefore, in spite of the short-circuit, it is possible to prevent an excessive braking force from being produced and the armature windings from being damaged.

Also in this embodiment, since the rectangular permanent magnets 6 are embedded in the axial direction of the rotor core 4 (of laminated plates), it is possible to improve the strength of the rotor 3.

Although the cavities 5 are filled up with the permanent magnets 6 while leaving the cavities 5a in the above-mentioned embodiment, non-magnetic materials 9 may be embedded in the remained cavities 5a in the modification of the embodiment. Also in the modification, effects similar to those of the embodiment would be expected.

[16th embodiment]

Figure 20:
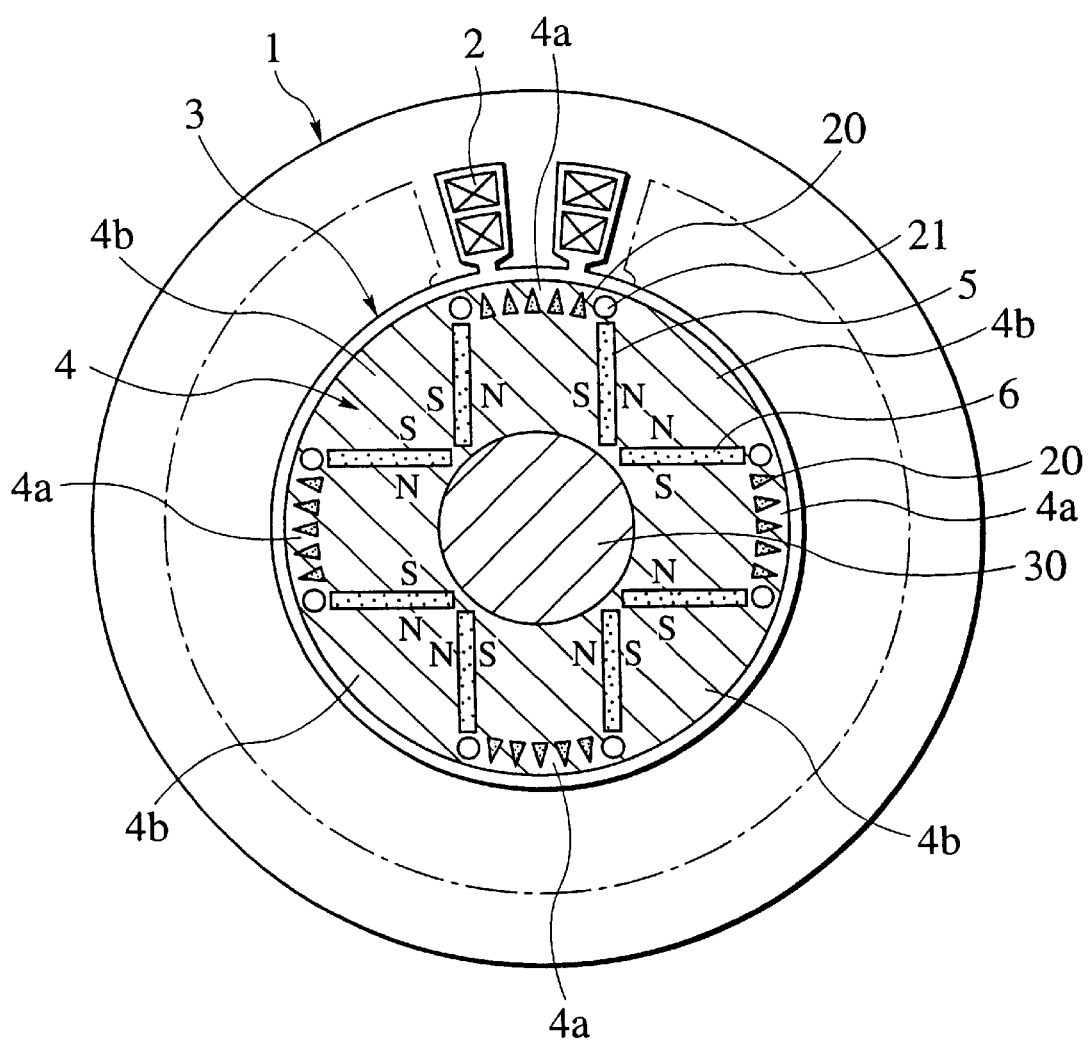
FIG. 20 is a cross sectional view of a rotor of the reluctance type rotating machine in accordance with the 16th. embodiment of the present invention, taken along the radial direction of the machine.

FIG. 20 is a cross sectional view of the reluctance type rotating machine in accordance with the 16th. embodiment of the present invention, taken along the radial direction of the rotor of the machine. As similar to the previously-mentioned embodiments, the machine comprises the stator 1 provided with the armature windings 2 of four poles and the rotor 3 accommodated in the stator 1. The rotor 3 is provided, at a center thereof, with a rotor shaft 30 for engagement with the rotor core 4. The rotor core 4 is constituted by a generally cylindrical member of magnetic material, such as soft steel called "S45C", or a laminated member of generally circular silicon steel plates. Formed at intervals of the width of a magnetic pole along the directions of respective pole axes in the rotor core 4 are the cavities 5 which have rectangular cross-sections. The rectangular permanent magnets 6, such as magnets of Nd—Fe—B type, are securely embedded in the cavities 5 by an adhesive, for example. That is, according to the embodiment, since four magnetic poles 4a are cross-shaped in rotor 3, while the permanent magnets 6 are arranged so as to interpose each pole 4a therebetween. Note, although the rotor shaft 30 is inserted into the rotor core 4 in common with some later-mentioned embodiments including this embodiment, the rotor 3 may be provided by adhesively stacking circular core plates each having no center opening for the shaft 30 in the modification.

Each permanent magnet 6 is magnetized in a direction perpendicular to the pole axis. Additionally, the permanent magnets 6 are arranged so that the magnetic flux from the magnets 6 stands up to the leakage flux of the armature windings 2 flowing into the area of the fan-shaped interpoles 4b. In detail, the permanent magnets 6 on both sides of one pole 4a are identical to each other in magnetizing direction and respectively magnetized in a direction perpendicular to the pole. Also, the permanent magnets 6 on both sides of each interpole 4b have opposite magnetizing directions to each other in the circumferential direction of the rotor core 4.

In the vicinity of the outer face of each pole 4a interposed between the opposing permanent magnets 6, a plurality (e.g. five) of bars 20 having isosceles fan-shaped cross sections are embedded in the rotor core 4 along the axial direction of the rotor 3 so as to direct their peaks to the outside. The deep groove bars 20 are made of conductive magnetic material, such as aluminum-additive iron, silicon-additive iron, etc. and adapted so as to conduct each other at both axial ends of the rotor 3, through the intermediary of not-shown conductive plates, for example, The sectional profile of each bar 20 may be rectangular. Alternatively, it may be oval.

The magnetic bars 20 operate as follows. At the start of the operation of the rotating machine, the induced current flows in the bars 20 by the flux of the armature windings 2, so that the starting torque is produced in the rotor 3, allowing the rotating machine to start by itself. Note, as similar to the core 4, since each magnetic bars 70 themselves are formed by the magnetic material, there is no influence on flux (main flux) flowing the poles 4a.

Additionally, according to the embodiment of the invention, a pair of circular-sectional cavities 21 are formed in the core portions on both sides of a group of magnetic bars 18 embedded in each pole 4a and also positioned outside the permanent magnets 6 in the radial direction of the rotor 3. Owing to the provision of the cavity 21, each boundary between the pole 4a and the interpole 4b is so clarified to intercept the magnetic circuit, so that the magnetic reluctance is further increased in each interpole 4b. Accordingly, the change in magnetic energy is increased between the poles 4a and the interpoles 4b, thereby producing a great torque.

[17th embodiment]

Figure 21:
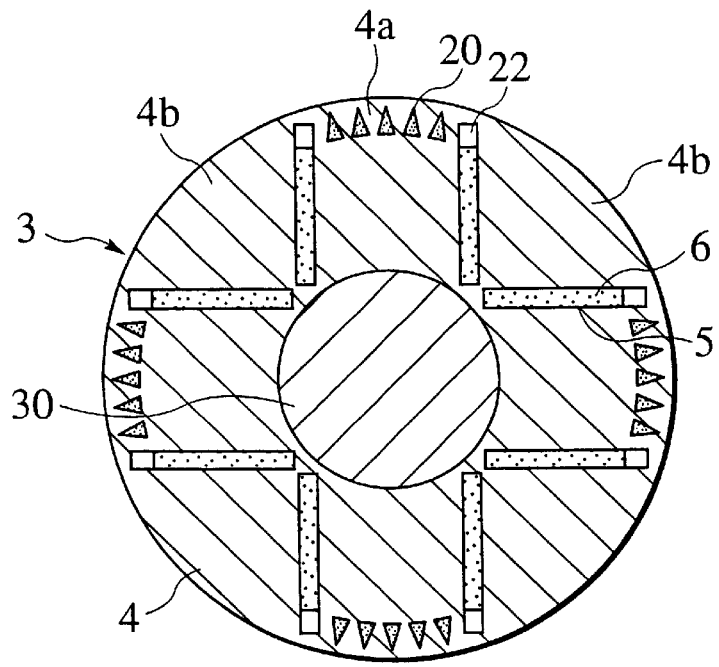
FIG. 21 is a cross sectional view of a rotor of the reluctance type rotating machine in accordance with the 17th. embodiment of the present invention, taken along the radial direction of the machine.

FIG. 21 is a cross sectional view of the rotor 3 of the reluctance type rotating machine in accordance with the 17th. embodiment of the present invention.

According to this embodiment, both of the cavity 5 for each permanent magnet 6 and outside cavity 8 in the 16th. embodiment may be replaced with one rectangular cavity 9 where the permanent magnet 6 is arranged so that a longitudinal end thereof abuts on the inner end of the cavity 9.

The operation of the rotor 3 of the embodiment is similar to that of the 16th. embodiment. That is, owing to a cavity portion remained in each cavity 5, the boundary between the pole 4a and the interpole 4b is clarified to intercept the magnetic circuit. Note, since the cavity 5 for magnet and the cavity 8 of the 16th. embodiment are replaced with only one cavity in this embodiment, it is possible. to reduce the number of manufacturing processes in comparison with the 16th. embodiment, whereby the manufacturing cost can be saved.

[18th embodiment]

Figure 22:
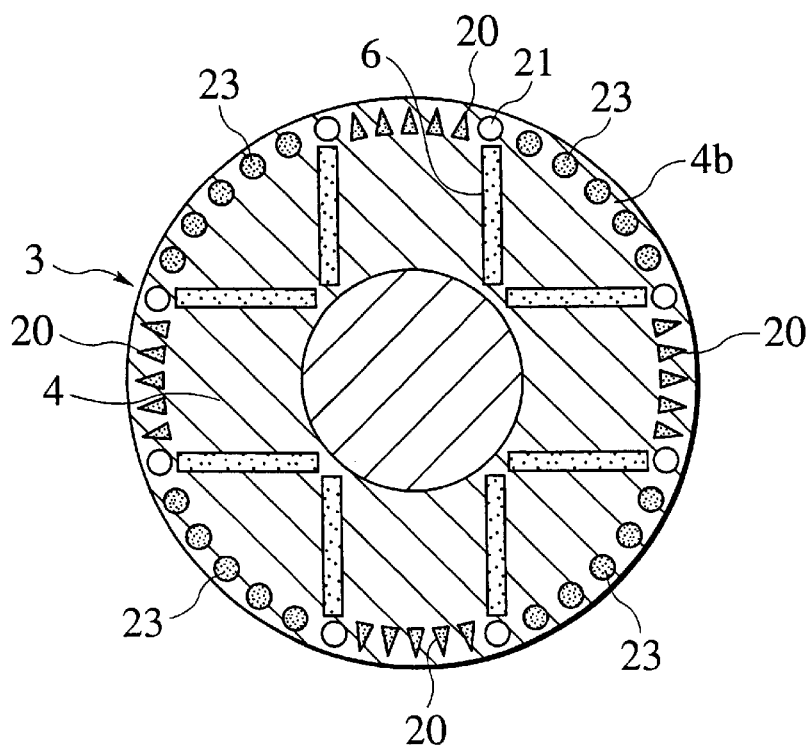
FIG. 22 is a cross sectional view of a rotor of the reluctance type rotating machine in accordance with the 18th. embodiment of the present invention, taken along the radial direction of the machine.

FIG. 22 is a cross sectional view of the rotor 3 of the reluctance type rotating machine in accordance with the 18th. embodiment of the present invention. According to the embodiment, a plurality of conductive bars 23 having circular sections are embedded in the interpoles 4b along the outer face of the rotor 3 although it looks like the rotor 3 of the 16th. embodiment. Each conductive bar 10 is made of, for example, copper, aluminum, or the like, namely, non-magnetic material. Thus, at the machine's starting, the induced current flows in the vicinity of the outer face of the interpoles 4b, too. Therefore, the self-start characteristic of the machine can be improved. Further, because of their non-magnetism, the magnetic reluctance is further increased in the interpoles 4b in comparison with the 17th. and 18th. embodiments, so that the change in magnetic energy between the poles 4a and the interpoles 4b is further increased to improve the output of the rotating machine.

[19th embodiment]

Figure 23:
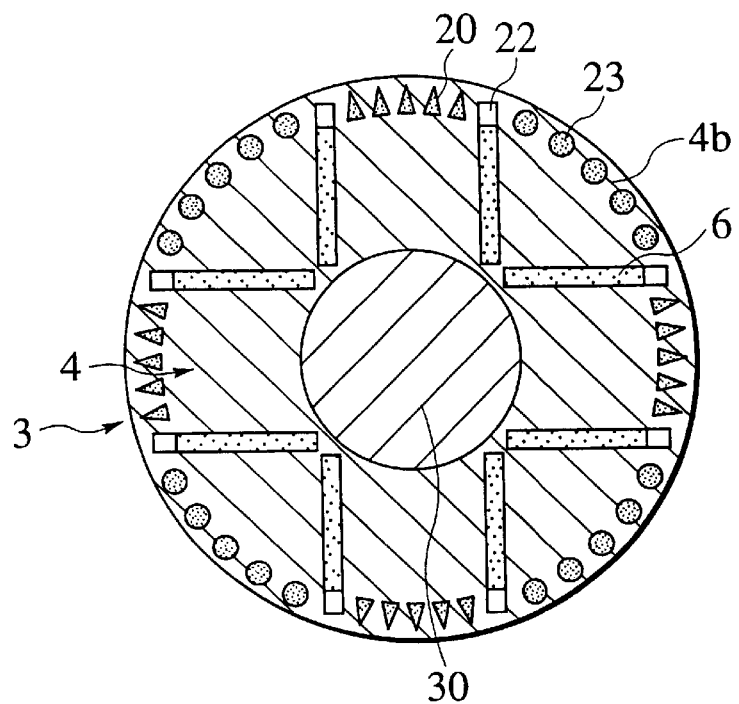
FIG. 23 is a cross sectional view of a rotor of the reluctance type rotating machine in accordance with the 19th. embodiment of the present invention, taken along the radial direction of the machine.

FIG. 23 is a cross sectional view of the rotor 3 of the reluctance type rotating machine in accordance with the 19th. embodiment of the present invention. According to the embodiment, a plurality of non-magnetic conductive bars 23 are embedded on the peripheries of the interpoles 4b of the rotor 3 of FIG. 21. The operation of the rotating machine of the embodiment is similar to that of the 18th. embodiment.

[20th embodiment]

Figure 24:
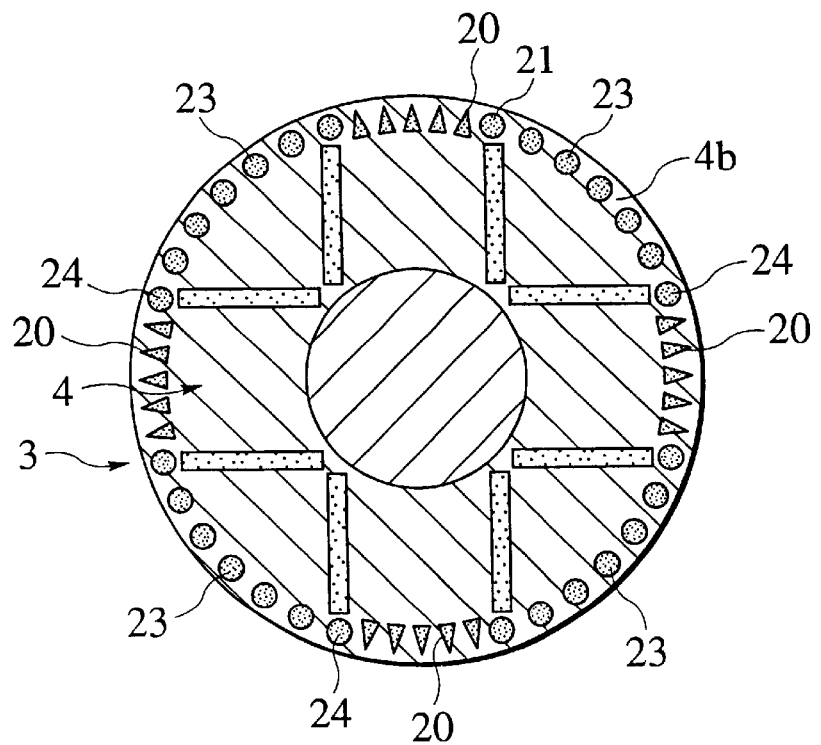
FIG. 24 is a cross sectional view of a rotor of the reluctance type rotating machine in accordance with the 20th. embodiment of the present invention, taken along the radial direction of the machine.

FIG. 24 is a cross sectional view of the rotor 3 of the reluctance type rotating machine in accordance with the 20th. embodiment of the present invention. According to the embodiment, a plurality of non-magnetic conductive bars 24 having circular sections are inserted into the cavities 21 of FIG. 22. Consequently, each boundary between the pole 4a and the interpole 4b is clarified, so that the change in magnetic energy between the pole 4a and the interpole 4b is further increased to improve the output of the machine.

[21st embodiment]

Figure 25:
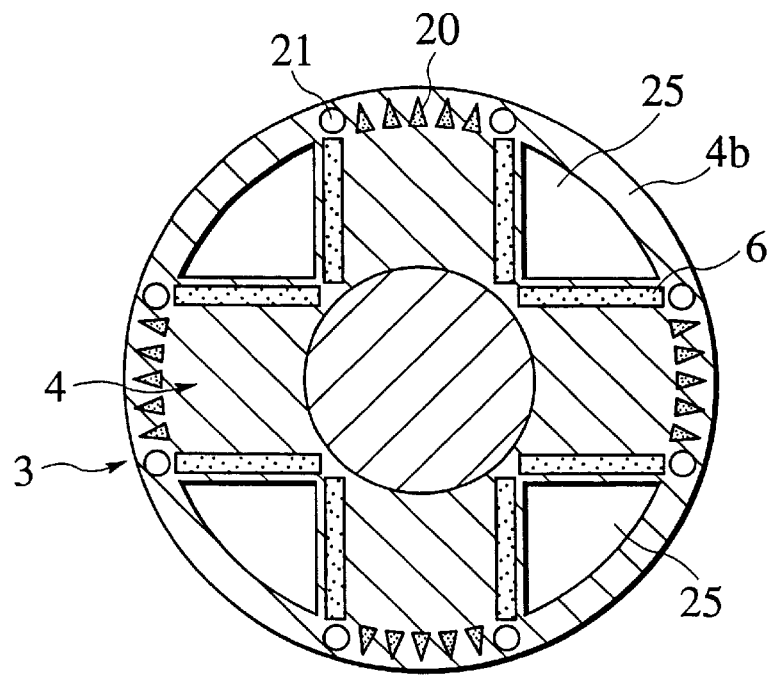
FIG. 25 is a cross sectional view of a rotor of the reluctance type rotating machine in accordance with the 21st. embodiment of the present invention, taken along the radial direction of the machine.

FIG. 25 is a cross sectional view of the rotor 3 of the reluctance type rotating machine in accordance with the 21st. embodiment of the present invention. This embodiment is similar to the embodiment of FIG. 20 but the configuration of the rotor core 4 provided, in the interpoles 4a, with four fan-shaped cavities 25. Consequently, by the action of high magnetic reluctance of both permanent magnets 6 and cavities 25, the flux along the directions of interpole axes is reduced, so that the change in magnetic energy between the pole 4a and the interpole 4b is further increased to improve the output of the machine.

[22nd embodiment]

Figure 26:
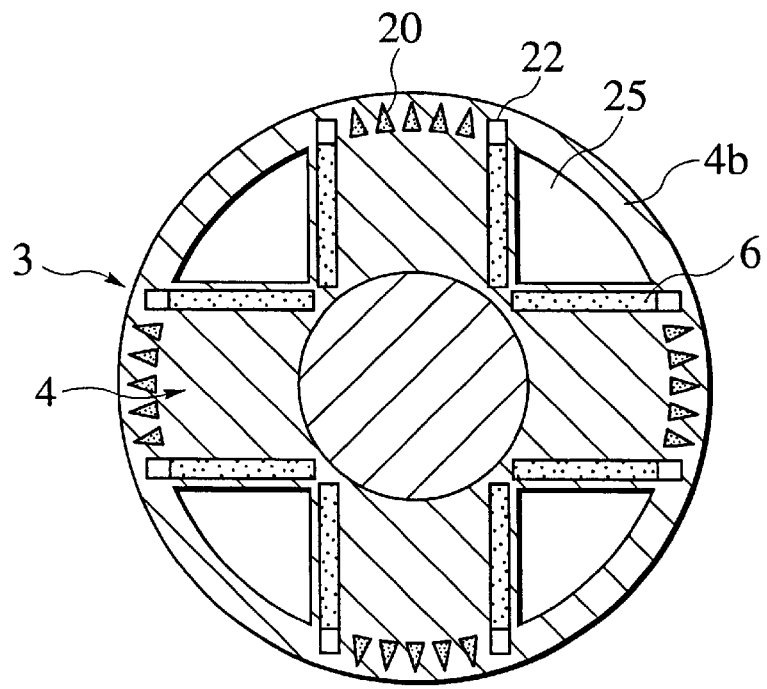
FIG. 26 is a cross sectional view of a rotor of the reluctance type rotating machine in accordance with the 22nd. embodiment of the present invention, taken along the radial direction of the machine.

FIG. 26 is a cross sectional view of the rotor 3 of the reluctance type rotating machine in accordance with the 22nd. embodiment of the present invention. This embodiment is similar to the embodiment of FIG. 21 but the configuration of the rotor core 4 provided, in the interpoles 4a, with four fan-shaped cavities 25, too. The operation of the machine of the embodiment is similar to that of the 21st. embodiment.

Note, as to the non-magnetic conductive bar 23 of FIGS. 22, 23 and 24, the configuration may be either rectangular or triangular in the modification of those embodiments.

[23–25th embodiments]

Figure 27:
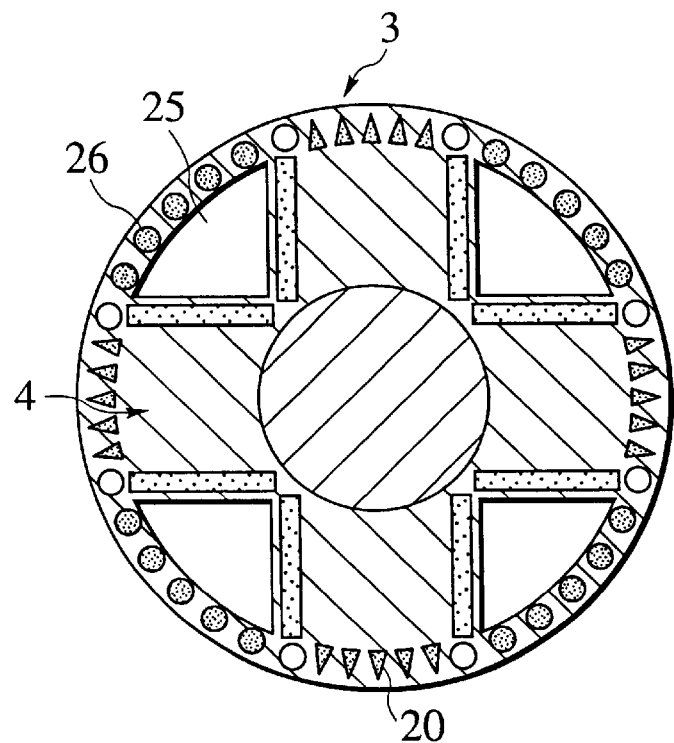
FIG. 27 is a cross sectional view of a rotor of the reluctance type rotating machine in accordance with the 23rd. embodiment of the present invention, taken along the radial direction of the machine.
Figure 28:
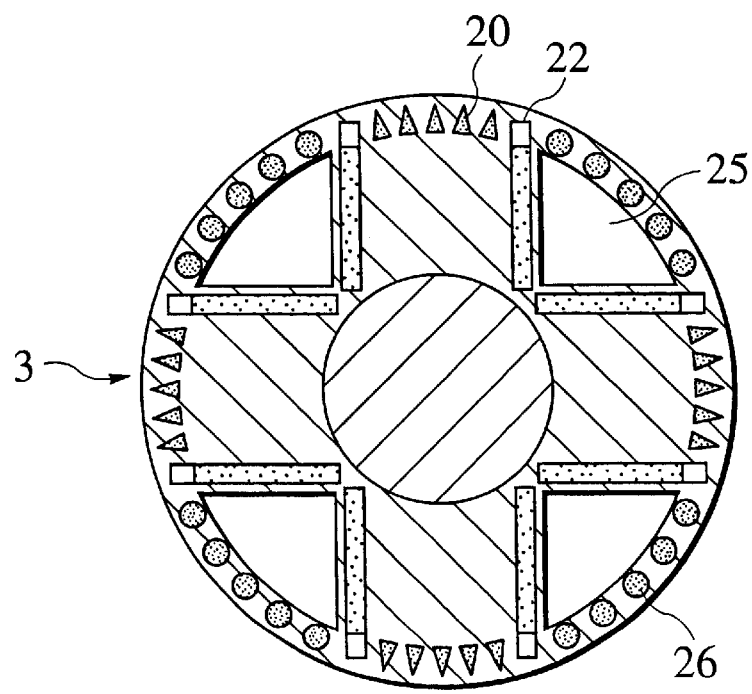
FIG. 28 is a cross sectional view of a rotor of the reluctance type rotating machine in accordance with the 24th. embodiment of the present invention, taken along the radial direction of the machine.
Figure 29:
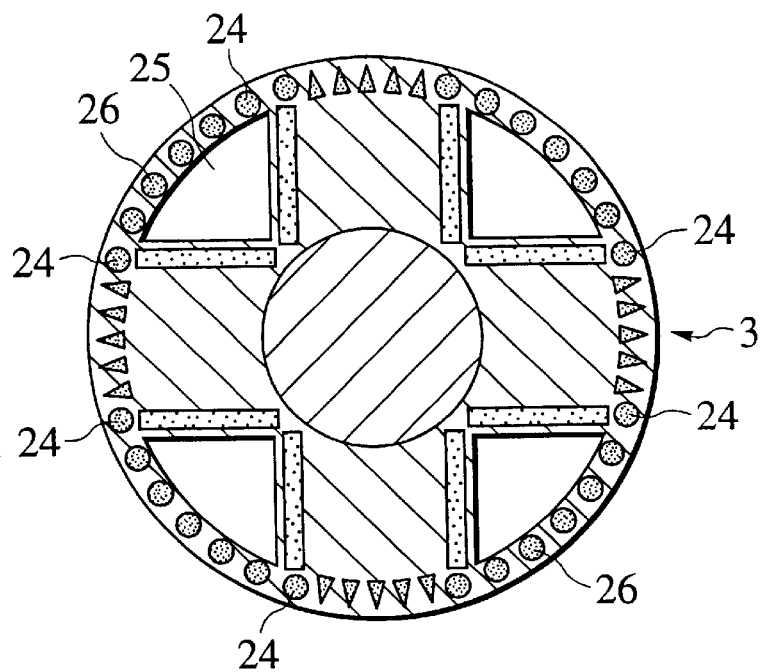
FIG. 29 is a cross sectional view of a rotor of the reluctance type rotating machine in accordance with the 25th. embodiment of the present invention, taken along the radial direction of the machine.

FIGS. 27 to 29 are cross sectional views of the rotors 3 of the reluctance type rotating machine in accordance with the 23rd. to 25th. embodiments of the present invention, respectively. In common with those embodiments, the fan-shaped cavities 25 are formed in the rotors 4 of FIGS. 22 to 24, respectively, as similar to the 21st. embodiment. The operation of the rotors 3 of those embodiments is identical to the operation of the rotors 3 of the 18 to 20th. embodiments, except that the magnetic reluctance of the interpoles 4b is increased by the cavities 25.

[26th embodiment]

Figure 30:
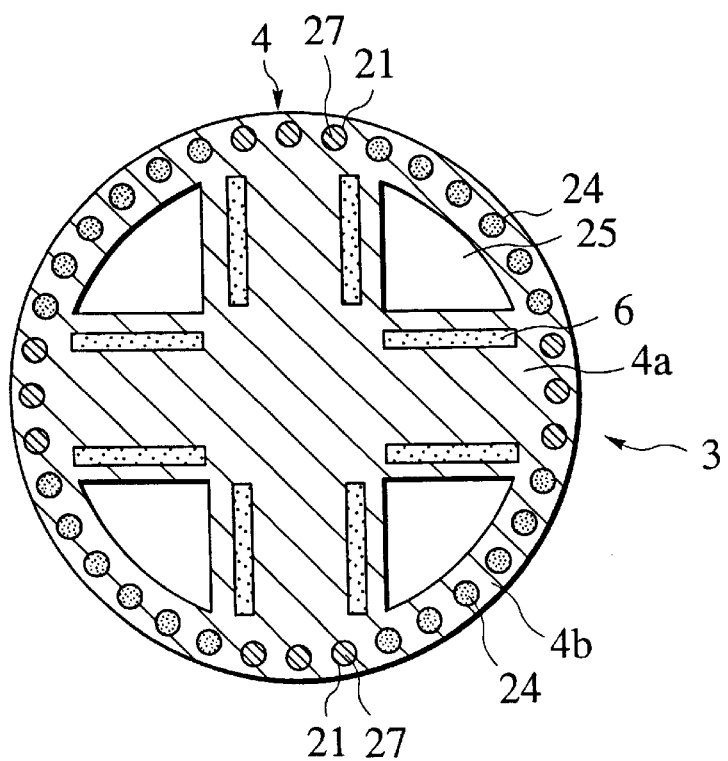
FIG. 30 is a cross sectional view of a rotor of the reluctance type rotating machine in accordance with the 26th. embodiment of the present invention, taken along the radial direction of the machine.

FIG. 30 is a cross sectional view of the rotor 3 of the reluctance type rotating machine in accordance with the 26th. embodiment of the present invention. In this modification of the 25th. embodiment, the cavities 21 of identical sections are arranged on the whole periphery of the rotor 3 at regular intervals. In the cavities 21, some in the poles 4a are filled up with the magnetic conductive bars 27 extending in the axial direction of the rotor 3, while the other cavities 21 in the interpoles 4b are filled up with the non-magnetic conductive bars 24 in the axial direction of the rotor 3. Consequently, owing to the provision of the conductive bars 24, 27 of identical configurations on the periphery of the rotor 3, the induced current flows in the bars 24, 27 by the flux from the armature windings 2 at the machine's starting, allowing the machine to start by itself.

[27th embodiment]

Figure 31:
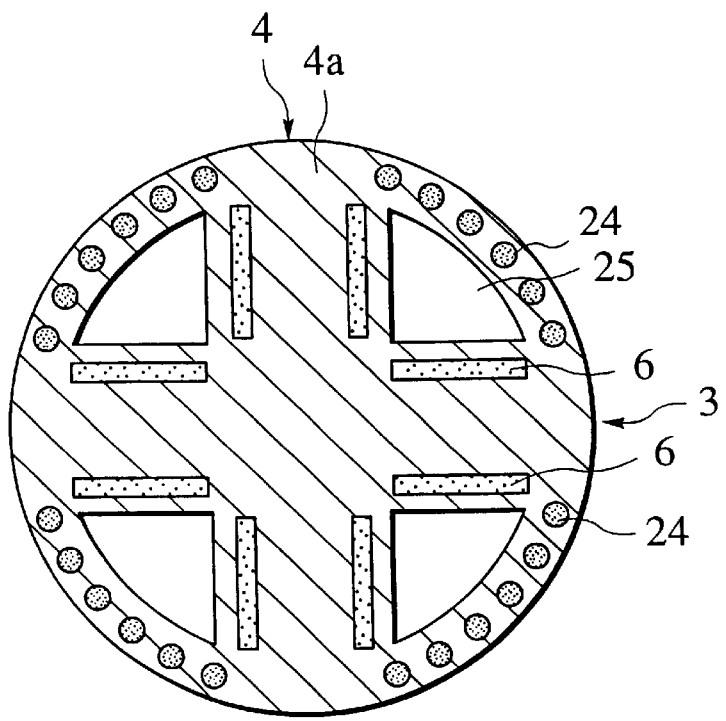
FIG. 31 is a cross sectional view of a rotor of the reluctance type rotating machine in accordance with the 27th. embodiment of the present invention, taken along the radial direction of the machine.

FIG. 31 is a cross sectional view of the rotor 3 of the reluctance type rotating machine in accordance with the 27th. embodiment, which is similar to the 26th. embodiment. That is, according to the embodiment, the rotor 3 is provided with no magnetic conductive by abolishing the cavities 21 in the poles 4a from the rotor 3 of the 26th. embodiment. Also in this rotor 3, a large induced current flows in the conductive bars 24 at the machine's start, so that the self-starting can be ensured.

Meanwhile, in common with the 21 to 26th. embodiments where the cavities 25 are formed in the interpoles 4b, respective bridge portions (i.e. peripheral portions of the interpoles 4b) of the rotor 3 has a tendency to be deformed outward by its centrifugal force when the machine is rotating at high speed.

FIGS. 32 to 35 show respective cross sections of the rotor cores 4 each provided for the purpose of preventing the rotor 3 from being deformed due to the machine's rotation at high speed. In the following embodiments, each rotor core 4 of FIGS., 32 to 35 may be either disposed on both axial ends of an rotor core assembly or inserted into an axial intermediate position of the assembly, which may be obtained by laminating a number of circular plates each shown in FIG. 30, for example.

[28th embodiment]

Figure 32:
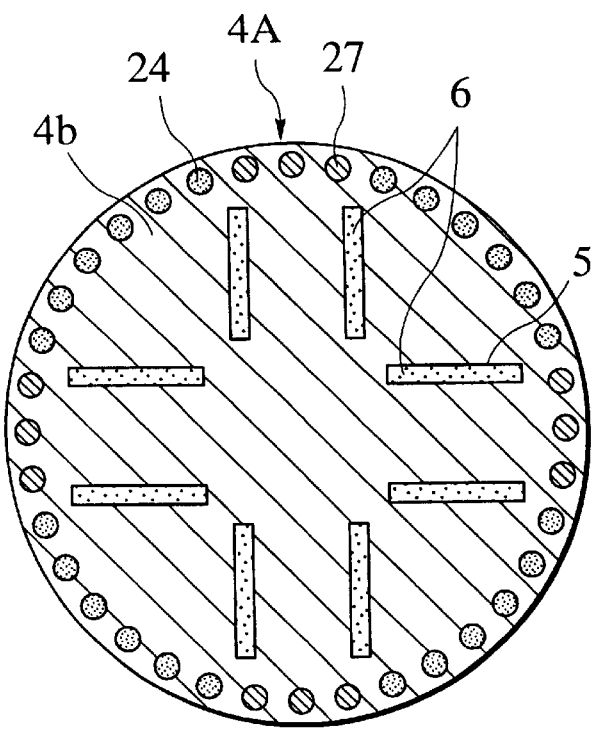
FIG. 32 is a cross sectional view of a rotor of the reluctance type rotating machine in accordance with the 28th. embodiment of the present invention, taken along the radial direction of the machine.

FIG. 32 shows a rotor core plate 4A as a constituent of the rotor in accordance with the 28th. embodiment. In order to provide the rotor core plate 4A, the fan-shaped cavities 25 are eliminated from the rotor core 4 of FIG. 30, so that the rotor core plate 4A is completed with no cavity but the cavities 5 accommodating the permanent magnets 6. Consequently, in the rotor core 4 where the core plates 4A are arranged on both axial ends of the rotor or one or more core plates 4A are interposed in the rotor, it is possible to resist the centrifugal force when the machine is rotating at high speed since the interpoles 4b of the rotor are reinforced.

[29th embodiment]

Figure 33:
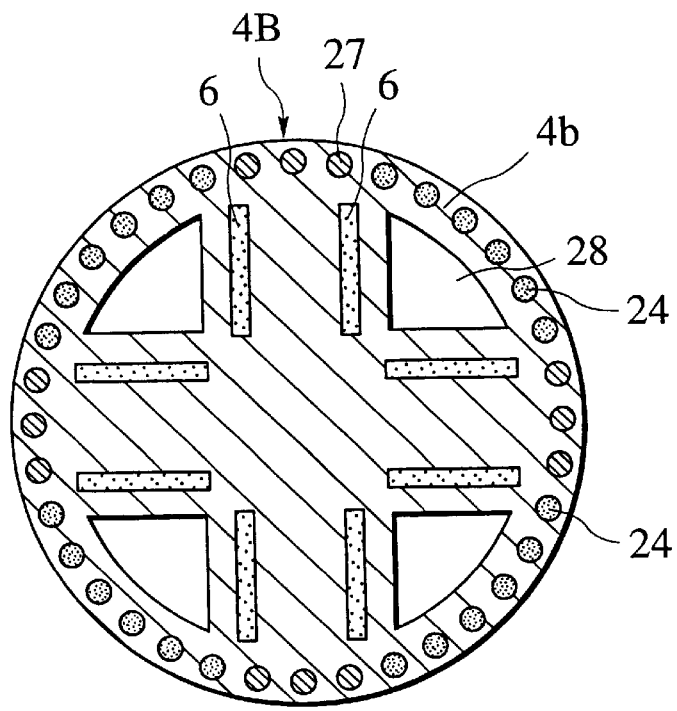
FIG. 33 is a cross sectional view of a rotor of the reluctance type rotating machine in accordance with the 29th. embodiment of the present invention, taken along the radial direction of the machine.

FIG. 33 shows a rotor core plate 4B as a constituent of the rotor in accordance with the 29th. embodiment. According to the embodiment, the core plate 4B is provided, in each interpole 4b, with a cavity 28 somewhat smaller than the cavity 25 of FIG. 30. Consequently, in the rotor core 4 where the core plates 4B are arranged on both axial ends of the rotor or one or more core plates 4B are interposed in the rotor, the interpoles 4b of the rotor can be reinforced.

[30th embodiment]

Figure 34:
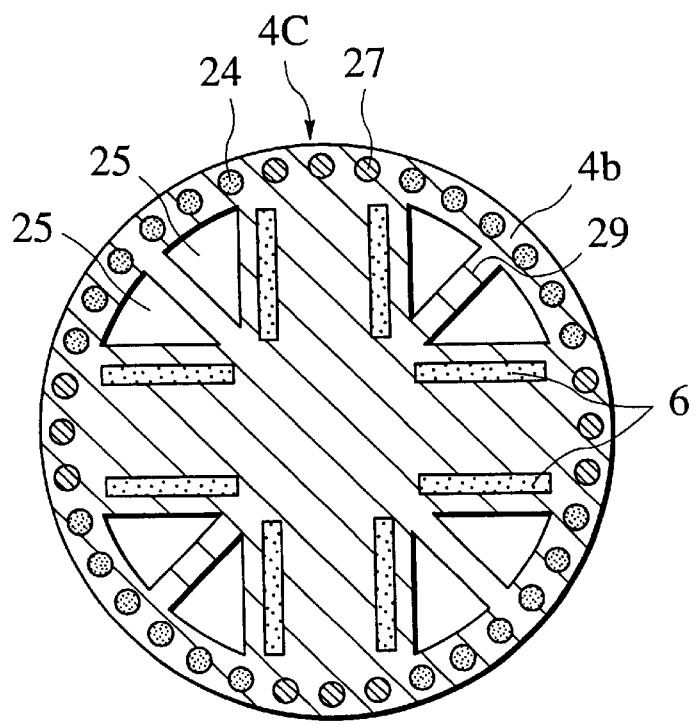
FIG. 34 is a cross sectional view of a rotor of the reluctance type rotating machine in accordance with the 30th. embodiment of the present invention, taken along the radial direction of the machine.

FIG. 34 shows a rotor core plate 4C as a constituent of the rotor in accordance with the 30th. embodiment. Although this embodiment is similar to the embodiment of FIG. 30 in terms of the arrangement of conductive bars, the former embodiment differs from the latter in that the core plate 4C is provided, inside each interpole 4b, with a bridge member 29 extending outward in the radial direction of the rotor. In assembly, one or more core plates 4C are interposed in the rotor obtained by laminating a number of rotor cores 4 of FIG. 30 in order to reinforce the interpoles 4b of the rotor.

[31st embodiment]

Figure 35:
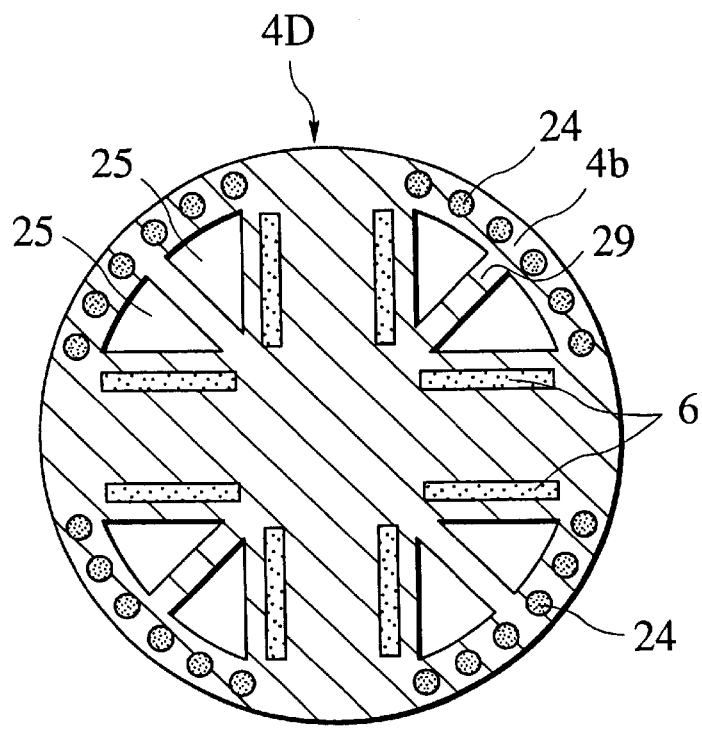
FIG. 35 is a cross sectional view of a rotor of the reluctance type rotating machine in accordance with the 31st. embodiment of the present invention, taken along the radial direction of the machine.

FIG. 35 shows a rotor core plate 4D as a constituent of the rotor in accordance with the 31st. embodiment. Although this embodiment is similar to the embodiment of FIG. 31 in terms of the rotor structure, the former embodiment differs from the latter in that the core plate 4D is also provided, inside each interpole 4b, with the bridge member 29 extending outward in the radial direction of the rotor. In assembly, one or more core plates 4D are interposed in the rotor obtained by laminating a number of rotor cores 4 of FIG. 31 in order to reinforce the interpoles 4b of the rotor.

[32nd embodiment]

Figure 36:
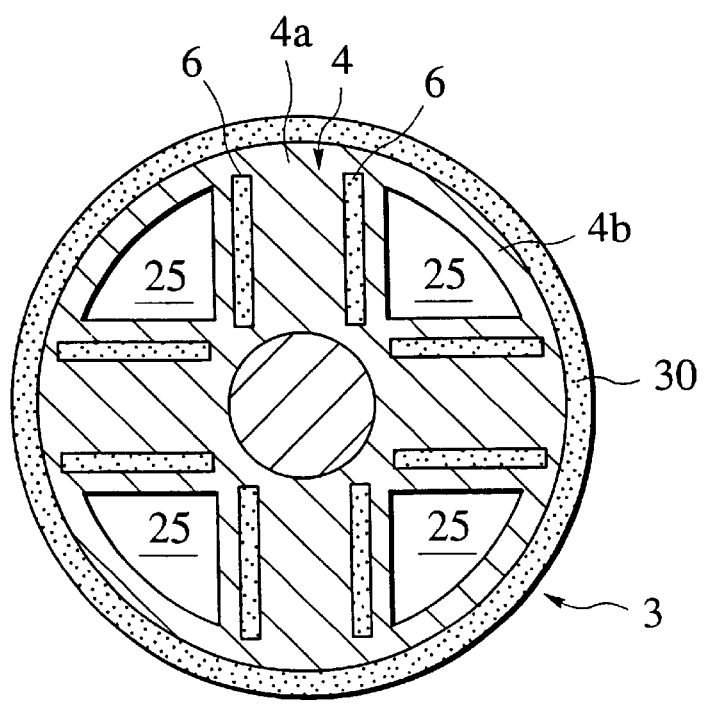
FIG. 36 is a cross sectional view of a rotor of the reluctance type rotating machine in accordance with the 32nd. embodiment of the present invention, taken along the radial direction of the machine.

FIG. 36 is a cross sectional view of the rotor 3 of the reluctance type rotating machine in accordance with the 32nd. embodiment of the invention, According to the embodiment, the rotor 3 has the cavities 25 formed in the interpoles 4b and is covered, on the whole periphery of the rotor 3, with a cylindrical member 30 of conductive material. The material of the cylindrical member 30 may be non-magnetic material, for example, copper, aluminum, or the like. Alternatively, the member 30 may be made of magnetic material exhibiting fine conductivity.

As the result, when the machine operates to start, a starting torque is generated by the induced current flowing in the axial direction of the member 30, allowing the self-starting of the rotor 3. Note, since this rotor 3 of the embodiment employing the cylindrical conductive member 30 has a reduced number of components in comparison with that of the embodiment where a number of conductive bars are embedded in the rotor core, the mechanical strength of the rotor can be improved while facilitating the production of the machine.

Note, as the material exhibiting fine conductivity, Cu—Fe alloy may be appropriate for the member 30. Additionally, when the thickness of the cylindrical member is established so as to be one to four times as large as a rind thickness which would be determined by the permeability and elec- trical conductivity, then it is possible to increase the starting torque of the rotor and reduce a slip in synchronizing the machine, whereby the pulling for the machine can be facilitated especially.

[33rd embodiment]

Figure 37:
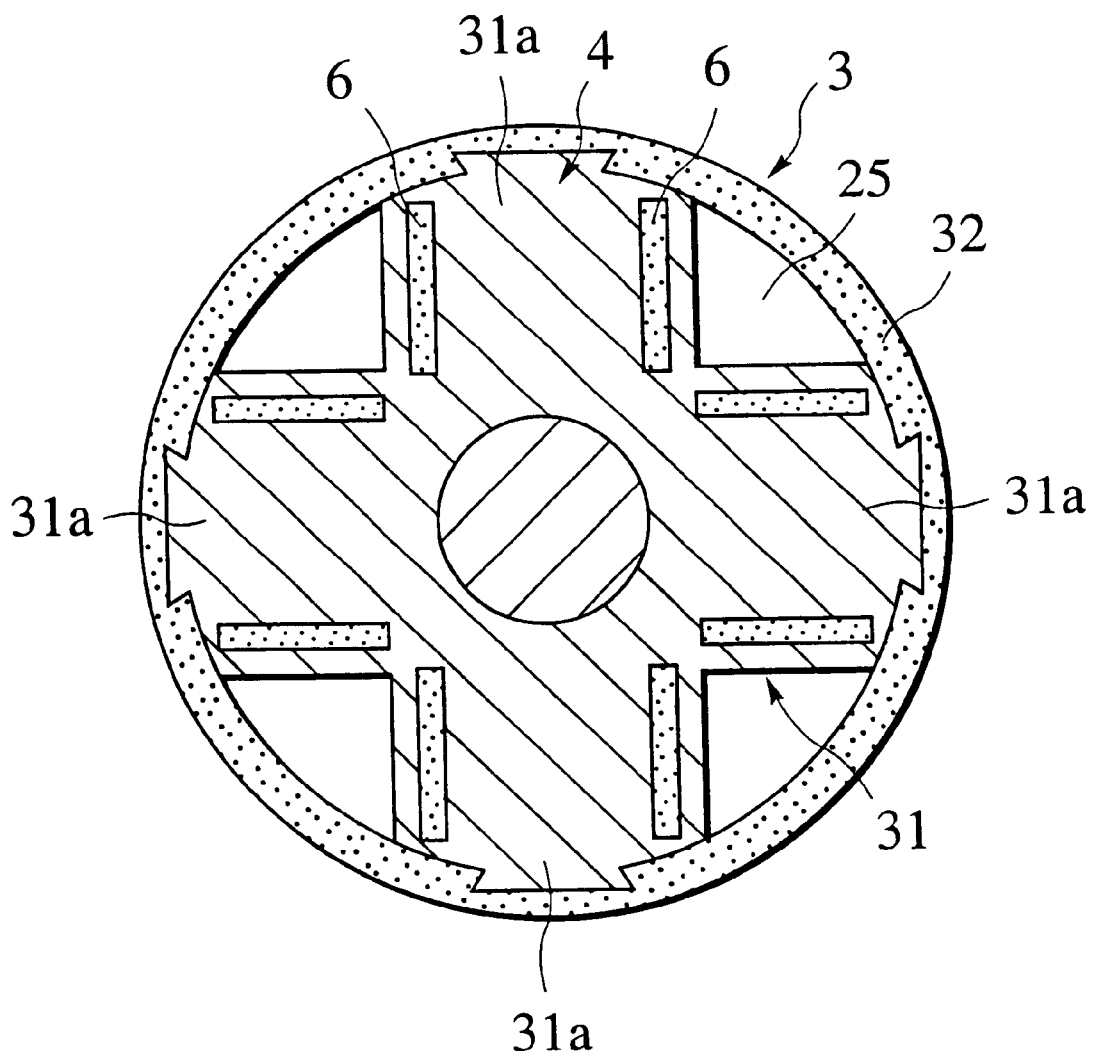
FIG. 37 is a cross sectional view of a rotor of the reluctance type rotating machine in accordance with the 33rd. embodiment of the present invention, taken along the radial direction of the machine.

FIG. 37 is a cross sectional view of the rotor 3 of the reluctance type rotating machine in accordance with the 33rd. embodiment of the invention. According to the embodiment, the rotor 3 is constituted by a substantially cross-shaped core 31 extending along the pole-axes while abolishing respective connecting portions (bridge parts) of the interpoles, in a view of improving the yield of products when punching a steel plate into core plates. In the rotor core 31, each pole 31a has a leading end formed in a dovetail-manner. While, a cylindrical member 32 of conductive material is provided, on an inner face thereof, with dovetail grooves for engagement with the dovetail ends of the rotor core 31. With the engagement, the so-constructed member 32 is fitted with respect to the rotor core 31. In this way, the above-mentioned cavities 25 of the rotor 3 are defined by the cross-shaped rotor core 31 and the cylindrical member 32 surrounding the core 31. The operation of the machine of the embodiment is similar to that of the 32nd. embodiment. Further, derived from the configuration of core, the yield of material is improved, so that the manufacturing cost can be reduced. Since the rotor core 31 is securely fixed with the cylindrical member 32 by the engagement of the dovetail ends with the dovetail grooves, there is no possibility of slipping even if the rotor rotates at high speed, whereby the strength of the rotor can be improved. Note, as to the magnetism of these conductive member 30, 32, it is prefer- able to make up them by non-magnetic material in order to increase the magnetic reluctance of the interpoles 4b and reduce the flux along the interpole-axes. Alternatively, the members 30, 32 may be made of magnetic material exhib- iting fine conductivity.

In case of employing the material of fine conductivity, as similar to the 32nd. embodiment, when the thickness of the cylindrical member is established so as to be one to four times as large as the rind thickness which would be deter- mined by the permeability and electrical conductivity, then it is possible to increase the starting torque of the rotor and reduce a slip in synchronizing the machine, whereby the pull-in for the machine can be facilitated especially.

[34th embodiment]

Figure 38:
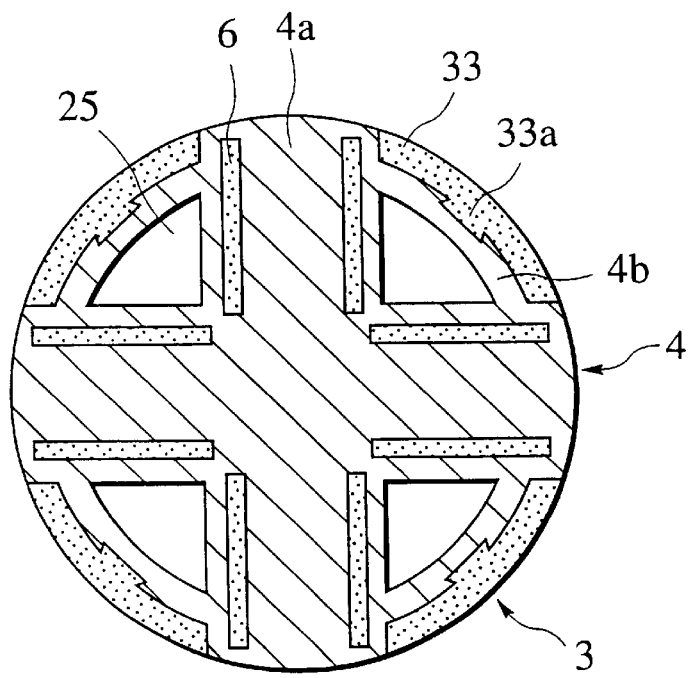
FIG. 38 is a cross sectional view of a rotor of the reluctance type rotating machine in accordance with the 34th. embodiment of the present invention, taken along the radial direction of the machine.

FIG. 38 is a cross sectional view of the rotor 3 of the reluctance type rotating machine in accordance with the 34th. embodiment of the invention. In the modification of the 33rd. embodiment, the conductor is constituted by four curved shell members 33 succeeding to outer surfaces of the poles 4a. Each shell member 33 is overlaid on the interpole 4b, which is positioned inward of the leading end of the pole 4a in the radial direction of the rotor 3, and is integrated with the interpole 4b by the engagement between the dovetail groove and a dovetail projection 33a of the member 33. According to the embodiment, since the interpoles 4b are covered with the shell members 33, the induced current flows in the interpoles 4b at the machine's starting, allowing the self-starting of the machine, Furthermore, since each shell member 33 is adapted so as to succeed to the outer face of the pole 4a in order to form the rotor 3 of circular section, it is possible to reduce the air resistance (windage), whereby the rotational efficiency can be improved.

[35th embodiment]

Figure 39:
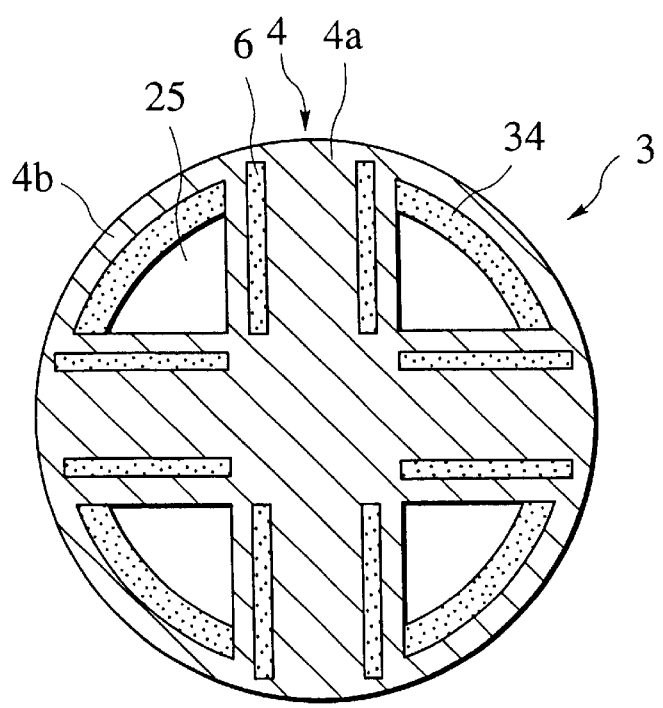
FIG. 39 is a cross sectional view of a rotor of the reluctance type rotating machine in accordance with the 35th. embodiment of the present invention, taken along the radial direction of the machine.

FIG. 39 is a cross sectional view of the rotor 3 of the reluctance type rotating machine in accordance with the 35th. embodiment of the invention. According to the embodiment, a conductive shell member 34, which is similar to the shell member 33 of the 34th. embodiment, is fixed on the rotor core 4 in each cavity 25 of the rotor 3. In operation, the induced current flows in the shell members 34 positioned relatively outside of the interpoles 4b at the machine's starting, allowing the self-starting of the machine.

[36th embodiment]

Figure 40:
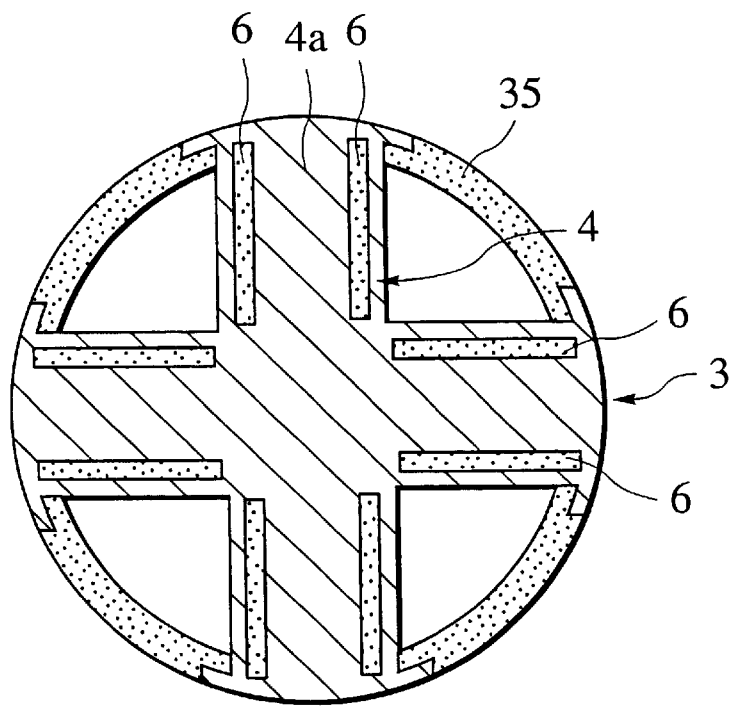
FIG. 40 is a cross sectional view of a rotor of the reluctance type rotating machine in accordance with the 36th. embodiment of the present invention, taken along the radial direction of the machine.

FIG. 40 is a cross sectional view of the rotor 3 of the reluctance type rotating machine in accordance with the 36th. embodiment of the invention, which is similar to the 33rd. and 34th. embodiments. According to the embodiment, the interpoles 4b are abolished 9 from the rotor 3 of FIG. 38, so that the rotor core 4 is formed to have a generally cross-shaped section. Further, the circumferential ends of each pole 4a are hook-shaped for engagement with circumferential ends of conductive shell members 35. Owing to this formation of the poles 4a, even if the centrifugal force of the rotor 3 is applied on the members 35, they can be prevented from falling from the rotor 3. In this way, each conductive shell member 35 of the embodiment constitutes a part of the rotor 3 at the interpole. In operation, the induced current flows in the shell members 35 at the machine's starting, allowing the self-starting of the machine. Furthermore, since each shell member 33 is adapted so as to succeed the outer face of the pole 4a, it is possible to reduce the air resistance (windage), whereby the rotational efficiency can be improved.

Figure 41:
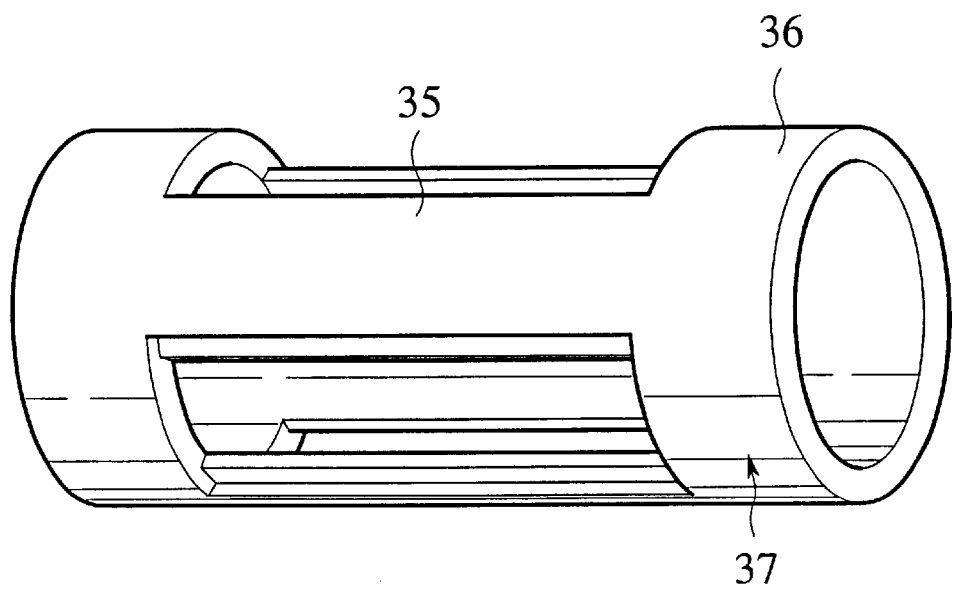
FIG. 41 is a perspective view of a cylindrical conductive member employed for the rotor of FIG. 40.

Although the shell members 35 are separated from each other in the embodiment, they may be replaced with a cylindrical member 37 of FIG. 41 where the respective members 35 are connected with each other through annular portions 36, in the modification.

[37th embodiment]

Figure 42:
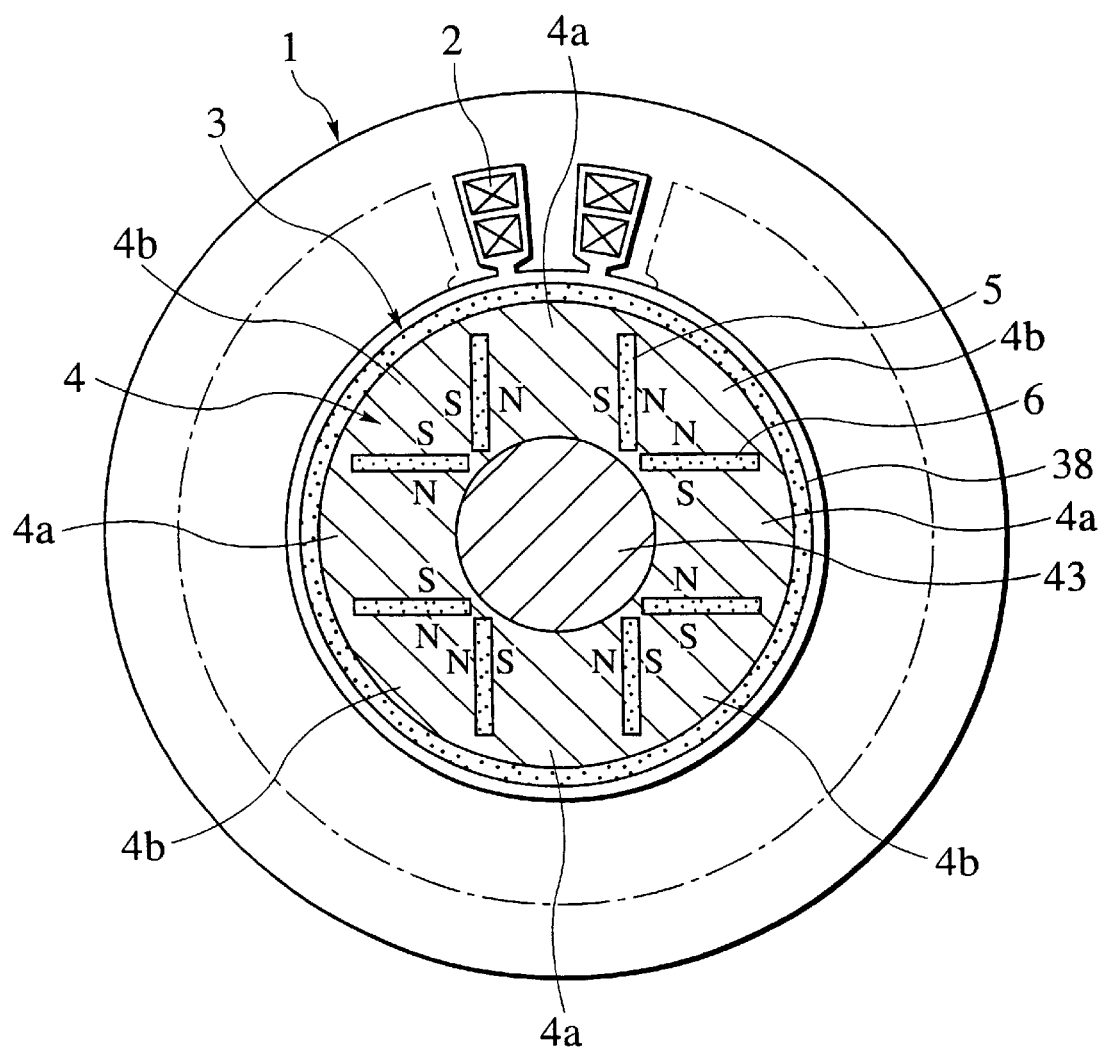
FIG. 42 is a cross sectional view of the reluctance type rotating machine in accordance with the 37th. embodiment of the present invention, taken along the radial direction of the machine.

FIG. 42 is a cross sectional view of the rotor 3 of the reluctance type rotating machine in accordance with the 37th. embodiment of the invention. The reluctance type rotating machine, as similar to the 1st. embodiment, includes the stator 1 having the four-pole armature windings 2 and the rotor 3 accommodated in the stator 1.

Figure 43:
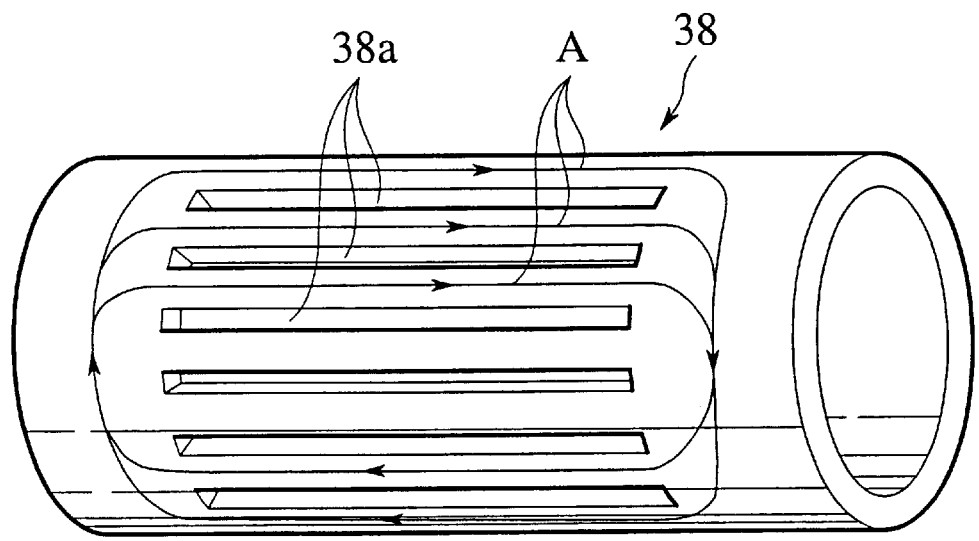
FIG. 43 is a perspective view of a cylindrical conductive member employed for the rotor of FIG. 42.

This embodiment is characterized by a cylindrical conductive member 38 covering the whole periphery of the rotor core 4. As shown in FIG. 43, the cylindrical conductive member 38 is provided, along the circumferential direction, with a plurality of long slits 38a each extending in the axial direction of the member 38.

Due to the formation of the slits 38a, the induced current at the machine's starting flows while defining a long path in the axial and circumferential directions of the rotor, as shown with arrows A of FIG. 43. Consequently, the magnetic coupling between the armature windings and the rotor is reinforced to provide a great starting torque for the rotor, allowing the self-starting of the rotor 3.

Note, the cylindrical member 38 of the embodiment is easy to be manufactured and ensures its sufficient mechanical strength because of its simple structure. Furthermore, since the periphery of the rotor 3 is smoothed by the member 38, it is possible to reduce the air resistance (windage), whereby the rotational efficiency can be improved.

As materials exhibiting fine conductivity, for example, aluminum-addition iron, silicon-addition iron, Cu—Fe alloy, or the like may be adopted for material of the member 38. In this case, when the thickness of the cylindrical member 38 is established so as to be one to four times as large as the rind thickness which would be determined by the permeability and electrical conductivity, then it is possible to increase the starting torque of the rotor and reduce a slip in synchronizing the machine, whereby the pull-in for the machine can be facilitated especially. Alternatively, if the member 38 is made of magnetic material as similar to that of the core 4, it would not influence on the flux (main flux) flowing the poles 4a.

[38th embodiment]

Figure 44:
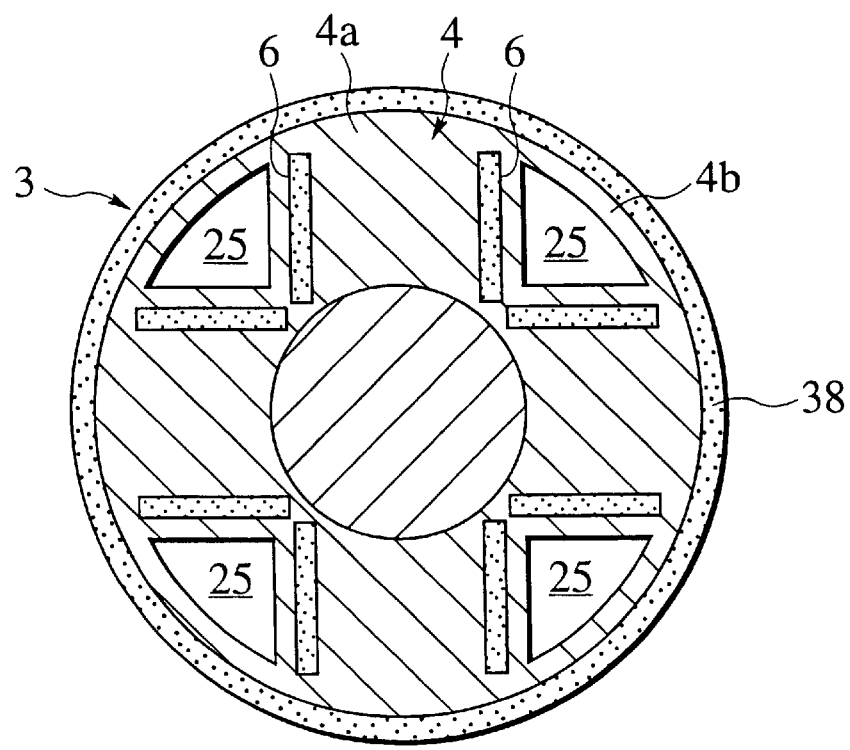
FIG. 44 is a cross sectional view of a rotor of the reluctance type rotating machine in accordance with the 38th. embodiment of the present invention, taken along the radial direction of the machine.

FIG. 44 is a cross sectional view of the rotor 3 of the reluctance type rotating machine in accordance with the 38th. embodiment of the invention. The reluctance type rotating machine of the embodiment differs from the 38th. embodiment in that the rotor 3 is provided, at the interpoles, with the cavities 25. The other structure is similar to that of the 38th. embodiment, including the cylindrical member 25.

According to the embodiment, since the flux along the interpole-axes is further reduced by the action of high magnetic reluctance due to the permanent magnets 6 and the cavities 12, the change in magnetic energy between the pole 4a and the interpole 4b is further increased thereby to improve the output of the machine.

[39th embodiment]

Figure 45:
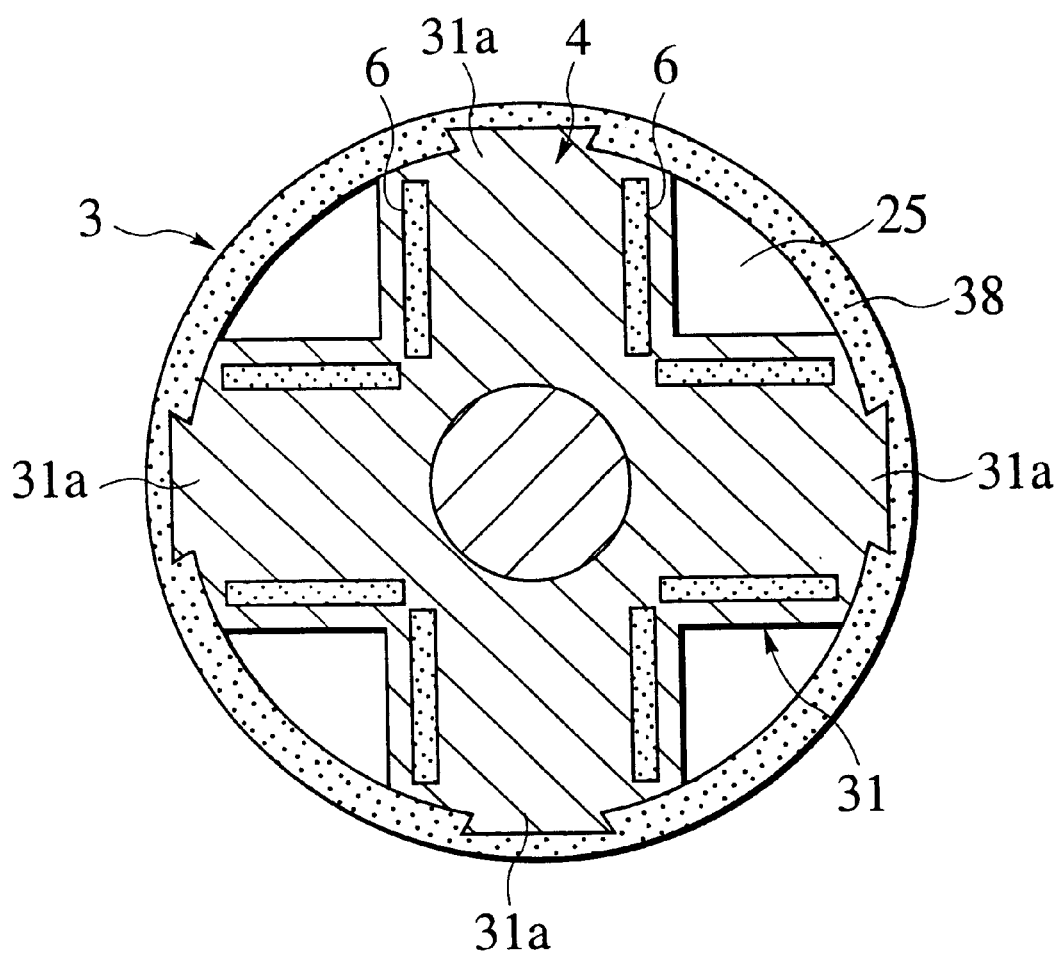
FIG. 45 is a cross sectional view of a rotor of the reluctance type rotating machine in accordance with the 39th. embodiment of the present invention, taken along the radial direction of the machine.

FIG. 45 is a cross sectional view of the rotor 3 of the reluctance type rotating machine in accordance with the 39th. embodiment of the invention. The reluctance type rotating machine of the embodiment differs from the 39th. embodiment in terms of the configuration of the rotor core 4. As similar to the embodiment of FIG. 37, the rotor 3 is constituted by the substantially cross-shaped core 31 extending along the pole-axes while abolishing respective connecting portions (bridge parts) of the interpoles, in a view of improving the yield of products in punching a steel plate into core plates. Therefore, the leading end of each poles 31a is shaped in the form of a dovetail, while the cylindrical member 38 is arranged outside the rotor core 4, provided with dovetail grooves for engagement with the dovetail ends of the rotor core 31.

As similar to the 37th. and 38th. embodiments, the cylindrical member 38 is constituted by a conductive member having the plural slits 38a arranged along the circumferential direction of the member, as shown in FIG. 43. The cavities 25 are defined by this cylindrical member 38 and the cross-shaped core 31.

The operation of the cylindrical member 38 is quite identical to that of the member 38 of the 37th. and 38th. embodiments. Further, derived from the configuration of core, the yield of material is improved, so that the manufacturing cost can be reduced. Since the rotor core 31 is securely fixed with the cylindrical member 32 by the engagement of the dovetail ends with the dovetail grooves, there is no possibility of slipping even if the rotor rotates at high speed, whereby the strength of the rotor can be improved.

Note, in case of employing the material of fine conductivity for the cylindrical member 38 and when the thickness of the cylindrical member is established so as to be one to four times as large as the rind thickness which would be determined by the permeability and electrical conductivity, then it is possible to increase the starting torque of the rotor and reduce a slip in synchronizing the machine, whereby the pull-in for the machine can be facilitated especially.

In common with the 37–39th. embodiments, however, the cylindrical member 38 may be made of non-magnetic material to increase the magnetic reluctance of the interposes 4b, in order to reduce the flux along the interpole-axes.

[40th embodiment]

Figure 46A:
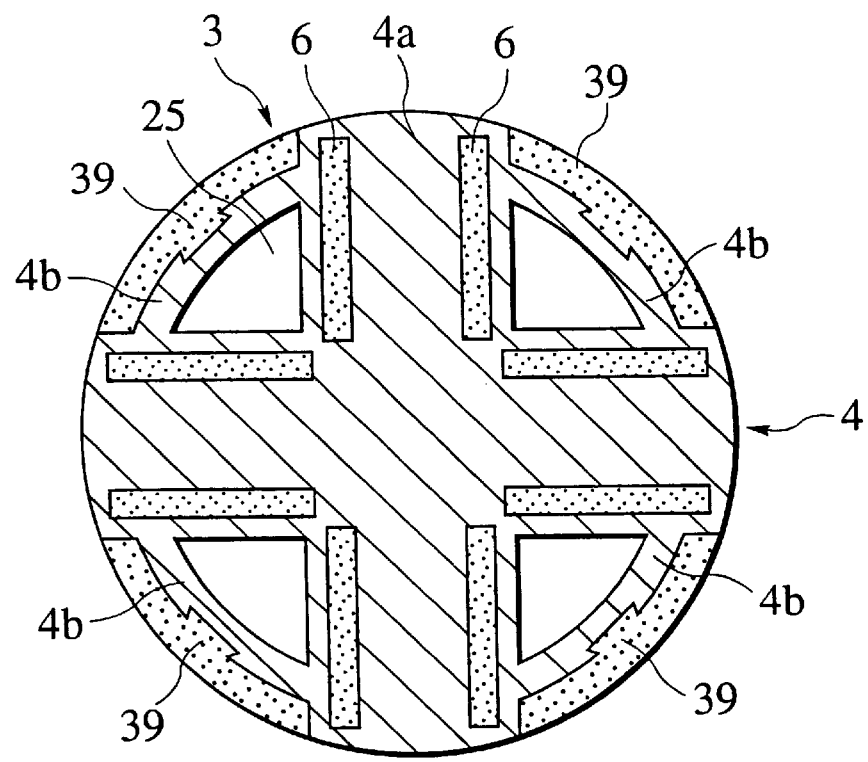
FIG. 46A is a cross sectional view of a rotor of the reluctance type rotating machine in accordance with the 40th. embodiment of the present invention, taken along the radial direction of the machine
Figure 46B:
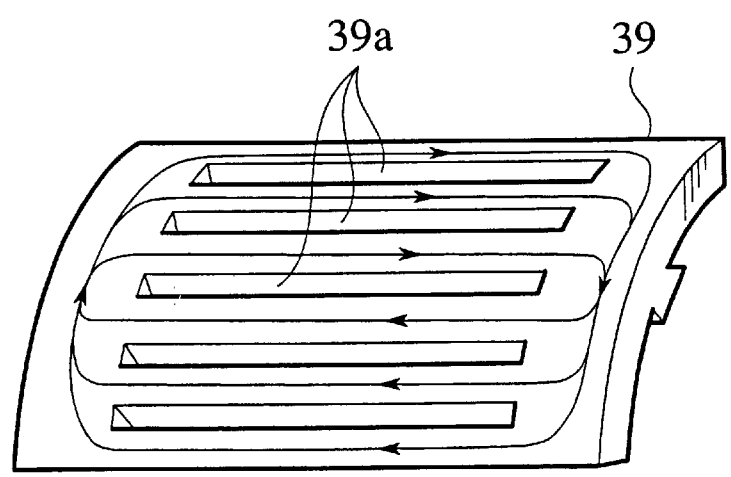
FIG. 46B is a perspective view of a shell member (conductor) of FIG. 46A.

FIG. 46A is a cross sectional view of the rotor 3 of the reluctance type rotating machine in accordance with the 40th. embodiment of the invention. In a modification of the 39th, embodiment, the conductor of the rotor 3 is constituted by four curved shell members 39 each of which is provided, along the circumferential direction, with a plurality of slits 39a of FIG. 46B. Each shell member 39 is overlaid on the interpole 4b, which is positioned inward of the leading end of the pole 4a in the radial direction of the rotor 3, and is integrated with the interpole 4b by the engagement between the dovetail groove and a dovetail projection of the member 39. According to the embodiment, since the interpoles 4b are covered with the shell members 39, the induced current flows in the interpoles 4b at the machine's starting, allowing the self-starting of the machine. Furthermore, since each shell member 39 is adapted so as to succeed to the outer face of the pole 4a in order to form the rotor 3 of circular section, it is possible to reduce the air resistance (windage), whereby the rotational efficiency can be improved.

Further, according to the embodiment, the shell members 39 are constituted by non-magnetic material exhibiting the fine conductivity, for example, copper, aluminum, or the like. Therefore, when the machine is operated, the induced current also flows in the vicinity of the outer faces of interpoles 4b of the rotor 3 to improve the self-starting characteristic of the machine. Simultaneously, since the magnetic reluctance is further increased in the interpoles 4b due to their non-magnetism, the change in magnetic energy between the pole 4a and the interpole 4b is further increased thereby to improve the output of the machine.

[41st embodiments]

Figure 47:
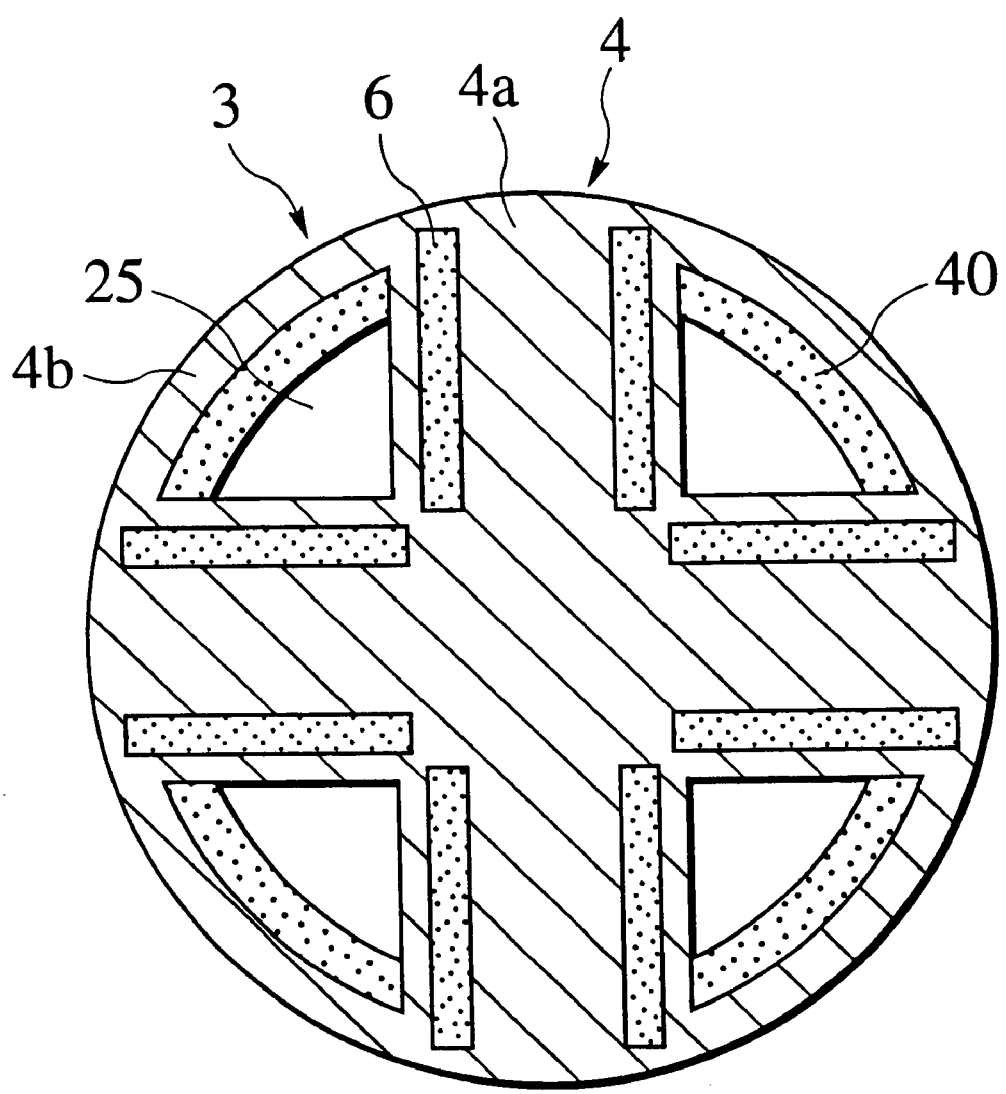
FIG. 47 is a cross sectional view of a rotor of the reluctance type rotating machine in accordance with the 41st. embodiment of the present invention, taken along the radial direction of the machine.

FIG. 47 is a cross sectional view of the rotor 3 of the reluctance type rotating machine in accordance with the 41st. embodiment of the invention. According to the embodiment, the conductor of the rotor 3 is constituted by four shell members 40 each of which is curved and provided with the plural slits 39a along the circumferential direction of the rotor 3b. Each shell member 40 is fixed on the outside of each cavity 25 of the rotor 3.

Accordingly, since the induced current of a long path flows in the shell members 40 positioned relatively outside of the interpoles 4b at the machine's starting, the self-starting of the machine is facilitated.

[42nd embodiment]

Figure 48A:
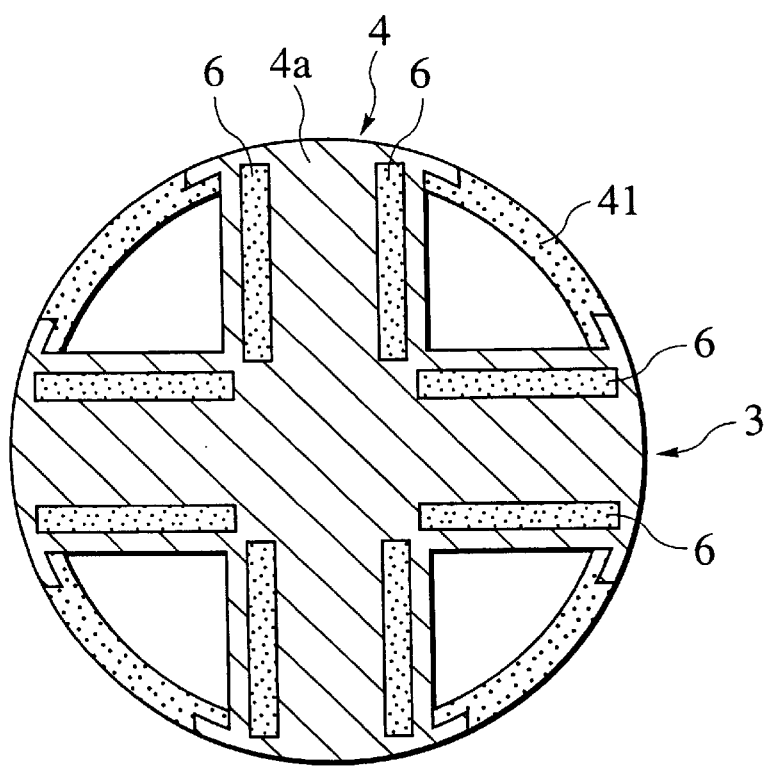
FIG. 48A is a cross sectional view of a rotor of the reluctance type rotating machine in accordance with the 42nd. embodiment of the present invention, taken along the radial direction of the machine
Figure 48B:
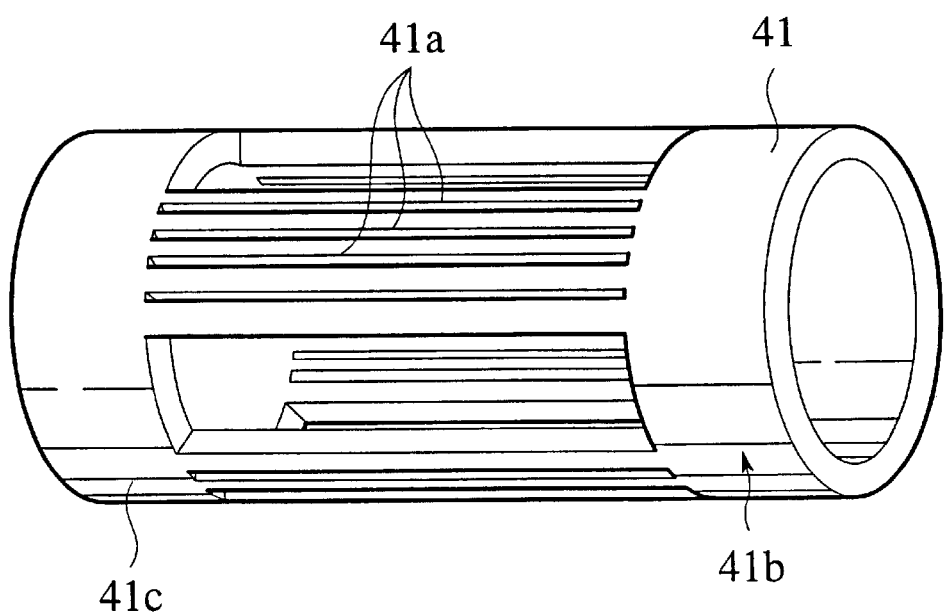
FIG. 48B is a perspective view of a shell member (conductor) of FIG. 48A.

FIG. 48A is a cross sectional view of the rotor 3 of the reluctance type rotating machine in accordance with the 42nd. embodiment of the invention, which is similar to the 40th. and 41st. embodiments.

According to the embodiment, the interpoles 4b are abolished 9 from the rotor 3 of FIG. 46A, so that the rotor core 4 is formed to have a generally cross-shaped section. Further, the circumferential ends of each pole 4a are hook-shaped for engagement with circumferential ends of conductive shell members 41. Owing to this formation of the poles 4a, even if the centrifugal force of the rotor 3 is applied on the members 41, they can be prevented from being left out from the rotor 3.

Additionally, since the shell members 41 are connected with each other through annular portions 41b, 41c at both axial ends of each member 41, it is possible to form slits 41a of long paths, which extend in the axial direction of the rotor core 4 and are juxtaposed along the circumferential direction of the rotor 3. Simultaneously, the shall members 41 are connected to the outer faces of the poles 4a smoothly.

Consequently, the rotor core 4 of the embodiment can take effects similar to those of the embodiment of FIG. 45. Furthermore, since each shell member 41 is adapted so as to succeed the outer face of the pole 4a, it is possible to reduce the air resistance (windage), whereby the rotational efficiency can be improved. Further, when the machine operates to start, the induced current of long path flows in the shell members 41, whereby the self-starting of the machine is facilitated.

Note, although the four shell members 41 are connected with each other through the annular portions 41b, 41c thereby to constitute the single cylindrical conductive member in this embodiment, the shell members 41 may be separated from each other while eliminating the annular portions 41b, 41c in a modification of the 42nd embodiment, as similar to the 40th. and 41st. embodiments.

In common with the 37th.–42nd. embodiments, since the conductor outside the rotor core 4 has a plurality of slits formed in the cylindrical part of the rotor core and arranged along the circumferential direction of the rotor so as to each extend in the axial direction and therefore, the induced current flows while forming long paths in the axial direction of the rotor at the machine's starting, the magnetic bonding between the armature windings and the rotor is so reinforced to provide the starting torque for the machine.

[43rd embodiment]

Figure 49:
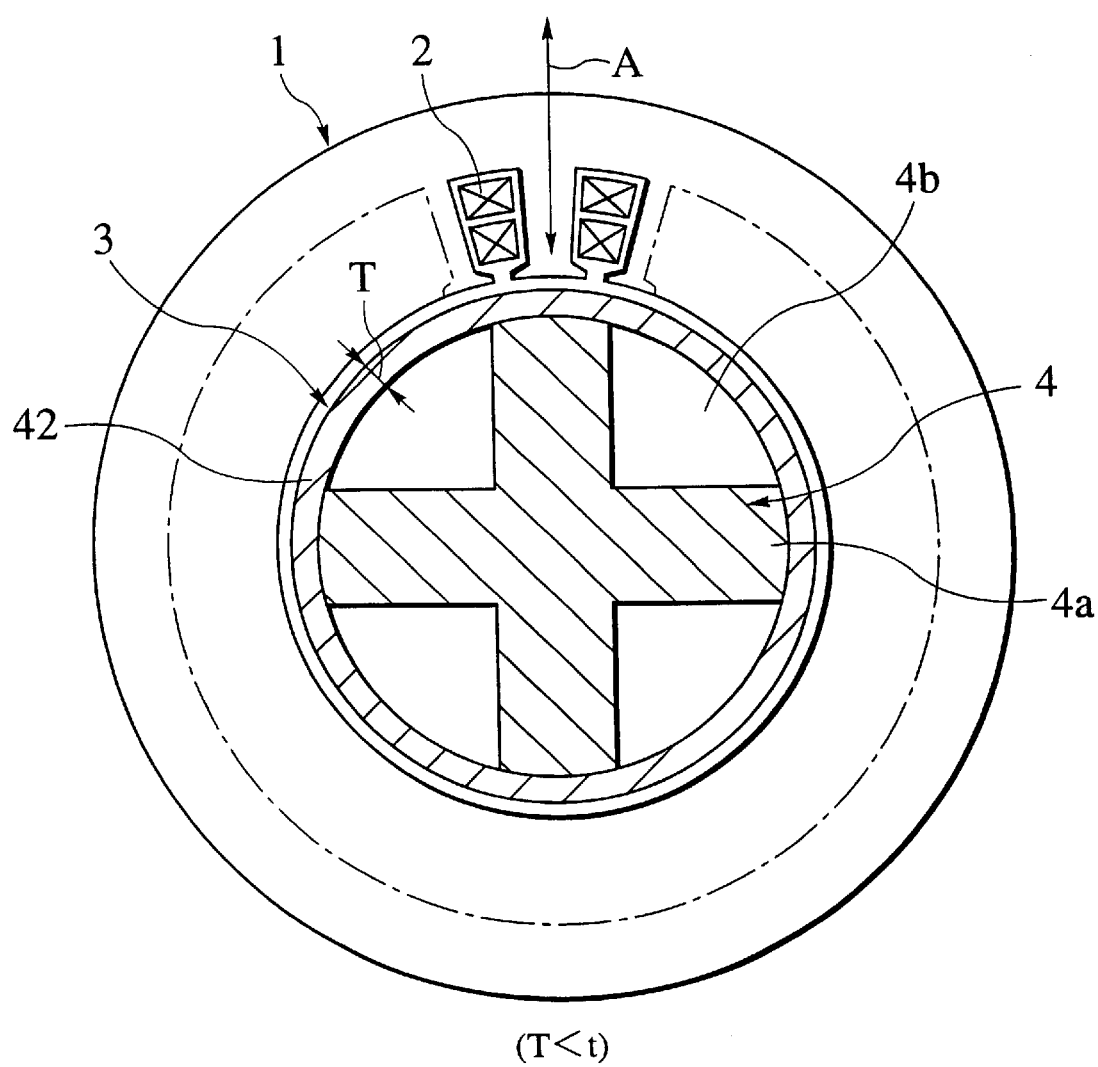
FIG. 49 is a cross sectional view of a reluctance type rotating machine in accordance with the 43rd. embodiment of the present invention, taken along the radial direction of the machine.

FIG. 49 is a cross sectional view of the reluctance type rotating machine in accordance with the 43rd. embodiment of the present invention, taken along the radial direction of the rotor of the machine. As similar to the previously-mentioned embodiments, the machine comprises the annular stator 1 provided with the armature windings 2 and the rotor 3 accommodated in the stator 1.

According to the embodiment, the rotor 3 is constituted by a rotor core 4 having a cross-shaped section and an annular member 42 abutting on the rotor core 4.

The rotor core 4 is constituted by a lamination of numerous steel plates obtained by punching (or wire-cutting) a steel plate of magnetic material (e.g. soft steel S45C, silicon steel) in a cross-shape, provided with the poles 4a projecting outward in the radial direction of the rotor 3 and the interpoles 4b (non-magnetic spaces) each interposed between the adjoining poles 4a in the circumferential direction of the rotor 3. While, the annular member 42 made of magnetic material identical to the rotor core 4 is constituted as a cylindrical member having an annular section of a thickness T and also extending in the axial direction of the rotor core 4 (i.e. a direction perpendicular to the drawing).

Figure 54:
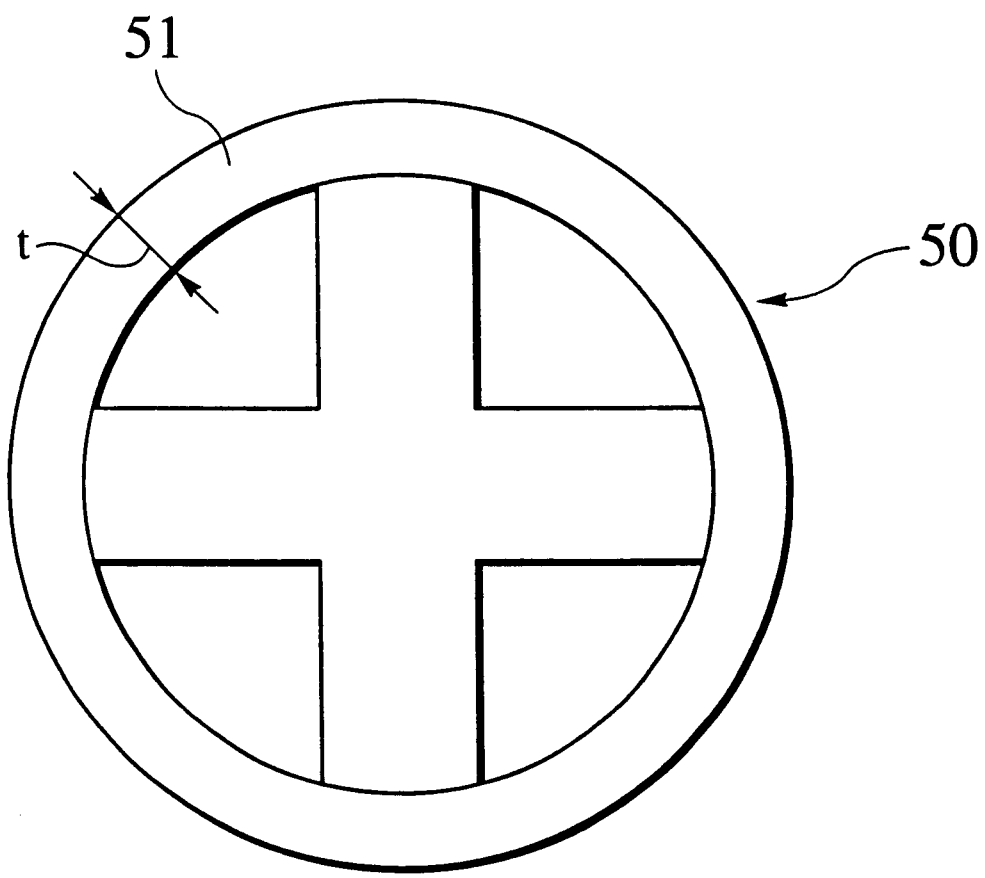
FIG. 54 is a schematic plan view of an earlier rotor.

For integration with the rotor core 4, the annular member 42 is closely fitted to the peripheries of the poles 4a by means of shrinkage-fitting, press-fitting, etc. Thus, there is caused no slip between the rotor core 4 and the annular member 42 during the operation of the rotor 3. Note, the radial thickness T of the annular member 42 is established smaller than a thickness t of a bridge portion 51 of an earlier rotor 50 of FIG. 54, (T<t). The reason of establishment is that the annular member 42 is formed into one body and therefore, the rotor core 4 retained in such a member 42 can have the interpoles 4b (and their vicinities) of which strength are respectively larger than those of the earlier rotor having bridge portions of the same thickness as the member 42. In other words, when it is required to ensure a certain strength against each interpole of the rotor, the rotor 3 of the embodiment is capable of thinning the thickness T of the annular member 43 in comparison with the thickness c of the earlier rotor (see FIG. 54) being provided for the same requirement.

The rotor 3 and the reluctance type rotating machine having the rotor 3 operate as follows.

Figure 50:
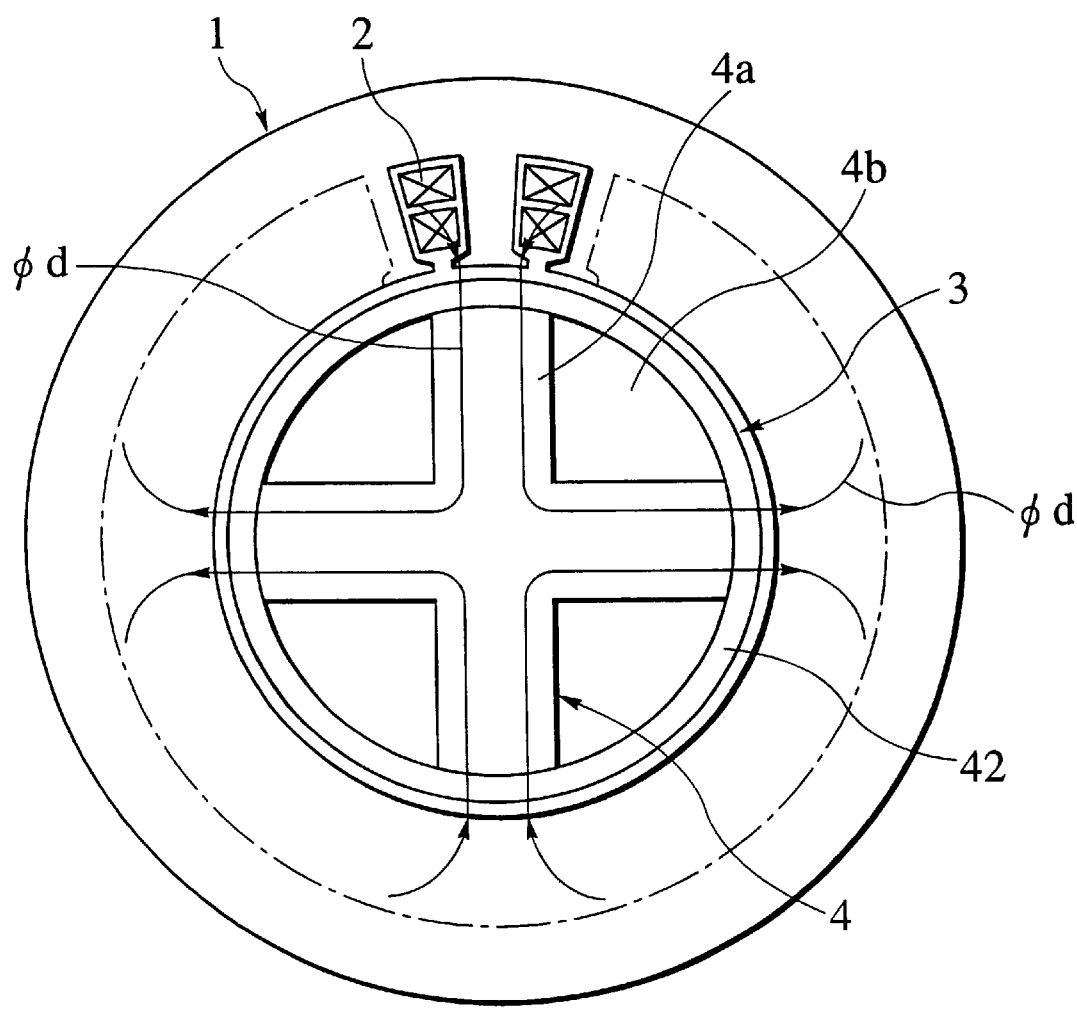
FIG. 50 is a cross sectional view of the reluctance type rotating machine of the 43rd. embodiment, showing the flux distribution due to armature current of d-axis.

FIG. 50 shows the flux φd in the d-axis directions along the pole axes of the rotor core 4. As shown in the figure, since the flux φd flows in the rotor core 4 of the poles 4a as the magnetic path, the rotating machine has a structure where the flux is easy to flow because the magnetic reluctance of the magnetic path is remarkably small. While, as the thickness T of the annular member 42 is smaller than the thickness t of the bridge portion 51 (FIG. 54), it is possible to reduce the quantity of leakage flux passing through the member 42 in comparison with that of leakage flux passing through the portion 51.

Figure 51:
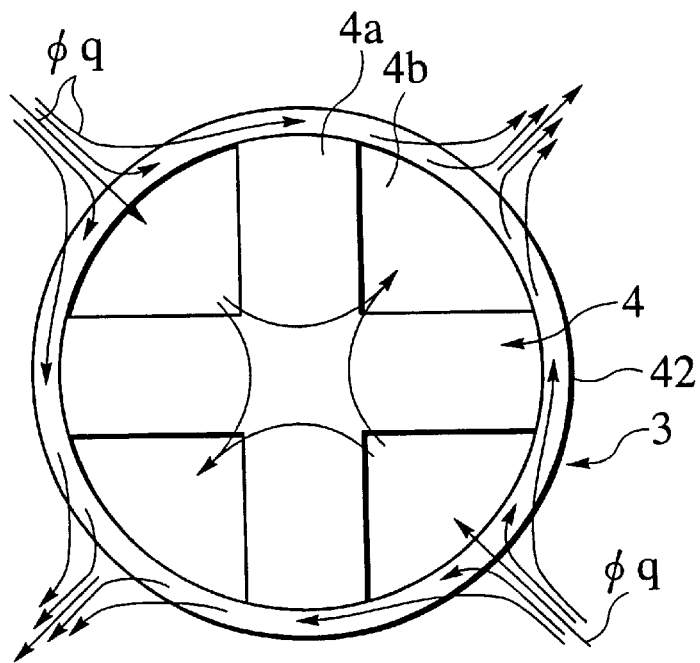
FIG. 51 is a cross sectional view of the reluctance type rotating machine of the 43rd. embodiment, showing the flux distribution due to armature current of q-axis.

FIG. 51 shows the flux φq by the q-axis armature current along the directions of radial axes passing the centers of the interpoles 4b. Although the magnetic flux φq partially forms the magnetic paths crossing the interpoles 4b, the flux φq alnost forms the magnetic paths passing through the member 42 and sequentially flowing outward of the adjoining interpole 4b in the radial direction of the rotor 3. Although this flux distribution of the rotor 3 of the embodiment is similar to that of the conventional rotor 50, the flux flowing the annular member 42 is less than the flux flowing the bridge portions 51 of the rotor 50 because of the establishment (T<t), accompanying the increase in magnetic reluctance of the interpoles 4b. Thus, as there is produced a great magnetic unevenness with respect to the position of the rotor 3 owing to the provision of the thinned annular member 42, the resultant magnetic energy is remarkably changed to produce the large output of the machine.

Further, the rotor 3 of the embodiment is constituted by the uneven rotor core 4 covered with the annular member 42 as one body, it is possible to make the thickness of the annular member 42 smaller than that of the earlier rotor upon the same requirement.

As to the material of the annular member 42, the use of material, of which saturated flux density is lower than that of the material forming the rotor core 4, would cause the flux of the q-axis direction to flow in the member 42 with difficulty in comparison with a case of employing the same material as the rotor core 4 for the annular member 42. In such a case, the leakage flux passing through the annular member 42 would be also reduced in the flux of the d-axis direction thereby to increase the quantity of main flux, whereby the output of the machine could be improved.

[44th embodiment]

Figure 52:
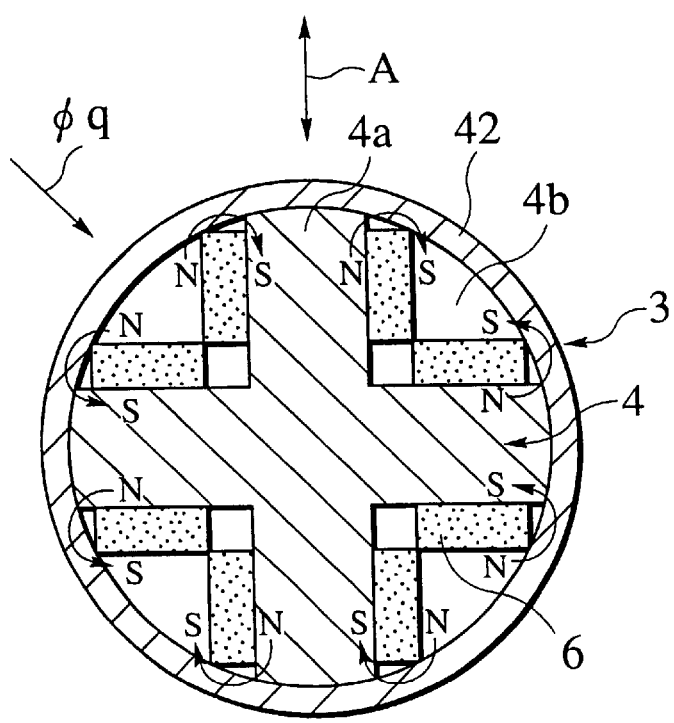
FIG. 52 is a cross sectional view of a reluctance type rotating machine in accordance with the 44th. embodiment of the present invention, taken along the radial direction of the machine.

FIG. 52 is a cross sectional view of the rotor in accordance with the 44th. embodiment of the present invention, taken along the radial direction of the rotor. According to the embodiment, the rotor 3 is characterized in that, for example, the Nd—Fe—B type permanent magnets 6 are disposed on both sides of each pole 4a of the rotor core 4 in the circumferential direction. Note, regarding the arrangement of the annular member 42, the embodiment is similar to the 43rd. embodiment.

The permanent magnets 6 are magnetized in the direction perpendicular to the pole axis shown with an arrow A and also magnetized so as to repulse the q-axis flux of the armature windings 2 entering into the interpoles 4b. In other words, the opposing magnets 6 interposing each pole 4a therebetween are identical to each other in terms of the magnetizing direction, perpendicular to the pole 4a. While, the opposing magnets 6 on both sides of each interpole 4b are different from each other in terms of the magnetizing direction, in the circumferential direction of the rotor 3 and also arranged in a manner that the flux from the magnets 6 flows in the radial direction in the interpole 4b. According to the rotor 3 of the embodiment, since the flux of the permanent magnets 6 operates to oppose the q-axis flux in addition to the operation of the annular member 52, the magnetic reluctance in the interpoles 4b is further increased thereby to improve the output of the machine.

Meanwhile, the reluctance type rotating machine of the embodiment is superior to the conventional reluctance type rotating machine in terms of the manufacturing process.

FIGS. 53A to 53D show an example of manufacturing the rotor of FIG. 52. Note, in this manufacturing process, the permanent magnets 6 are magnetized by a magnetizer. That is, according to the manufacturing process, it is carried out to firstly laminate and fix numerous magnetic plates, which have been cut in cross shapes, on each other, so that the rotor core 4 having the poles 4a and the interpoles 4b is prepared (see FIG. 53A).

Figure 53A:
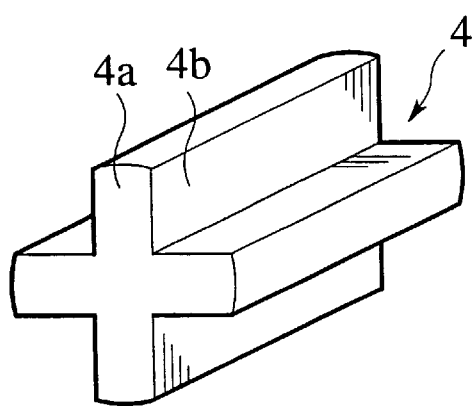
FIGS. 53A to 53D are schematic views showing a method of manufacturing a rotor of the reluctance type rotating machine of the 44th. embodiment of the present invention.
Figure 53C:
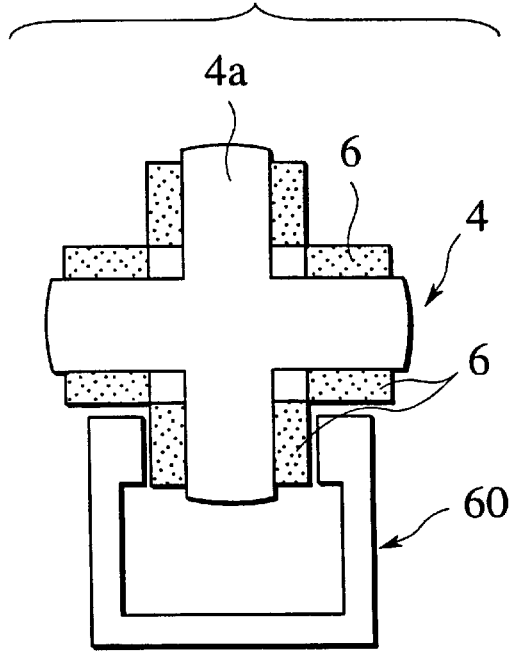
Figure 53B:
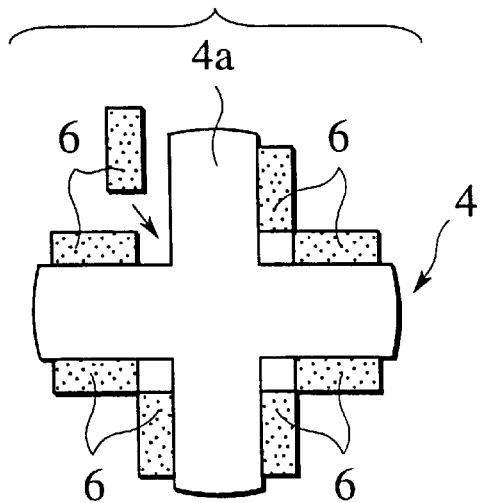
Figure 53D:
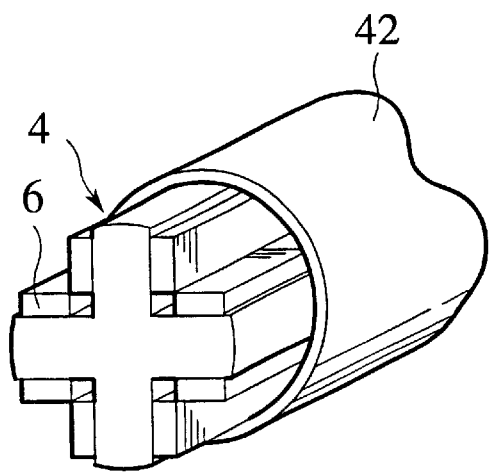

Next, the permanent magnets 6 before being magnetized are pasted on both side faces of each pole 4a by means of adhesives (see FIG. 53B).

Then, the rotor core 4 with the magnets 6 is set into a magnetizer 60 as shown in FIG. 54C and sequentially, the magnets 6 are magnetized in order so as to have the above-mentioned magnetizing directions. After all the permanent magnets 6 have been magnetized, then the rotor core 4 is detached from the magnetizer 60 and thereafter, the annular member 42 is fitted to the rotor core 4 by means of shrinkage-fitting, press-fitting, or the like, thereby completing the rotor 3 (see FIG. 53D).

In this way, since the rotor 3 includes the cross-shaped rotor core 4 as a constituent, it is possible to attach the pre-magnetized magnets 6 on the poles 4a with ease. Additionally, since the so-attached magnets 6 expose on the rotor core 4, it is also possible to set the rotor core 4a having the magnets 6 in the magnetizer 60 easily.

In the modification of the above-mentioned method, the previously-magnetized magnets 6 may be attached on the side faces of the poles 4a of the rotor core 3 and thereafter, the annular member 42 may be fitted on the rotor core 4. In such a case, owing to the configuration of the rotor core 4, it is possible to insert the magnetized magnets 6 into the core 4 with ease, thereby facilitating the assembling operation for completing the rotor 3.

Further, in the modification, the annular member 42 may be made of non-magnetic material in view of reducing the windage of the rotor 3 simply.

Finally, it will be understood by those skilled in the art that the foregoing descriptions are preferred embodiments of the rotating machine, and that various changes and modifications may be made to the present invention without departing from the spirit and scope thereof.

What is claimed is:

1. A reluctance type rotating machine comprising:

a stator having armature windings;

a rotor having a rotor core, the rotor being provided, in a circumferential direction thereof, with a magnetic unevenness;

a plurality of permanent magnets arranged in the rotor core, each of the permanent magnets having a magnetization direction and the magnetization directions of selected of said magnets being arranged in a direction opposite the direction of magnetization of magnets adjacent the selected magnets to produce alternating magnetic poles and magnetic interpoles and provide said magnetic unevenness;

wherein an armature current flux in a radial direction of the rotor at the magnetic interpoles between the magnetic poles and the flux of the permanent magnets negate each other, so that the composite interlinkage flux in the radial direction of the rotor at the magnetic interpoles between the magnetic poles is substantially equal to zero.

2. A reluctance type rotating machine as claimed in claim 1, wherein the rotor core comprises a circumferential magnetic portion so that, when the armature windings are not excited, more than 30% of the permanent magnets' flux is distributed in the rotor and also that, when the machine is loaded, the permanent magnets' interlinkage flux is more than 10% of composite interlinkage flux composed of armature current flux and the permanent magnets' flux.

3. A reluctance type rotating machine as claimed in claim 1, wherein the rotor core comprises a circumferential magnetic portion so that, when the armature windings are not excited, more than 80% of the permanent magnets' flux is distributed in the rotor and also that, when the machine is loaded, the permanent magnets' interlinkage flux is more than 5% of composite interlinkage flux composed of armature current flux and the permanent magnets' flux.

4. A reluctance type rotating machine as claimed in claim 1
wherein, in a magnetic flux of the permanent magnets at an air gap, an amplitude in a fundamental component of a magnetic flux density of the permanent magnets is 0.2 to 0.6 T.

5. A reluctance type rotating machine as claimed in claim 2, wherein the magnetizing direction of the permanent magnets is substantially identical to the circumferential direction of the rotor.

6. A reluctance type rotating machine as claimed in claim 5, wherein the rotor is provided, at the magnetic interpoles between the magnetic poles, with a first non-magnetic part.

7. A reluctance type rotating machine as claimed in claim 6, wherein the first non-magnetic part comprises a conductive material.

8. A reluctance type rotating machine as claimed in claim 6, wherein a width of each pole is 0.3 to 0.5 times as long as a pole pitch which corresponds to a circumferential distance from a center of a pole to a center of the adjoining pole.

9. A reluctance type rotating machine as claimed in claim 8, wherein the rotor has magnetic portions each formed on the periphery at the magnetic interpoles between the magnetic poles, for magnetically connecting the magnetic poles.

10. A reluctance type rotating machine as claimed in claim 9, wherein the rotor is provided with a second non-magnetic part for reducing flux leaking through respective inward portions of the permanent magnets in the radial direction.

11. A reluctance type rotating machine as claimed in claim 10, wherein the first non-magnetic part between the adjoining poles is positioned so as not to increase magnetic reluctance outside the permanent magnets remarkably.

12. A reluctance type rotating machine as claimed in claim 11, wherein in terms of a gap between the rotor core and the stator, a gap length outside each magnetic interpole is larger than the gap length outside each magnetic pole.

13. A reluctance type rotating machine as claimed in claim 1, wherein, under condition that the armature current flux in the radial direction of the rotor at the magnetic interpoles between the magnetic poles becomes a maximum, said armature current flux and the flux of the permanent magnets negate each other, so that the composite flux in the center axis-direction is substantially equal to zero.

14. A reluctance type rotating machine as claimed in claim 13, wherein, in connection with the armature current produced by the flux of the permanent magnets when the machine is electrically closed in a short circuit, the interlinkage of magnetic flux produced by the permanent magnets in case of the armature current of zero interlinking with the flux of the permanent magnets is determined so that heat derived from Joule-loss originating in the armature current is less than a thermal allowable value of the machine or braking force produced by the armature current is less than an allowable value in the rotating machine.

15. A reluctance type rotating machine as claimed in claim 13, wherein the rotor is provided, on a periphery thereof, with a plurality of conductive members extending in the axial direction of the rotor.

16. A reluctance type rotating machine as claimed in claim 15, further comprising a pair of magnetic end rings arranged on respective axial ends of the rotor.

* * * * *